United States Patent
Ito

(10) Patent No.: US 7,505,100 B2
(45) Date of Patent: Mar. 17, 2009

(54) LIQUID CRYSTAL DISPLAY DEVICE

(75) Inventor: Yoji Ito, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 159 days.

(21) Appl. No.: 11/791,660

(22) PCT Filed: Nov. 29, 2005

(86) PCT No.: PCT/JP2005/022260

§ 371 (c)(1),
(2), (4) Date: May 25, 2007

(87) PCT Pub. No.: WO2006/057461

PCT Pub. Date: Jun. 1, 2006

(65) Prior Publication Data

US 2008/0043177 A1 Feb. 21, 2008

(30) Foreign Application Priority Data

Nov. 29, 2004 (JP) ............................. 2004-344596

(51) Int. Cl.
*G02F 1/1335* (2006.01)
(52) U.S. Cl. .................. 349/117; 428/1.31; 349/96
(58) Field of Classification Search .................. 349/84, 349/96, 98, 117; 428/1.1, 1.31
See application file for complete search history.

(56) References Cited

U.S. PATENT DOCUMENTS

| | | | | |
|---|---|---|---|---|
| 2007/0046872 A1* | 3/2007 | Tasaka | ........................ | 349/118 |
| 2007/0059458 A1* | 3/2007 | Nishiura et al. | ............. | 428/1.31 |
| 2007/0236632 A1* | 10/2007 | Kanbe et al. | ................... | 349/96 |
| 2007/0252293 A1* | 11/2007 | Sato et al. | .................... | 264/1.31 |
| 2007/0292635 A1* | 12/2007 | Nishiura et al. | ............. | 428/1.31 |

FOREIGN PATENT DOCUMENTS

| | | | |
|---|---|---|---|
| JP | 2001350022 A | * | 12/2001 |
| JP | 2002-229020 A | | 8/2002 |
| JP | 2004-309596 A | | 11/2004 |

OTHER PUBLICATIONS

International Search Report dated Feb. 27, 2006.

* cited by examiner

*Primary Examiner*—Ellen Kim
(74) *Attorney, Agent, or Firm*—Buchanan Ingersoll & Rooney PC

(57) ABSTRACT

In a liquid crystal display device, a light source, a light-scattering or light-reflecting polarizer, a light-absorbing polarizer, liquid crystal cells, and a light-absorbing polarizer are disposed in this order. A light source side transparent protecting film of the light-absorbing polarizer on the light source side uses a transparent polymer film whose in-plane retardation value and retardation value of the thickness direction are low.

6 Claims, 1 Drawing Sheet

LIQUID CRYSTAL DISPLAY DEVICE

TECHNICAL FIELD

The present invention relates to a liquid crystal display device. In particular, the invention relates to a liquid crystal display device having an enhanced utility efficiency of light.

BACKGROUND ART

Liquid crystal display devices are widely used in a variety of personal computers and the like. Lately, the demand for the liquid crystal display devices has been increasing.

In the recent liquid crystal display devices, there has been a demand in that the back-light is to be thin, a high precision image is to be displayed, and a high brightness image is to be displayed. Using a thin back-light and displaying a high precision image are likely to result in a low brightness image.

To establish a thin back-light, a high precision image, and a high brightness image, it is desirable that the utility efficiency of light is improved so as to compensate brightness. As a specific unit for improving brightness, a brightness enhancing film (reflective polarizer) has been suggested. The brightness enhancing film is largely classified into a linearly polarized light-separating type (for example, see JP-A-4-268505, JP-T-9-507308 and JP-T-10-511322) and a circularly polarized light-separating type (for example, see JP-A-8-271837, JP-A-8-271731, JP-A-10-321025, JP-A-11-174230 and JP-A-11-248942). Any of the brightness enhancing films are installed between a lower polarizer (light absorbing polarizer) and a light source (back-light).

By utilizing the brightness enhancing film, the utility efficiency of light in a liquid crystal display device is remarkably improved, which make it possible to considerably decrease electric power consumption.

DISCLOSURE OF THE INVENTION

Investigation of the liquid crystal display device, equipped with the brightness enhancing film by the present inventors revealed that when the liquid crystal display device is inclined to one side, the image thereof is sometimes colored into blue or yellow. Also, the problems that the effects of enhancing brightness are not sufficient and also that the brightness suddenly decreases depending on the situations, have been found. The problems can be solved by adjusting optical parameters of a liquid crystal cell and other parts of a liquid crystal display device. However, when the optical parameters of parts of a liquid crystal display device are changed, other optical problems often occurs.

The object of the invention is to assuredly improve the utility efficiency of light in a liquid crystal display device, without causing the problems of the coloration of the image.

The object of the invention has been accomplished by the liquid crystal display device as defined under the following items (1) to (6).

(1) A liquid crystal display device is provided in which a light source, a light-scattering or light-reflecting polarizer, a light-absorbing polarizer, liquid crystal cells, and a light-absorbing polarizer are disposed in this order. In the liquid crystal display device, the light-absorbing polarizer on the light source side has a polarizing film between two sheets of transparent polymer films and the in-plane retardation value and the retardation value of the thickness direction of the transparent polymer films on the light source side satisfy the following Expressions (I) to (IV):

$0 < Re(630) < 10$, (I)

$|Rth(630)| < 25$, (II)

$|Re(400) - Re(700)| < 10$, and (III)

$|Rth(400) - Re(700)| < 35$. (IV)

In the above Expressions, $Re(\lambda)$ is an in-plane retardation value (unit: nm) in the transparent polymer film as measured at the wavelength of $\lambda$ nm, and $Rth(\lambda)$ is a retardation value (unit: nm) of a thickness direction in a transparent polymer film as measured at the wavelength of $\lambda$ nm.

(2) In the liquid crystal display device as described in above (1), the transparent polymer film may contain a retardation decreasing agent in an amount that satisfies the following Expressions (V) and (VI):

$(Rth(A) - Rth(0))/A < -1.0$, and (V)

$0.01 < A < 30$. (VI)

In the above Expressions, $Rth(A)$ is a retardation value (unit: nm) in the thickness direction of a transparent polymer film containing A mass % of a retardation decreasing agent as measured at the wavelength of 630 $\lambda$nm; $Rth(0)$ is a retardation value (unit: nm) of a transparent polymer film in the thickness direction prepared in the same manner as mentioned above except that it does not contain a retardation decreasing agent as measured at the wavelength of 630 nm; and A is the amount (mass %) of a retardation decreasing agent to be added relative to polymer which constitutes the transparent polymer film.

(3) In the liquid crystal display device as described in above (2), the transparent polymer film may be made of cellulose acylate having an acyl substitution degree of 2.85 to 3.00.

(4) A liquid crystal display device is provided in which a light source, a cholesteric liquid crystal layer, a $\lambda/4$ plate, a light-absorbing polarizer, liquid crystal cells, and a light-absorbing polarizer are disposed in this order. In the liquid crystal display device, the light-absorbing polarizer on the light source side has a polarizing film between two sheets of transparent polymer films and the in-plane retardation value and the retardation value of the thickness direction of the transparent polymer films on the light source side satisfy the following Expressions (I) to (IV):

$0 < Re(630) < 10$, (I)

$|Rth(630)| < 25$, (II)

$|Re(400) - Re(700)| < 10$, and (III)

$|Rth(400) - Re(700)| < 35$. (IV)

In the above Expressions, $Re(\lambda)$ is an in-plane retardation value (unit: nm) in the transparent polymer film as measured at the wavelength of $\lambda$ nm; and $Rth(\lambda)$ is a retardation value (unit: nm) in the thickness direction of a transparent polymer film as measured at the wavelength of $\lambda$ nm.

(5) In the liquid crystal display device as described in above (4), the transparent polymer film may contain a retardation decreasing agent in an amount that satisfies the following Expressions (V) and (VI):

$(Rth(A) - Rth(0))/A < -1.0$, and (V)

$0.01 < A < 30$. (VI)

In the above Expressions, $Rth(A)$ is a retardation value (unit: nm) in the thickness direction of a transparent polymer film containing A mass % of a retardation decreasing agent as measured at the wavelength of 630 nm; Rth(0) is a retardation value (unit: nm) of the transparent polymer film in the thickness direction prepared in the same manner as mentioned above except that it does not contain a retardation decreasing agent as measured at the wavelength of 630 nm; and A is the amount of a retardation decreasing agent to be added relative to a polymer which constitutes the transparent polymer film.

(6) In the liquid crystal display device as described in above (5), the transparent polymer film may be made of cellulose acylate having an acyl substitution degree of 2.85 to 3.00.

As used herein, $Re(\lambda)$ and $Rth(\lambda)$ are an in-plane retardation and a retardation in the thickness direction at the wavelength $\lambda$ nm, respectively. $Re(\lambda)$ is measured by entering light having a wavelength of $\lambda$ nm in the normal direction of the film in the KOBRA21ADH, trade name (manufactured by Oji Scientific Instruments Co. Ltd.). $Rth(\lambda)$ is calculated by using the KOBRA21ADH, on the basis of retardation values measured in three directions, that is, the $Re(\lambda)$, a retardation value measured by entering the light of wavelength $\lambda$ nm in the direction inclined to +40° over the normal direction of the film, with the in-plane retarded axis (judged by the KOBRA21ADH) as an inclined axis (an axis of rotation), and a retardation value measured by entering the light of wavelength $\lambda$ nm in the direction inclined to −40° over the normal direction of the film, with the in-plane retarded axis as an inclined axis (an axis of rotation). Herein, an assumed value of an average refractive index may use a value in various optical film catalogs and Polymer Handbook (JOHN WILEY&SONS, INC). As to an average refractive index value other than an existent one, it can be measured using ABBE Refractometer.

The value of average refractive index for the main polymer films are as follows:

| | |
|---|---|
| Cellulose acylate film | 1.48, |
| Cycloolefin polymer film | 1.52, |
| Polycarbonate film | 1.59, |
| Polymethyl methacrylate film | 1.49, and |
| Polystyrene film | 1.59. |

By inputting an assumed value of the average refractive index and the thickness of the film, KOBRA21ADH calculates nx, ny, and nz.

And the term 'substantially parallel', as used herein, means a position within the range less than ±5° rather than the accurate angle. This range is preferably less than ±4°, more preferably less than ±3°, and most preferably less than ±2°.

And, the term a light-scattering or light-reflecting polarizer, as used herein, means a polarizer having a function that penetrates a linearly polarized component which is parallel to the polarization axis and then scatters or reflects a linearly polarized component which is perpendicular to the axis. The term a light-absorbing polarizer means a polarizer having a function that penetrates a linearly polarized component that is parallel to the polarization axis and absorbs a linearly polarized component that is perpendicular to the axis.

Further, when it is only referred to 'polarized light', as used herein, it does not mean polarized light in a broad meaning (containing linearly polarized light, circularly polarized light and elliptically polarized light), but polarized light in a narrow meaning (only linearly polarized light).

BRIEF DESCRIPTION OF THE DRAWINGS

In FIG. 1, 1a to 3a denote circularly polarized light, 4a denotes linearly polarized light, Ch denotes a Cholesteric liquid crystal layer, RP denotes a reflection plate and $\lambda/4$ denotes a $\lambda/4$ plate.

BEST MODE FOR CARRYING OUT THE INVENTION

[Transparent Polymer Film]

Figure 1:
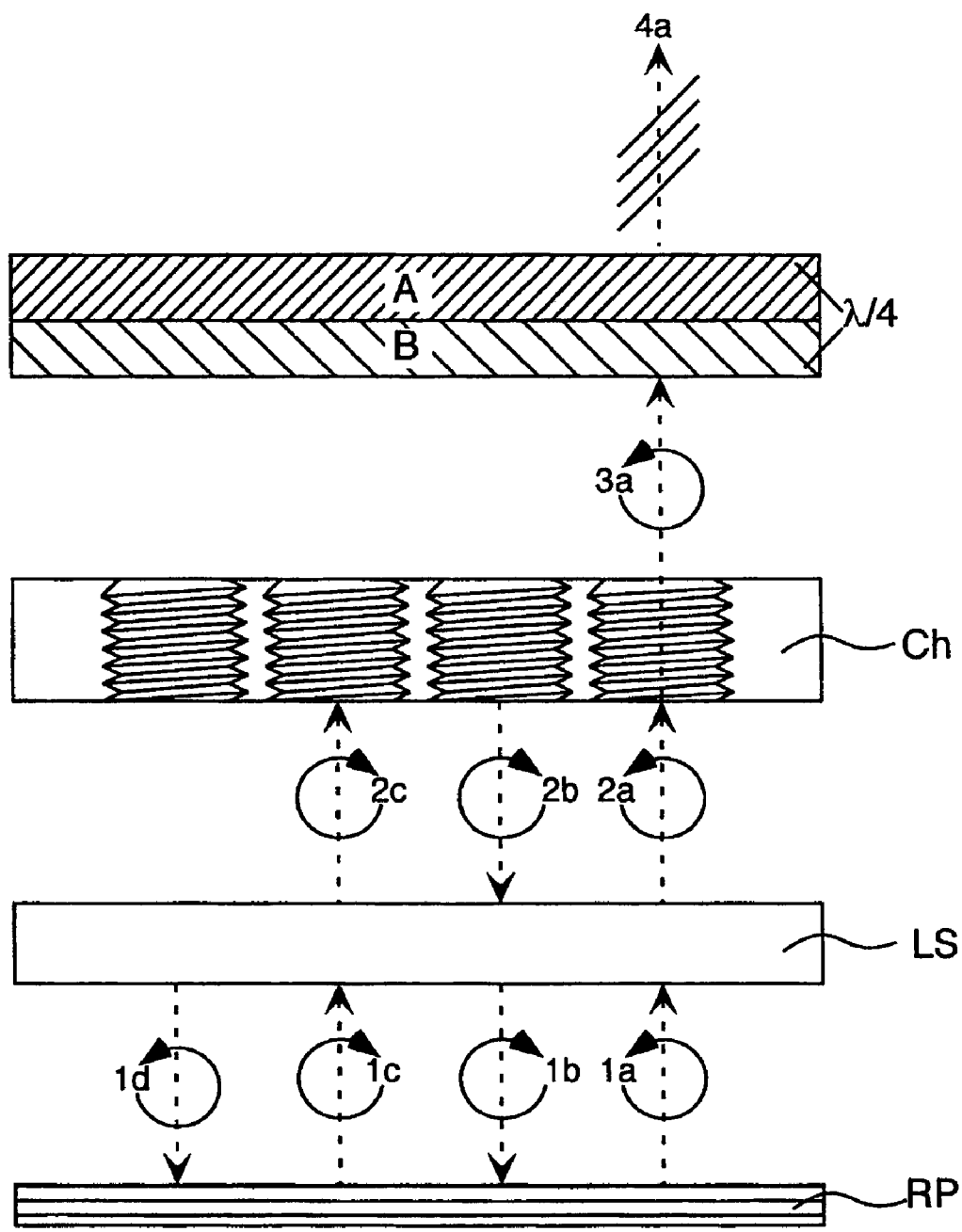
FIG. 1 is a cross-sectional view schematically showing a back light for a liquid crystal display having a circularly polarized light separating brightness improving film.

A transmissive liquid crystal display device has liquid crystal cells between two sheets of light-absorbing polarizer. The light-absorbing polarizer has a polarizing film between two sheets of protective film. The transmissive liquid crystal display device has four sheets of protective film. The protective film is generally composed of a transparent polymer film.

In the invention, among the four sheets of the protective film, as a protective film that is closest to the back-light, a transparent polymer film having a low retardation value is used. Likewise, the retardation values for the remaining three sheets of protective film can be a low value.

As to the term a low retardation value, specifically, it is preferred that the retardation Re(630) of the in-plane at the wavelength 630 nm is less than 10 nm (0<Re(630)<10), and the absolute value of retardation Rth(630) in the film thickness direction is less than 25 nm (|Rth|<25 nm). More preferably, 0<Re(630)<5 and |Rth|<20 nm, and particularly preferably, 0<Re(630)<2 and |Rth|<15 nm.

If the polymer films satisfy such optical properties the kind of the polymer is not particularly limited. Examples of the polymer include cellulose acylate, norbornene-based polymer, polycarbonate, polystyrene, polyvinyl alcohol, polyethylene, and polypropylene.

In particular, when cellulose acylate film that has been used as a protective film of the polarizer, is used, then it can be applied to the liquid crystal device without increasing the number of polarizers, and thus cellulose acylate film is more preferable.

In the case of cellulose acylate film, in order to realize said optical properties, it is preferred that a compound which suppress an alignment of cellulose acylate in the in-plane and the film thickness direction, is used to sufficiently reduce the optical anisotropy thereof, so that Re and Rth together are nearly 0.

The intensive investigation repeated by the present inventors have resulted in finding that the coloration of the film can be prevented by making the film have the absorbance function in the ultraviolet region of the wavelength range of 200 to 400 nm and the compound capable of controlling wavelength dispersion of $Re(\lambda)$ and $Rth(\lambda)$ of the film is used, thereby, the differences of Re, Rth in wavelength 400 nm and 700 nm |Re(400)−Re(700)| and |Rth(400)−Rth(700)| can be narrower.

In the invention, the wavelength dispersion of the cellulose acylate film is preferably |Re(400)−Re(700)|<10 and |Rth(400)−Rth(700)|<35, more preferably |Re(400)−Re(700)|<5 and |Rth(400)−Rth(700)|<25, and most preferably |Re(400)−Re(700)|<3 and |Rth(400)−Rth(700)|<15.

[Cellulose Acylate]

The transparent polymer film is particularly preferably made of cellulose acylate.

A raw material cellulose for the cellulose acylate includes, for example, a cotton linter and a wood pulp (such as a broad-leaved tree pulp or a needle-leaf tree pulp), and cellulose acylate obtained from any raw material cellulose may be employed and may also be employed as a mixture thereof, if desirable. Such a raw material cellulose is described in detail, for example in Plastic Zairyo Koza (17) Senisokeijyushi (cellulose resin) (Marusawa and Uda, published by Nikkan Kogyo Shimbun, 1970) and Laid-open Technical Report, pp. 7 to 8 (No. 2001-1745, Japan Institute of Invention and Innovation), and the cellulose as described in said literatures can be used.

The cellulose acylate is a semi-synthesized polymer in which a hydrogen atom of hydroxyl groups of cellulose is substituted by an acyl group. The number of carbon atoms of the acyl groups is preferably from 2 (for an acetyl group) to 22. A bonding level of acetic acid or a carboxylic acid with 3 to 22 carbon atoms attaching to the hydroxyl groups of cellulose can be measured and calculated to obtain a substitution degree. Such measurement can be conducted according to ASTM, D-817-91.

An acyl substitution degree of cellulose is preferably 2.50 to 3.00, more preferably 2.75 to 3.00, and most preferably 2.85 to 3.00.

Carboxylic acid having 3 to 22 carbon atoms for attaching to the hydroxyl groups of cellulose includes an aliphatic carboxylic acid or an aromatic carboxylic acid. Two or more carboxylic acids may be used together. Aliphatic carboxylic acid may be unsaturated. Aliphatic carboxylic acid includes fatty acids substituted by aromatic groups.

Examples of acyl group include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl. Among them, preferred is acetyl, propionyl, butanoyl, dodecanoyl, octadecanoyl, t-butanoyl, oleoyl, benzoyl, naphthylcarbonyl or cinnamoyl and more preferred is actyl, propionyl or butanoyl.

When the acyl groups substantially comprise at least two acyl groups selected from acetyl, propionyl and butanoyl groups, then the optical anisotropy of the cellulose acylate film is lowered if a total substitution degree of said acyl group is 2.50 to 3.00. The total acyl substitution degree of at least two acyl groups is preferably 2.60 to 3.00 and more preferably 2.65 to 3.00.

The cellulose acylate preferably has a viscosity-average polymerization degree of 180 to 700. The cellulose acetate has preferably 180 to 550, more preferably 180 to 400, and most preferably 180 to 350. An excessively high polymerization degree increases a viscosity of a dope solution of the cellulose acylate, thereby rendering film preparation by a casting method difficult. An excessively low polymerization degree deteriorates the strength of the formed film. An average polymerization degree can be measured by a limit viscosity method of Uda et al. (Kazuo Uda and Hideo Saito, Bulletin of The Society of Fiber Science and Technology, Japan, vol. 18, No. 1, pp. 105 to 120 (1962)). The average polymerization degree is also described in detail in JP-A-9-95538.

The molecular weight distribution of the cellulose acylate preferably employed in the invention is evaluated by a gel-permeation chromatography and is preferably narrow, with a small dispersion index Mw/Mn (Mw: mass-average molecular weight, Mn: number-average molecular weight). A specific range of Mw/Mn value is preferably 1.0 to 3.0, more preferably 1.0 to 2.0, and most preferably 1.0 to 1.6.

An elimination of low-molecular components results in an average molecular weight (polymerization degree) increasing, but makes the viscosity become lower than a conventionally used cellulose acylate, and thus, such elimination is useful. Cellulose acylate having reduced low-molecular components can be obtained by eliminating low-molecular components from cellulose acylate synthesized by a well-known method. The elimination of the low-molecular components can be effected by rinsing the cellulose acylate with an appropriate organic solvent. In case of preparing cellulose acylate having reduced low-molecular components, an amount of a sulfuric acid catalyst in the acylation reaction is preferably adjusted within a range of 0.5 to 25 parts by mass, with respect to 100 parts by mass of cellulose. The amount of a sulfuric acid catalyst within the aforementioned range makes it possible to synthesize cellulose acylate that is adequate in the molecular weight distribution (with uniform molecular weight distribution). In the preparation of the cellulose acylate according to the invention, the cellulose acylate preferably has a water content of 2 mass % or less, more preferably 1 mass % or less and particularly preferably 0.7 mass % or less. The cellulose acylate is known to generally contain water, in an amount of 2.5 to 5 mass %. In order to attain the aforementioned water content of the cellulose acylate in the invention, drying is required. For the cellulose acylate of the invention, a raw material cotton and a synthesizing method are described in detail in Japan Institute of Invention and Innovation, Technical Publication (Technical Publication No. 2001-1745, pp. 7-12, Mar. 15, 2001, published by Japan Institute of Invention and Innovation).

The cellulose acylate may be employed singly or in a mixture of two or more kinds, provided that the substituent, the substitution degree, the polymerization degree, and the molecular weight distribution are within the aforementioned ranges.

[Additive to Cellulose Acylate]

To a solution of the cellulose acylate may be added various additives (for example, a compound for reducing optical anisotropy, a wavelength dispersion-regulating agent, an anti-ultraviolet agent, a plasticizer, an anti-deterioration agent, fine particles or an optical property-regulating agent) depending on various purposes in each of the preparation steps, and such additives will be explained in the following. And such addition may be carried out in any of the steps of preparing a dope, or may be carried out by adding a step of adding such additives to the final preparation step in the process for preparing dope. Also, practically, it is preferred that during the preparation of cellulose acylate film, these compounds are well compatible with cellulose acylate and the white turbidity of film does not appear and the physical strength of the film is also sufficient.

It is preferred to add at least one compound capable of reducing an optical anisotropy of the cellulose acylate film, particularly a retardation Rth in the direction of film thickness represented by a following Expression (i), within the ranges of the following Expressions (i) and (ii):

$(Rth(A)-Rth(0))/A<-1.0$, and (i)

$0.01<A<30$ (ii)

The Expressions (i) and (ii) are preferably:

$(Rth(A)-Rth(0))/A<-2.0$, and (i)

$0.05<A<25$, (ii)

and more preferably:

$(Rth(A)-Rth(0))/A<-3.0$, and (ii)

$0.1<A<20$. (iii)

[Structural Feature of Compound for Reducing Optical Anisotropy of Cellulose Acylate Film]

In the following, there will be explained a compound for reducing the optical anisotropy of the cellulose acylate film. As a result of intensive investigations, the present inventors employ a compound capable of suppressing an alignment of cellulose acylate in the film along the in-plane direction and the direction of film thickness, thereby sufficiently reducing the optical anisotropy so that both an Re value and an Rth value can be nearly 0. For this purpose, it is advantageous that the optical anisotropy reducing compound is sufficiently compatible with cellulose acylate and does not have a rod-shaped structure or a planar structure in the compound itself. Specifically, in case that the compound has plural planar functional groups such as aromatic groups, it is advantageous that the compound has a non-planar structure that does not have said functional groups on the same plane.

(Log P Value)

In the preparation of the cellulose acylate film according to the invention, among the aforementioned compound for suppressing an alignment of cellulose acylate in the film along the in-plane direction and the direction of film thickness thereby sufficiently reducing the optical anisotropy, preferred is a compound having an octanol-water distribution coefficient (log P value) within a range of from 0 to 7. A compound having a log P value exceeding 7 is poor in the compatibility with cellulose acylate, thus tending to cause a white turbidity or a powdery formation in the film. Also, a compound having a log P value less than 0 has a high hydrophilicity and thus may deteriorate the water resistance of the cellulose acylate film. The log P value is more preferably within a range of from 1 to 6, and particularly preferably 1.5 to 5.

The octanol-water distribution coefficient (log P value) can be measured by a flask permeation method described in Japan Industrial Standards (JIS) Z7260-107 (2000). The octanol-water distribution coefficient (log P value) may also be estimated, instead of an actual measurement, by a calculational chemical method or an empirical method. As a calculation method, Crippen's fragmentation method (J. Chem. Inf. Comput. Sci., 27, 21 (1987)), Viswanadhan's fragmentation method (J. Chem. Inf. Comput. Sci., 29, 163 (1989)), or Broto's fragmentation method (Eur. J. Med. Chem.-Chim. Theor., 19, 71 (1984)), and the like is are preferably used, and the Crippen's fragmentation method (J. Chem. Inf. Comput. Sci., 27, 21 (1987)) is more preferably used. In case that a compound shows different log P values depending on the measuring method or the calculation method, the Crippen's fragmentation method is preferably used for judging as to whether the compound is within a range of the invention.

[Physical Properties of Compound for Reducing Optical Anisotropy]

An optical anisotropy-reducing compound may or may not include an aromatic group. The optical anisotropy-reducing compound preferably has a molecular weight of 150 to 3000, more preferably 170 to 2000, and particularly preferably 200 to 1000. Such compound may have, within such range of the molecular weight, a specified monomer structure, or an oligomer structure or a polymer structure formed by a bonding of a plurality of such monomer unit.

The optical anisotropy-reducing compound is preferably either a liquid at 25° C. or a solid having a melting point of 25° C. to 250° C. and more preferably either a liquid at 25° C. or a solid having a melting point of 25° C. to 200° C. Also, the optical anisotropy-reducing compound preferably does not evaporate in the course of casting and drying a dope solution for preparing the cellulose acylate film.

An amount of addition of the optical anisotropy-reducing compound is preferably 0.01 mass % to 30 mass % of the cellulose acylate, more preferably 1 mass % to 25 mass %, and particularly preferably 5 mass % to 20 mass %.

The optical anisotropy-reducing compound may be employed singly or in a mixture of two or more kinds in an arbitrary ratio.

The optical anisotropy-reducing compound may be added any time in the process of preparation of a dope solution, or at the end of such process.

The optical anisotropy reducing compound has an average content, in a portion from at least a surface of the cellulose acylate film to a position of 10% of the total film thickness, of 80% to 99% of an average content of such compound in a central portion of the cellulose acylate film. An amount of the compound of the invention can be determined by measuring amounts of the compound in a surface portion and a central portion by a method utilizing an infrared absorption spectrum, as described in JP-A-8-57879, and the like.

Hereinbelow, specific examples of the compounds for lowering the optical anisotropy of the cellulose acylate film which is preferably used in the invention are given.

A compound of Formula (1) is explained.

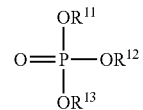

Formula (1)

In Formula (1), $R^{11}$ to $R^{13}$ each independently represent an aliphatic group having 1 to 20 carbon atoms. $R^{11}$ to $R^{13}$ may be bonded to each other to form a ring.

$R^{11}$ to $R^{13}$ is explained in detail. $R^{11}$ to $R^{13}$ are preferably an aliphatic group having 1 to 20, more preferably 1 to 16 carbon atoms, and particularly preferably 1 to 12 carbon atoms. Here, the aliphatic group is preferably an aliphatic hydrocarbon group, and preferably an alkyl group (including straight-chained, branched and cyclic alkyl groups), an alkenyl group or an alkynyl group. Examples of the alkyl group include methyl, ethyl, propyl, isopropyl, butyl, isobutyl, sec-butyl, t-butyl, pentyl, t-amyl, hexyl, octyl, decyl, dodecyl, eicosyl, 2-ethylhexyl, cyclopentyl, cyclohexyl, cycloheptyl, 2,6-dimethyl cyclohexyl, 4-t-butylcyclohexyl, cyclopentyl, 1-adamanthyl, 2-adamanthyl, bicyclo[2.2.2]octane-3-yl and the like; examples of the alkenyl group include vinyl, allyl, prenyl, geranyl, oleyl, 2-cyclopentene-1-yl, 2-cyclohexene-1-yl and the like; examples of the alkynyl group include ethynyl, propargyl and the like.

The aliphatic group represented by $R^{11}$ to $R^{13}$ may be substituted or unsubstituted, and examples of the substituent include a halogen atom (a fluorine atom, a chlorine atom, bromine atom or an iodine atom), an alkyl group (including straight-chained, branched and cyclic alkyl groups, a bicyclo alkyl group, an active methine group), an alkenyl group, an alkynyl group, an aryl group, a heterocyclic group (irrespective of the position to be substituted), an acyl group, an alkoxycarbonyl group, an aryloxycarbonyl group, a heterocyclic oxycarbonyl group, a carbamoyl group, an N-acyl carbamoyl group, an N-sulfonyl carbamoyl group, an N-carbamoyl carbamoyl group, an N-sulfamoyl carbamoyl group, a carbazoyl group, a carboxyl group or a salt thereof, an oxalyl group, an oxamoyl group, a cyano group, a carbonimidoyl group, a formyl group, a hydroxyl group, an alkoxyl group (including the groups having repetition of an ethyleneoxy group or propyleneoxy group unit), an aryloxy group, a heterocyclic oxy group, an (alkoxy or aryloxy) acyloxy group, a carbonyloxy group, a carbamoyloxy group, a sulfonyloxy group, an (alkyl, aryl, or heterocyclic) amino group, an amino group, an acylamino group, a sulfonamide group, a ureido group, a thioureido group, an (alkoxy or aryloxy) imide group, a carbonylamino group, a sulfamoylamino group, a semicarbazide group, an ammonio group, an oxamoylamino group, an N-(alkyl or aryl)sulfonylureido group, an N-acylureido group, an N-acyl sulfamoylamino group, a heterocyclic group including a quaternary nitrogen atom (for example, a pyridinio group, an imidazolio group, a quinolinio group, an isoquinolinio group), an isocyano group, an (alkyl or aryl) imino group, a (alkyl or aryl) sulphonyl group, a sulfinyl group, a sulfo group or a salt thereof, a sulfamoyl group, an N-acyl sulfamoyl group, an N-sulfonyl sulfamoyl group or a salt thereof, a phosphino group, a phosphinyl group, a phosphinyloxy group, a phosphinylamino group, a silyl group and the like.

These groups may be bonded to each other to form a composite substituent, and examples of the substituent include an ethoxyethoxyethyl group, a hydroxyethoxyethyl group, an ethoxycarbonylethyl group and the like. Further, $R^{11}$ to $R^{13}$ may contain a phosphoric ester group as a substituent; and the compound of Formula (1) may also contain a plurality of phosphoric ester groups within the same molecule.

The compounds of Formulas (2) and (3) are explained.

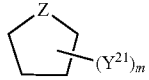

Formula (2)

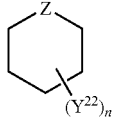

Formula (3)

In Formulas (2) and (3), Z represents a carbon atom, an oxygen atom, a sulfur atom or —$NR^{25}$—, in which $R^{25}$ represents a hydrogen atom or an alkyl group. 5- or 6-membered ring including Z may contain a substituent, a plurality of the substituents may be bonded to each other to form a ring. Examples of 5- or 6-membered ring including Z include tetrahydrofuran, tetrahydropyran, tetrahydrothiophene, thiane, pyrrolidine, piperidine, indoline, isoindoline, chroman, isochroman, tetrahydro-2-furanone, tetrahydro-2-pyrone, 4-butane lactam, 6-hexanolactam, and the like.

Further, examples of the 5- or 6-membered ring including Z include a lactone structure or a lactam structure, i.e., a cyclic ester or cyclic amide structure having an oxo group in the neighboring carbon of Z. Examples of the cyclic ester or cyclic amide structure include 2-pyrrolidone, 2-piperidone, 5-pentanolide and 6-hexanolide.

$R^{25}$ represents a hydrogen atom, or an alkyl group (including (straight-chained, branched and a cyclic alkyl groups) having preferably 1 to 20 carbon atoms, more preferably 1 to 16 carbon atoms, and particularly preferably 1 to 12 carbon atoms. Examples of the alkyl group represented by $R^{25}$ include methyl, ethyl, propyl, isopropyl, butyl, isobutyl, sec-butyl, t-butyl, pentyl, t-amyl, hexyl, octyl, decyl, dodecyl, eicosyl, 2-ethylhexyl, cyclopentyl, cyclohexyl, cycloheptyl, 2,6-dimethyl cyclohexyl, 4-t-butylcyclohexyl, cyclopentyl, 1-adamanthyl, 2-adamanthyl, bicyclo[2.2.2]octane-3-yl and the like. The alkyl group represented by $R^{25}$ may further contain a substituent, and examples of the substituent include those exemplified for the substituent of $R^{11}$ to $R^{13}$.

$Y^{21}$ to $Y^{22}$ each independently represent an ester group, an alkoxycarbonyl group, an amide group or a carbamoyl group. The ester may have preferably 1 to 20 carbon atoms, more preferably 1 to 16 carbon atoms, and particularly preferably 1 to 12 carbon atoms, and examples thereof include acetoxy, ethyl carbonyloxy, propylcarbonyloxy, butylcarbonyloxy, isobutylcarbonyloxy, t-butylcarbonyloxy, sec-butylcarbonyloxy, pentylcarbonyloxy, t-amylcarbonyloxy, hexylcarbonyloxy, cyclohexylcarbonyloxy, 1-ethyl pentylcarbonyloxy, heptylcarbonyloxy, nonylcarbonyloxy, undecylcarbonyloxy, benzylcarbonyloxy, 1-naphthalenecarbonyloxy, 2-naphthalenecarbonyloxy, 1-adamantane carbonyloxy and the like.

The alkoxycarbonyl group may have preferably 1 to 20 carbon atoms, more preferably 1 to 16 carbon atoms, and particularly preferably 1 to 12 carbon atoms, and examples thereof include methoxycarbonyl, ethoxycarbonyl, propyloxycarbonyl, isopropyloxycarbonyl, butoxycarbonyl, t-butoxycarbonyl, isobutyloxycarbonyl, sec-butyloxycarbonyl, pentyloxycarbonyl, t-amyloxycarbonyl, hexyloxycarbonyl, cyclohexyloxycarbonyl, 2-ethyl-hexyl-hydroxycarbonyl, 1-ethylpropyloxycarbonyl, octyloxycarbonyl, 3,7-dimethyl-3-octyloxycarbonyl, 3,5,5-trimethyl hexyloxycarbonyl, 4-t-butylcyclohexyloxycarbonyl, 2,4-dimethyl pentyl-3-oxycarbonyl, 1-adamantaneoxycarbonyl, 2-adamantaneoxycarbonyl, dicyclopentadienyloxycarbonyl, decyloxycarbonyl, dodecyloxycarbonyl, tetradecyloxycarbonyl, hexadecyloxycarbonyl and the like.

The amide group may have preferably 1 to 20 carbon atoms, more preferably 1 to 16 carbon atoms, and particularly preferably 1 to 12 carbon atoms, and examples thereof include acetamide, ethylcarboxamide, propylcarboxamide, isopropylcarboxamide, butylcarboxamide, t-butylcarboxamide, isobutylcarboxamide, sec-butylcarboxamide, pentylcarboxamide, t-amylcarboxamide, N-hexylcarboxamide, cyclohexylcarboxamide, 1-ethyl pentylcarboxamide, 1-ethylpropylcarboxamide, heptylcarboxamide, octylcarboxamide, 1-adamantanecarboxamide, 2-adamantanecarboxamide, nonylcarboxamide, dodecylcarboxamide, pentacarboxamide, hexadecyl carboxamide and the like.

The carbamoyl group may have preferably 1 to 20 carbon atoms, more preferably 1 to 16 carbon atoms, and particularly preferably 1 to 12 carbon atoms, and examples thereof include methylcarbamoyl, dimethylcarbamoyl, ethylcarbamoyl, diethylcarbamoyl, propylcarbamoyl, isopropylcarbamoyl, butylcarbamoyl, t-butylcarbamoyl, isobutylcarbamoyl, sec-butylcarbamoyl, pentylcarbamoyl, t-amylcarbamoyl, hexylcarbamoyl, cyclohexylcarbamoyl, 2-ethylhexylcarbamoyl, 2-ethyl butylcarbamoyl, t-octylcarbamoyl, heptylcarbamoyl, octylcarbamoyl, 1-adamantanecarbamoyl, 2-adamantanecarbamoyl, decylcarbamoyl, dodecylcarbamoyl, tetradecylcarbamoyl, hexadecyl carbamoyl and the like. $Y^{21}$ to $Y^{22}$ may be bonded to each other to form a ring. $Y^{21}$ to $Y^{22}$ may further contain a substituent, and examples of the substituent include those exemplified for the substituent of $R^{11}$ to $R^{13}$.

The compounds of Formulas (4) to (12) are explained.

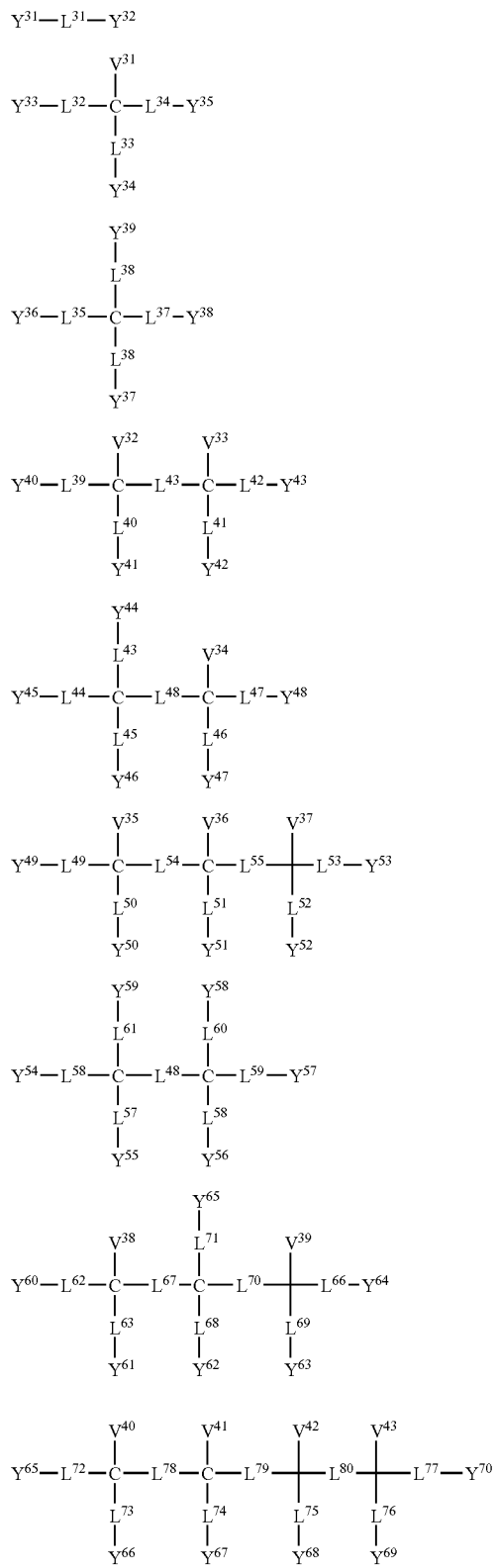

In Formulas (4) to (12), $Y^{31}$ to $Y^{70}$ each independently represent an ester group, an alkoxycarbonyl group, an amide group, a carbamoyl group or a hydroxyl group. The ester group may have preferably 1 to 20 carbon atoms, more preferably 1 to 16 carbon atoms, and particularly preferably 1 to 12 carbon atoms, and examples thereof include acetoxy, ethylcarbonyloxy, propylcarbonyloxy, butylcarbonyloxy, isobutylcarbonyloxy, t-butylcarbonyloxy, sec-butylcarbonyloxy, pentylcarbonyloxy, t-amylcarbonyloxy, hexylcarbonyloxy, cyclohexylcarbonyloxy, 1-ethyl pentylcarbonyloxy, heptylcarbonyloxy, nonylcarbonyloxy, undecylcarbonyloxy, benzylcarbonyloxy, 1-naphthalenecarbonyloxy, 2-naphthalenecarbonyloxy, 1-adamantane carbonyloxy and the like.

The alkoxycarbonyl group may have preferably 1 to 20 carbon atoms, more preferably 1 to 16 carbon atoms, and particularly preferably 1 to 12 carbon atoms, and examples thereof include 1-ethylpropyloxycarbonyl, octyloxycarbonyl, 3,7-dimethyl-3-octyloxycarbonyl, 3,5,5-trimethyl hexyloxycarbonyl, 4-t-butylcyclohexyloxycarbonyl, 2,4-dimethyl pentyl-3-oxycarbonyl, 1-adamantaneoxycarbonyl, 2-adamantaneoxycarbonyl, dicyclopentadienyloxycarbonyl, decyloxycarbonyl, dodecyloxycarbonyl, tetradecyloxycarbonyl, hexadecyloxycarbonyl are given methoxycarbonyl, ethoxycarbonyl, propyloxycarbonyl, isopropyloxycarbonyl, butoxycarbonyl, t-butoxycarbonyl, isobutyloxycarbonyl, sec-butyloxycarbonyl, pentyloxycarbonyl, t-amyloxycarbonyl, hexyloxycarbonyl, cyclohexyloxycarbonyl, 2-ethylhexyl-hydroxycarbonyl and the like.

The amide group may have preferably 1 to 20 carbon atoms, more preferably 1 to 16 carbon atoms, and particularly preferably 1 to 12 carbon atoms, and examples thereof include acetamide, ethyl carboxamide, propyl carboxamide, isopropyl carboxamide, butyl carboxamide, t-butyl carboxamide, isobutyl carboxamide, sec-butyl carboxamide, pentyl carboxamide, t-amyl carboxamide, hexyl carboxamide, cyclohexyl carboxamide, 1-ethyl pentyl carboxamide, 1-ethylpropyl carboxamide, heptyl carboxamide, octyl carboxamide, 1-adamantane carboxamide, 2-adamantane carboxamide, nonyl carboxamide, dodecyl carboxamide, pentacarboxamide, hexadecyl carboxamide and the like.

The carbamoyl group may have preferably 1 to 20 carbon atoms, more preferably 1 to 16 carbon atoms, and particularly preferably 1 to 12 carbon atoms, and examples thereof include methylcarbamoyl, dimethylcarbamoyl, ethyl carbamoyl, diethylcarbamoyl, propyl carbamoyl, isopropyl carbamoyl, butyl carbamoyl, t-butyl carbamoyl, isobutyl carbamoyl, sec-butyl carbamoyl, pentyl carbamoyl, t-amyl carbamoyl, hexylcarbamoyl, cyclohexyl carbamoyl, 2-ethylhexyl carbamoyl, 2-ethyl butyl carbamoyl, t-octyl carbamoyl, heptyl carbamoyl, octyl carbamoyl, 1-adamantane carbamoyl, 2-adamantane carbamoyl, decyl carbamoyl, dodecyl carbamoyl, tetradecyl carbamoyl, hexadecyl carbamoyl and the like $Y^{31}$ to $Y^{70}$ may further contain a substituent, and examples of the substituent include those exemplified for the substituent of $R^{11}$ to $R^{13}$.

$V^{31}$ to $V^{43}$ each independently represent a hydrogen atom, or an aliphatic group having preferably 1 to 20 carbon atoms, more preferably 1 to 16 carbon atoms, and particularly preferably 1 to 12 carbon atoms. Herein, the aliphatic group is preferably an aliphatic hydrocarbon group, more preferably an alkyl group (including straight-chained, branched and cyclic alkyl groups), an alkenyl group or an alkynyl group. Examples of the alkyl group include methyl, ethyl, propyl, isopropyl, butyl, isobutyl, sec-butyl, t-butyl, pentyl, t-amyl, hexyl, octyl, decyl, dodecyl, eicosyl, 2-ethylhexyl, cyclopentyl, cyclohexyl, cycloheptyl, 2,6-dimethyl cyclohexyl, 4-t-butylcyclohexyl, cyclopentyl, 1-adamanthyl, 2-adamanthyl, bicyclo[2.2.2]octane-3-yl and the like; examples of the alkenyl group include vinyl, allyl, prenyl, geranyl, oleyl, 2-cyclopentene-1-yl, 2-cyclohexene-1-yl and the like; and examples of the alkynyl group include ethynyl, propargyl and the like. $V^{31}$ to $V^{43}$ may further contain a substituent, and examples of the substituent include those exemplified for the substituent of $R^{11}$ to $R^{13}$.

$L^{31}$ to $L^{80}$ each independently represent a divalent saturated linkage having 0 to 40 atoms. Herein, the description, "$L^{31}$ to $L^{80}$ having 0 atom" means that the groups at both the ends of the linkage directly form a single bond. Preferred examples of $L^{31}$ to $L^{77}$ include an alkylene group (for example, methylene, ethylene, propylene, trimethylene, tetramethylene, pentamethylene, hexamethylene, methylethylene, ethylethylene and the like), a cyclic divalent group (for example, cis-1,4-cyclohexylene, trans-1,4-cyclohexylene, 1,3-cyclopentylidene and the like), ether, thioether, ester, amide, sulfone, sulfoxide, sulfide, sulfonamide, ureylene, thioureylene and the like. Examples of the composite substituent include —(CH$_2$)$_2$O(CH$_2$)$_2$—, —(CH$_2$)$_2$O(CH$_2$)$_2$O(CH$_2$)—, —(CH$_2$)$_2$S(CH$_2$)$_2$—, —(CH$_2$)$_2$O$_2$C(CH$_2$)$_2$— and the like. $L^{31}$ to $L^{80}$ may further contain a substituent, and examples of the substituent include those exemplified for the substituent of $R^{11}$ to $R^{13}$.

Preferred examples of the compound formed by combinations of $Y^{31}$ to $Y^{70}$, $V^{31}$ to $V^{43}$ and $L^{31}$ to $L^{80}$ include citric acid esters (for example, O-acetyl triethyl citrate, O-acetyl tributyl citrate, acetyl triethyl citrate, acetyl tributyl citrate, O-acetyl tri(ethyloxycarbonyl methylene) citrate and the like), oleic acid esters (for example, ethyl oleate, butyl oleate, 2-ethylhexyl oleate, phenyl oleate, cyclohexyl oleate, octyl oleate and the like), ricinoleic acid esters (for example, methyl acetyl ricinoleate and the like), sebacic acid esters (for example, dibutyl sebacate and the like), carboxylic acid esters of glycerin (for example, triacetin, tributyrin and the like), glycolic acid esters (for example, butyl-phthalyl-butyl glycolate, ethyl phthalylethyl glycolate, methyl phthalylethyl glycolate, butyl-phthalyl-butyl glycolate, methyl phthalyl methyl glycolate, propyl phthalyl propyl glycolate, butyl-phthalyl-butyl glycolate, octyl phthalyl octyl glycolate and the like), carboxylic acid esters of pentaerythritol (for example, pentaerythritol tetraacetate, pentaerythritol tetraacetate and the like), carboxylate of dipentaerythritol (for example, dipentaerythritol hexaacetate, dipentaerythritol hexabutylate, dipentaerythritol tetraacetate and the like), carboxylic acid esters of trimethylolpropane (trimethylolpropane triacetate, trimethylolpropane diacetate, trimethylolpropane monopropionate, trimethylolpropane tripropionate, trimethylolpropane tributylate, trimethylolpropane tripivaloate, trimethylolpropane tri(t-butyl acetate), trimethylolpropane di-2-ethylhexanate, trimethylolpropane tetra-2-ethylhexanate, trimethylolpropane diacetate monooctanate, trimethylolpropane trioctanate, trimethylolpropane tri(cyclohexane carboxylate) and the like), glycerol esters as described in JP-A No. 11-246704, diglycerol esters as described in JP-A. No. 2000-63560, citric acid esters as described in JP-A. No. 11-92574, pyrrolidone carboxylic acid esters (methyl 2-pyrrolidone-5-carboxylate, ethyl 2-pyrrolidone-5-carboxylate, 2-pyrrolidone-5-butyl carboxylate, 2-ethylhexyl 2-pyrrolidone-5-carboxylate), cyclohexanedicarboxylic acid esters (dibutyl 1,2-cis-cyclohexanedicarboxylate, dibutyl trans-1,2-cyclohexanedicarboxylate, dibutyl cis-1,4-cyclohexanedicarboxylate, dibutyl trans-1,4-cyclohexanedicarboxylate), xylitol carboxylic esters ate(xylitol pentaacetate, xylitol tetraacetate, xylitol pentapropionate.

Hereinbelow, examples of the compound of the invention represented by Formulas (1) to (12) are given. For Formula (1), Compounds C-1 to C-76 are given, and for Formulas (2) to (12), Compounds C-201 to C-231, C-401 to C-448 are given. The values of log P as described in the tables or in the parenthesis are determined according to a Crippen's fragmentation method (J. Chem. Inf. Comput. Sci., 27, 21 (1987).

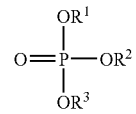

wherein $R^1$ to $R^3$ have the same meanings as $R^{11}$ to $R^{13}$ in the above-described Formula (1), and specific examples thereof are shown below as Compounds C-1 to C-76.

| compound | R$^1$ | R$^2$ | R$^3$ | log P |
|---|---|---|---|---|
| C-1 | CH$_3$ | C$_2$H$_5$ | C$_2$H$_5$ | 1.24 |
| C-2 | C$_2$H$_5$ | C$_2$H$_5$ | C$_2$H$_5$ | 1.58 |
| C-3 | C$_3$H$_7$ | C$_3$H$_7$ | C$_3$H$_7$ | 2.99 |
| C-4 | i-C$_3$H$_7$ | i-C$_3$H$_7$ | tributyl | 2.82 |
| C-5 | C$_4$H$_9$ | C$_4$H$_9$ | C$_4$H$_9$ | 4.18 |
| C-6 | i-C$_4$H$_9$ | i-C$_4$H$_9$ | i-C$_4$H$_9$ | 4.2 |
| C-7 | s-C$_4$H$_9$ | s-C$_4$H$_9$ | s-C$_4$H$_9$ | 4.23 |
| C-8 | t-C$_4$H$_9$ | t-C$_4$H$_9$ | t-C$_4$H$_9$ | 3.06 |
| C-9 | C$_5$H$_{11}$ | C$_5$H$_{11}$ | C$_5$H$_{11}$ | 5.37 |
| C-10 | CH$_2$C(CH$_3$)$_3$ | CH$_2$C(CH$_3$)$_3$ | CH$_2$C(CH$_3$)$_3$ | 5.71 |
| C-11 | c-C$_5$H$_9$ | c-C$_5$H$_9$ | c-C$_5$H$_9$ | 4.12 |
| C-12 | 1-ethylpropyl | 1-ethylpropyl | 1-ethylpropyl | 5.63 |
| C-13 | C$_6$H$_{13}$ | C$_6$H$_{13}$ | C$_6$H$_{13}$ | 6.55 |
| C-14 | c-C$_6$H$_{11}$ | c-C$_6$H$_{11}$ | c-C$_6$H$_{11}$ | 5.31 |
| C-15 | C$_7$H$_{15}$ | C$_7$H$_{15}$ | C$_7$H$_{15}$ | 7.74 |
| C-16 | 4-methylcyclohexyl | 4-methylcyclohexyl | 4-methylcyclohexyl | 6.3 |
| C-17 | 4-t-butylcyclohexyl | 4-t-butylcyclohexyl | 4-t-butylcyclohexyl | 9.78 |
| C-18 | C$_8$H$_{17}$ | C$_8$H$_{17}$ | C$_8$H$_{17}$ | 8.93 |
| C-19 | 2-ethylhexyl | 2-ethylhexyl | 2-ethylhexyl | 8.95 |
| C-20 | 3-methylbutyl | 3-methylbutyl | 3-methylbutyl | 5.17 |
| C-21 | 1,3-dimehylbutyl | 1,3-dimehylbutyl | 1,3-dimehylbutyl | 6.41 |
| C-22 | 1-isopropyl-2-methylpropyl | 1-isopropyl-2-methylpropyl | 1-isopropyl-2-methylpropyl | 8.05 |
| C-23 | 2-ethylbutyl | 2-ethylbutyl | 2-ethylbutyl | 6.57 |
| C-24 | 3,5,5-trimethylhexyl | 3,5,5-trimethylhexyl | 3,5,5-trimethylhexyl | 9.84 |
| C-25 | cyclohexylmethyl | cyclohexylmethyl | cyclohexylmethyl | 6.25 |

-continued

| compound | R¹ | R² | R³ | log P |
|---|---|---|---|---|
| C-26 | $CH_3$ | $CH_3$ | 2-ethylhexyl | 3.35 |
| C-27 | $CH_3$ | $CH_3$ | 1-adamantyl | 2.27 |
| C-28 | $CH_3$ | $CH_3$ | $C_{12}H_{25}$ | 4.93 |
| C-29 | $C_2H_5$ | $C_2H_5$ | 2-ethylhexyl | 4.04 |
| C-30 | $C_2H_5$ | $C_2H_5$ | 1-adamantyl | 2.96 |
| C-31 | $C_2H_5$ | $C_2H_5$ | $C_{12}H_{25}$ | 5.62 |
| C-32 | $C_4H_9$ | $C_4H_9$ | cyclohexyl | 4.55 |
| C-33 | $C_4H_9$ | $C_4H_9$ | $C_6H_{13}$ | 4.97 |
| C-34 | $C_4H_9$ | $C_4H_9$ | $C_8H_{17}$ | 5.76 |
| C-35 | $C_4H_9$ | $C_4H_9$ | 2-ethylhexyl | 5.77 |
| C-36 | $C_4H_9$ | $C_4H_9$ | $C_{10}H_{21}$ | 6.55 |
| C-37 | $C_4H_9$ | $C_4H_9$ | $C_{12}H_{25}$ | 7.35 |
| C-38 | $C_4H_9$ | $C_4H_9$ | 1-adamantyl | 4.69 |
| C-39 | $C_4H_9$ | $C_4H_9$ | $C_{16}H_{33}$ | 8.93 |
| C-40 | $C_4H_9$ | $C_4H_9$ | dicyclopentadienyl | 4.68 |
| C-41 | $C_6H_{13}$ | $C_6H_{13}$ | $C_{14}H_{29}$ | 9.72 |
| C-42 | $C_6H_{13}$ | $C_6H_{13}$ | $C_8H_{17}$ | 7.35 |
| C-43 | $C_6H_{13}$ | $C_6H_{13}$ | 2-ethylhexyl | 7.35 |
| C-44 | $C_6H_{13}$ | $C_6H_{13}$ | $C_{10}H_{21}$ | 8.14 |
| C-45 | $C_6H_{13}$ | $C_6H_{13}$ | $C_{12}H_{25}$ | 8.93 |
| C-46 | $C_6H_{13}$ | $C_6H_{13}$ | 1-adamantyl | 6.27 |
| C-47 | 4-chlorobutyl | 4-chlorobutyl | 4-chlorobutyl | 4.18 |
| C-48 | 4-chlorohexyl | 4-chlorohexyl | 4-chlorohexyl | 6.55 |
| C-49 | 4-bromobutyl | 4-bromobutyl | 4-bromobutyl | 4.37 |
| C-50 | 4-bromobutyl | 4-bromobutyl | 4-bromohexyl | 6.74 |
| C-51 | $(CH_2)_2OCH_2CH_3$ | $(CH_2)_2OCH_2CH_3$ | $(CH_2)_2OCH_2CH_3$ | 1.14 |
| C-52 | $C_8H_{17}$ | $C_8H_{17}$ | $(CH_2)_2O(CH_2)_2OCH_2CH_3$ | 6.55 |
| C-53 | $C_6H_{13}$ | $C_6H_{13}$ | $(CH_2)_2O(CH_2)_2OCH_2CH_3$ | 4.96 |
| C-54 | $C_4H_9$ | $C_4H_9$ | $(CH_2)_2O(CH_2)_2OCH_2CH_3$ | 3.38 |
| C-55 | $C_4H_9$ | $C_4H_9$ | $(CH_2)_2O(CH_2)_2OCH_2OH$ | 2.59 |
| C-56 | $C_6H_{13}$ | $C_6H_{13}$ | $(CH_2)_2O(CH_2)_2OCH_2OH$ | 4.18 |
| C-57 | $C_8H_{17}$ | $C_8H_{17}$ | $(CH_2)_2O(CH_2)_2OCH_2OH$ | 5.76 |
| C-58 | $C_4H_9$ | $(CH_2)_2O(CH_2)_2OCH_2OH$ | $(CH_2)_2O(CH_2)_2OCH_2OH$ | 2.2 |
| C-59 | $C_4H_9$ | $C_4H_9$ | $CH_2CH=CH_2$ | 4.19 |
| C-60 | $C_4H_9$ | $CH_2CH=CH_2$ | $CH_2CH=CH_2$ | 3.64 |
| C-61 | $(CH_2)_2CO_2CH_2CH_3$ | $(CH_2)_2CO_2CH_2CH_3$ | $(CH_2)_2CO_2CH_2CH_3$ | 1.1 |
| C-62 | $(CH_2)_2CO_2(CH_2)_3CH_3$ | $(CH_2)_2CO_2(CH_2)_3CH_3$ | $(CH_2)_2CO_2(CH_2)_3CH_3$ | 3.69 |
| C-63 | $(CH_2)_2CONH(CH_2)_3CH_3$ | $(CH_2)_2CONH(CH_2)_3CH_3$ | $(CH_2)_2CONH(CH_2)_3CH_3$ | 1.74 |
| C-64 | $C_4H_9$ | $C_4H_9$ | $(CH_2)_4OP=O(OC_4H_9)_2$ | 6.66 |
| C-65 | $C_4H_9$ | $C_4H_9$ | $(CH_2)_3OP=O(OC_4H_9)_2$ | 6.21 |
| C-66 | $C_4H_9$ | $C_4H_9$ | $(CH_2)_2OP=O(OC_4H_9)_2$ | 6.16 |
| C-67 | $C_4H_9$ | $C_4H_9$ | $(CH_2)_2O(CH_2)_2OP=O(OC_4H_9)_2$ | 5.99 |
| C-68 | $C_6H_{13}$ | $C_6H_{13}$ | $(CH_2)_2O(CH_2)_2OP=O(OC_4H_9)_2$ | 7.58 |
| C-69 | $C_6H_{13}$ | $C_6H_{13}$ | $(CH_2)_2OP=O(OC_4H_9)_2$ | 8.25 |
| C-70 | $c-C_6H_{11}$ | $c-C_6H_{11}$ | $(CH_2)_2O(CH_2)_2OP=O(OC_4H_9)_2$ | 6.35 |
| C-71 | $C_6H_{12}Cl$ | $C_6H_{12}Cl$ | $(CH_2)_2O(CH_2)_2OP=O(OC_4H_9)_2$ | 7.18 |
| C-72 | $C_4H_8Cl$ | $C_4H_8Cl$ | $(CH_2)_2O(CH_2)_2OP=O(OC_4H_9)_2$ | 5.6 |
| C-73 | $C_4H_8Cl$ | $C_4H_8Cl$ | $(CH_2)_2O(CH_2)_2OP=O(OC_4H_8Cl)_2$ | 5.59 |
| C-74 | $C_4H_9$ | $C_4H_9$ | 2-tetrahydrofuranyl | 3.27 |
| C-75 | $C_4H_9$ | 2-tetrahydrofuranyl | 2-tetrahydrofuranyl | 2.36 |
| C-76 | 2-tetrahydrofuranyl | 2-tetrahydrofuranyl | 2-tetrahydrofuranyl | 1.45 |

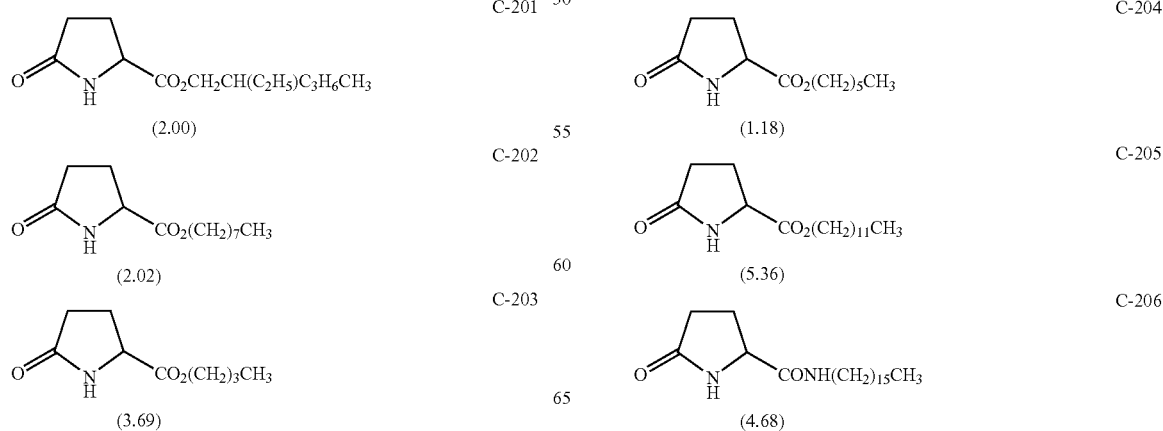

-continued

C-207

![structure] CONHCH₂CH(C₂H₅)C₃H₆CH₃ pyrrolidinone
(1.32)

![structure] 6-oxo-piperidine-CO₂CH₂CH(C₂H₅)C₃H₆CH₃
(2.42)

![structure] 6-oxo-piperidine-CO₂(CH₂)₁₁CH₃
(4.10)

![structure] 6-oxo-piperidine-CO₂(CH₂)₁₅CH₃
(5.77)

![structure] 6-oxo-piperidine-CONH(CH₂)₁₁CH₃
(3.43)

![structure] cyclohexane-1,2-di-CO₂C₄H₉
(3.84)

![structure] cyclohexane-1,2-di-CO₂C₆H₁₃
(5.51)

![structure] cyclohexane-1,2-di-CO₂CH₂CH(C₂H₅)C₃H₆CH₃
(7.14)

C-208

![structure] cyclohexane-1,4-di-CO₂C₄H₉
(3.84)

C-209

C-210

C-211

C-212

C-213

C-214

C-215

C-216 cyclohexane-1,4-di-CO₂C₆H₁₃
(5.51)

C-217 cyclohexane-1,4-di-CO₂CH₂CH(C₂H₅)C₃H₆CH₃
(7.14)

C-218 tetrahydrofuran-CO₂CH₂CH(C₂H₅)C₃H₆CH₃
(2.98)

C-219 tetrahydrothiophene-CO₂CH₂CH(C₂H₅)C₃H₆CH₃
(3.70)

C-220 sugar tetraester with OCCH₂CH₃ groups
(2.15)

C-221 sugar tetraester with O₂C(CH₂)₂CH₃ groups
(4.45)

C-222 sugar with HO and propionate esters
(1.27)

C-223 sugar tetraester with O₂C(CH₂)₃CH₃ groups
(6.53)

-continued

C-224

H3CH2COCO—[cyclohexane with O2CCH2CH3, O2CCH2CH3, O2CCH2CH3, O2CCH2CH3]—O2CCH2CH3 / H3CH2COCO (2.23)

C-225

H3C(H2C)3OCO—[cyclohexane with O2C(CH2)2CH3 groups ×4]—O2C(CH2)2CH3 / H3C(H2C)3OCO (5.01)

C-226

H3CH2COCO—[cyclohexane with O2CCH2CH3 ×3, OH]—O2CCH2CH3 / H3CH2COCO / OH (1.31)

C-227

H3C(H2C)3OCO—[cyclohexane with O2C(CH2)3CH3 ×3, OH]—O2C(CH2)3CH3 / H3C(H2C)3OCO / OH (5.69)

C-228

H3CH2CO2C—[cyclohexane]—CO2CH2CH3 (×4)

(1.56)

C-229

H3C(H2C)2O2C—[cyclohexane]—CO2(CH2)2CH3 (×4)

(3.51)

C-230

H3C(H2C)3O2C—[cyclohexane]—CO2(CH2)3CH3 (×4)

(5.18)

-continued

C-231

[cyclohexyl]—NHCOCH2C(CH2CH3)(CH2)3CH3

(3.90)

C-401

CO2C4H9
|
CO2C4H9

(2.37)

C-402

CO2C8H17
|
CO2C8H17

(5.71)

C-403

C12H25—CH(CO2C4H9)—CH2—CO2C4H9

(7.53)

C-404

C12H25—CH(CO2C2H5)—CH2—CO2C2H5

(5.72)

C-405

O—CO—C3H17 / O—CO—C3H17 (ethylene diester)

(1.81)

C-406

O—CO—t-Bu / O—CO—t-Bu (ethylene diester)

(3.52)

C-407

O—CO—CH(C2H5)(CH2)3CH3 / O—CO—CH(C2H5)(CH2)3CH3 (ethylene diester)

(5.45)

C-408

C3H7OCO—O—CH2CH2—O—CH2CH2—O—COC3H7

(1.66)

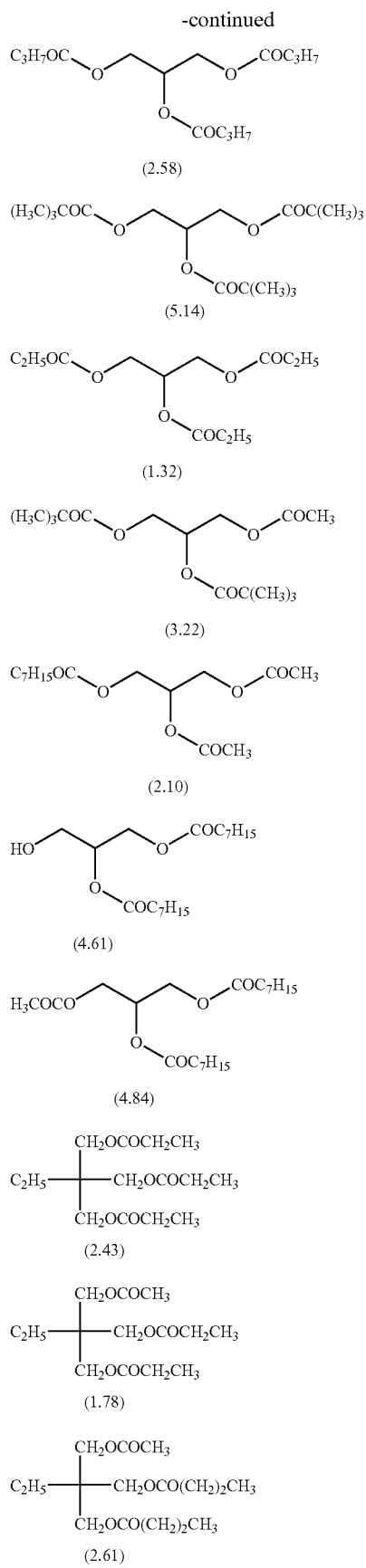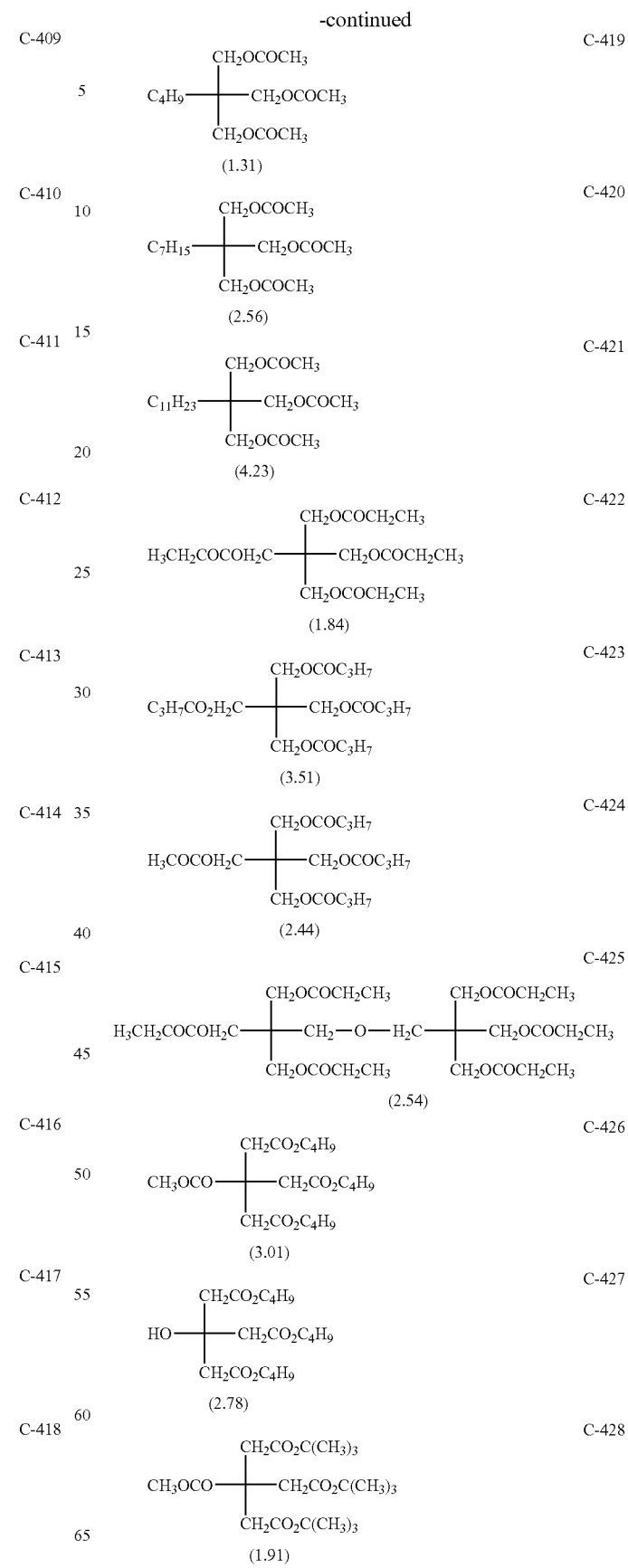

-continued
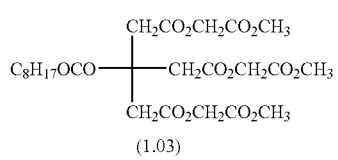
(1.03)
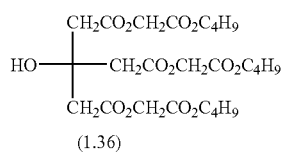
(1.36)
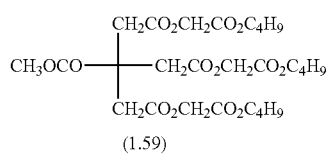
(1.59)
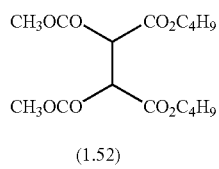
(1.52)
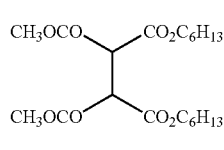
(3.19)
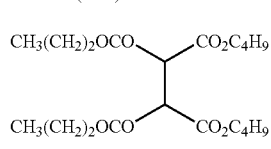
(3.66)
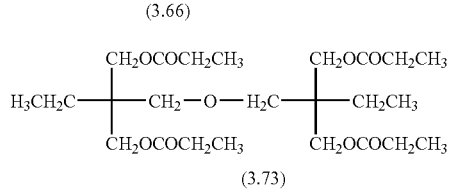
(3.73)
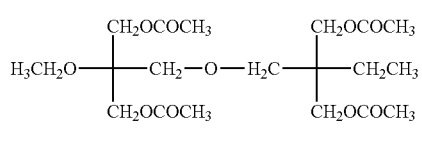
(1.12)
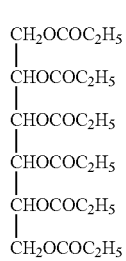
(2.36)
-continued
C-429
C-430
C-431
C-432
C-433
C-434
C-435
C-436
C-437
C-438
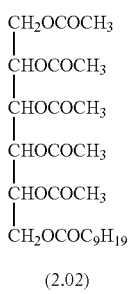
(2.02)
C-439
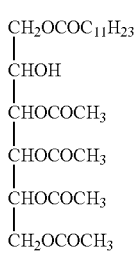
(2.62)
C-440
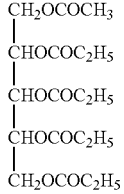
(1.36)
C-441
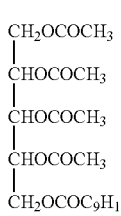
(2.32)
C-442
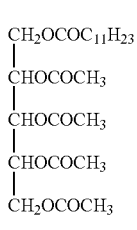
(3.16)
C-443
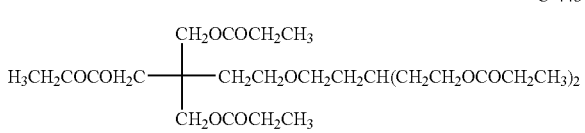
(3.37)

-continued

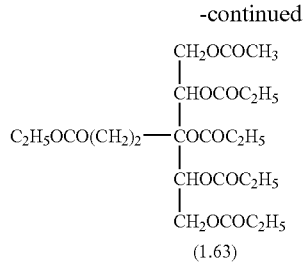
(1.63)

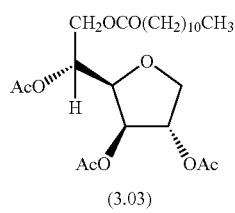
(3.03)

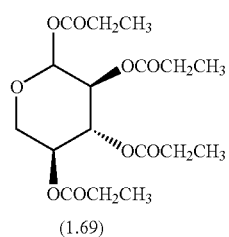
(1.69)

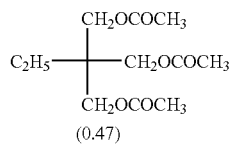
(0.47)

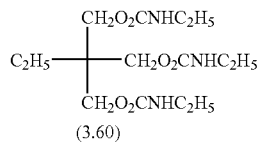
(3.60)

The compounds of Formulas (13) and (14) are explained below.

Formula (13)

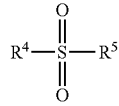
Formula (14)

In Formula (13), $R^1$ represents an alkyl group or an aryl group, and $R^2$ and $R^3$ each independently represent a hydrogen atom, an alkyl group or an aryl group. Further, the total number of the carbon atoms of $R^1$, $R^2$ and $R^3$ is particularly preferably 10 or greater. In Formula (14), $R^4$ and $R^5$ each independently represent an alkyl group or an aryl group. Further, the total number of the carbon atoms of $R^4$ and $R^5$ is 10 or greater, and each of $R^4$ and $R^5$ may have an alkyl group and an aryl group substituted. The substituent is preferably a fluorine atom, an alkyl group, an aryl group, an alkoxyl group, a sulfone group and a sulfonamide group, and particularly preferably, an alkyl group, an aryl group, an alkoxyl group, a sulfone group and a sulfonamide group. Further, the alkyl group may be straight-chained, branched or cyclic, and preferably has 1 to 25 carbon atoms, more preferably 6 to 25 carbon atoms, and particularly preferably 6 to 20 carbon atoms (for example, methyl, ethyl, propyl, isopropyl, butyl, isobutyl, t-butyl, amyl, isoamyl, t-amyl, hexyl, cyclohexyl, heptyl, octyl, bicyclo octyl, nonyl, adamanthyl, decyl, t-octyl, undecyl, dodecyl, tridecyl, tetradecyl, pentadecyl, hexadecyl, heptadecyl, octadecyl, nonadecyl, didecyl). The aryl group preferably has 6 to 30 carbon atoms, and particularly preferably 6 to 24 carbon atoms (for example, phenyl, biphenyl, terphenyl, naphthyl, binaphthyl, triphenyl phenyl). Preferred examples of the compounds represented by Formula (13) or Formula (14) are given below.

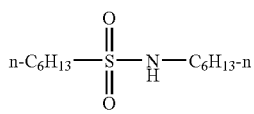
A-1

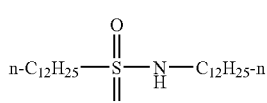
A-2

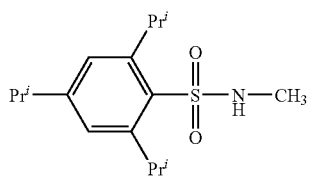
A-3

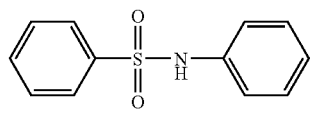
A-4

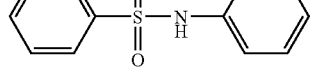

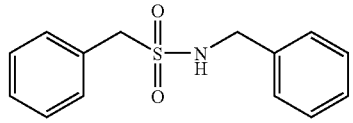
A-5

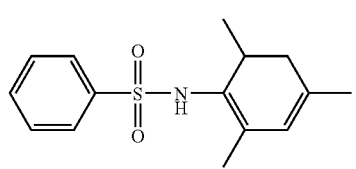
A-6

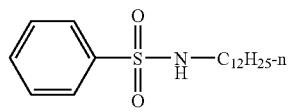
A-7

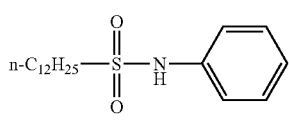
A-8

-continued
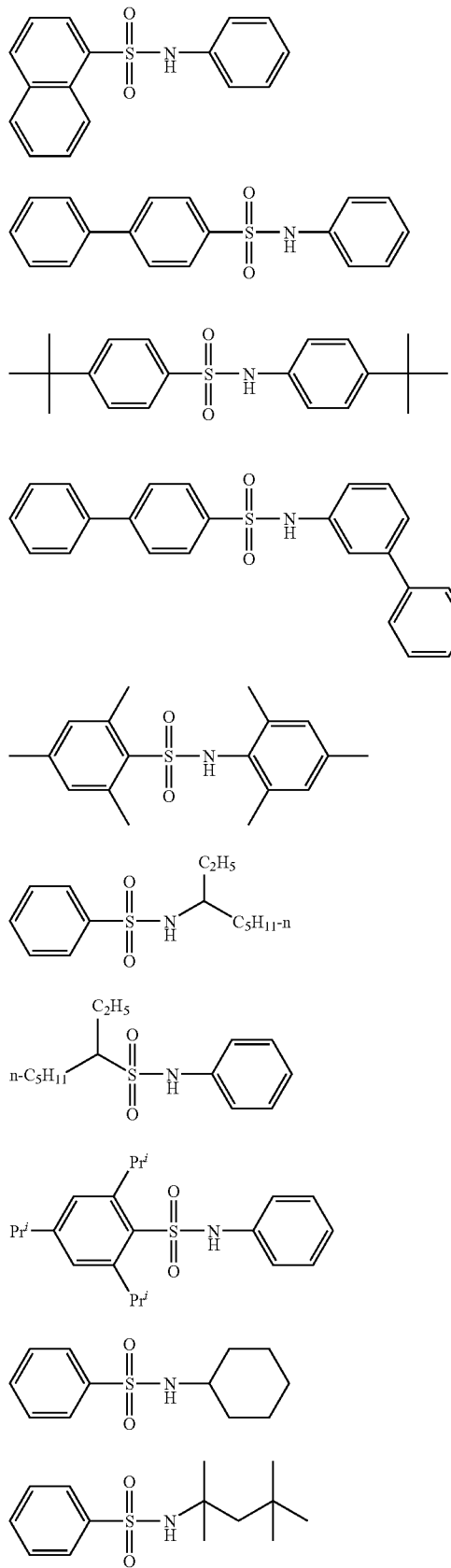
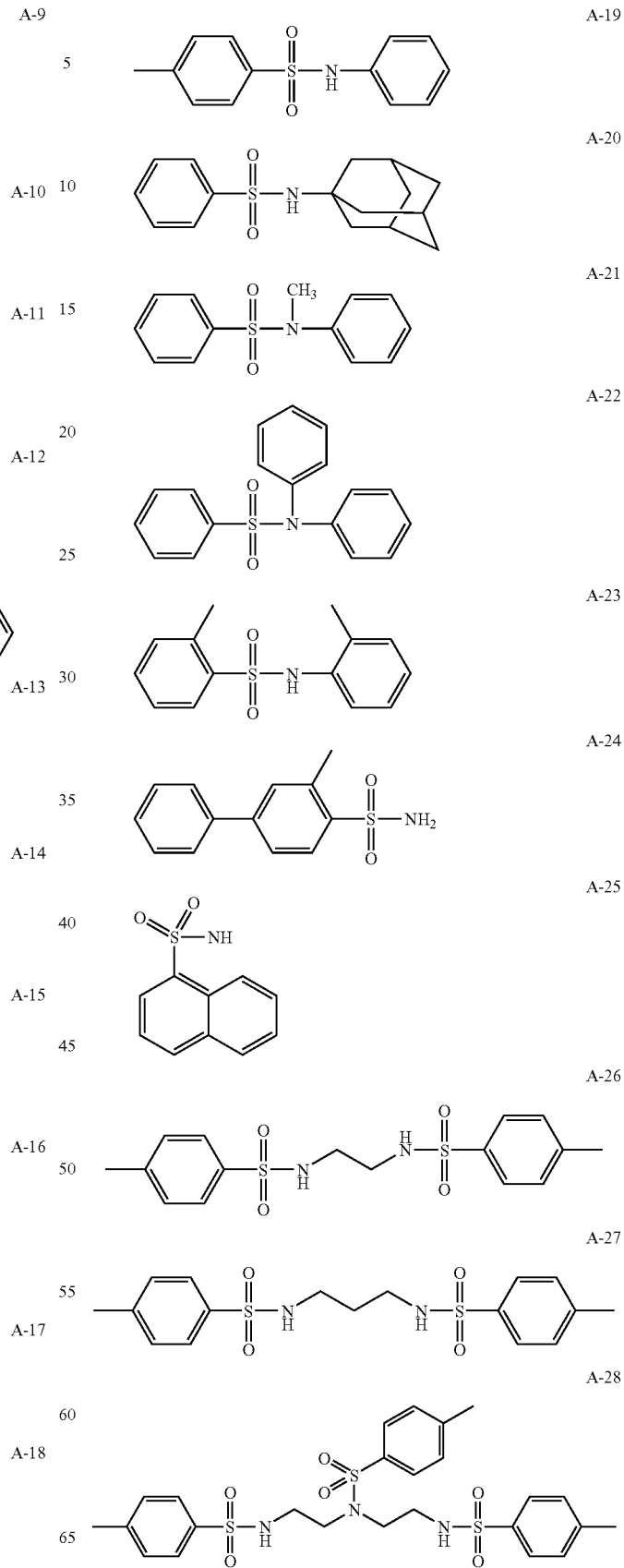

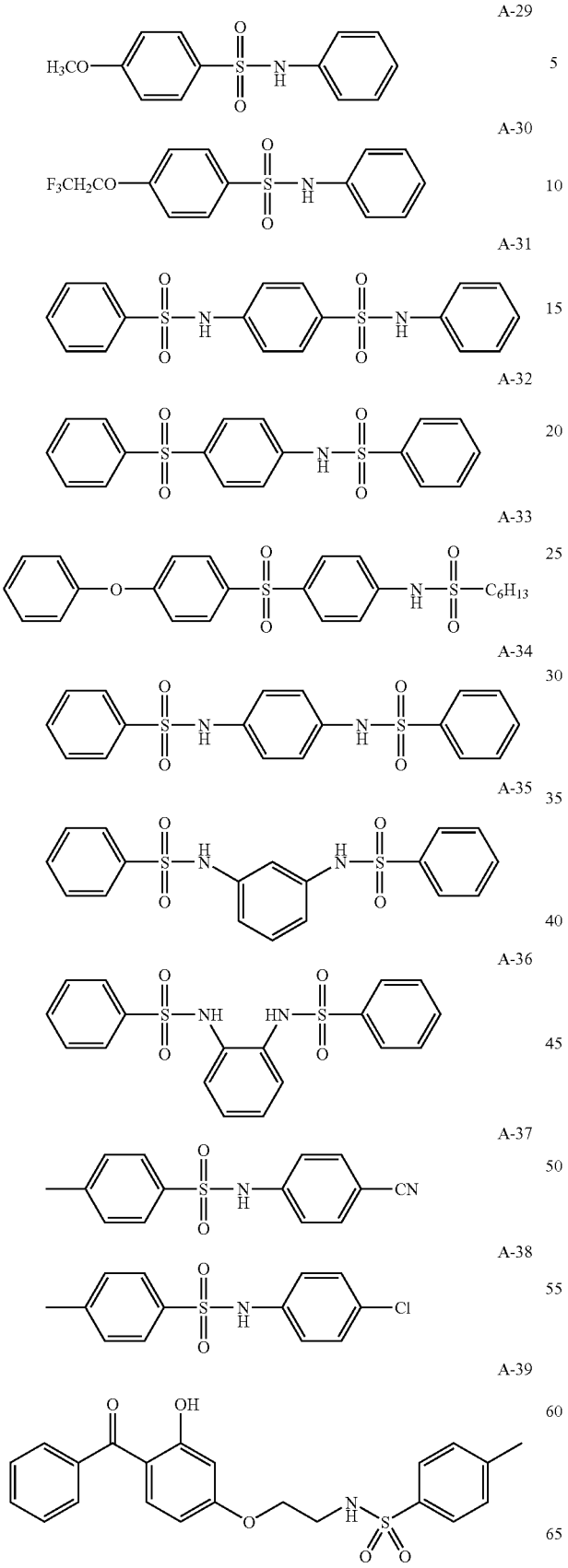

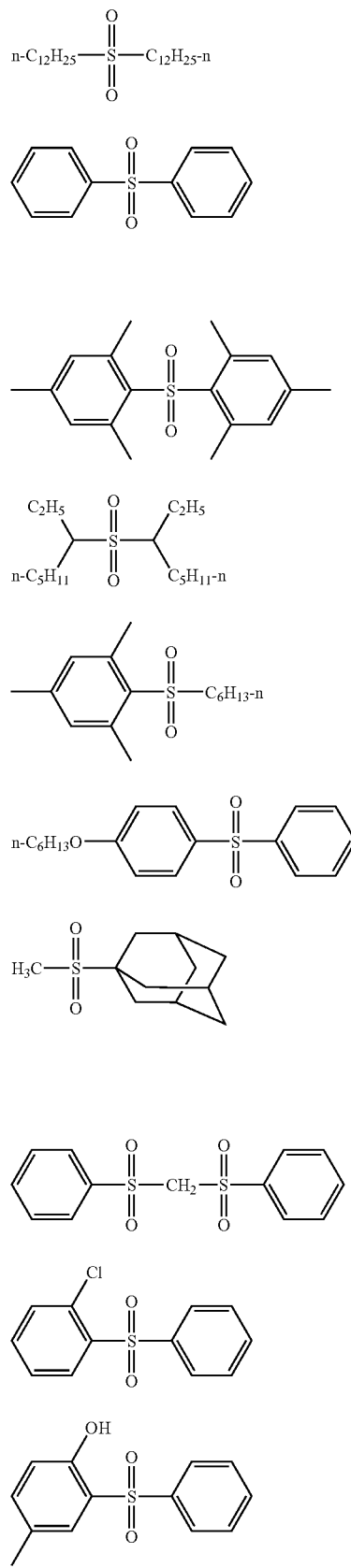

-continued
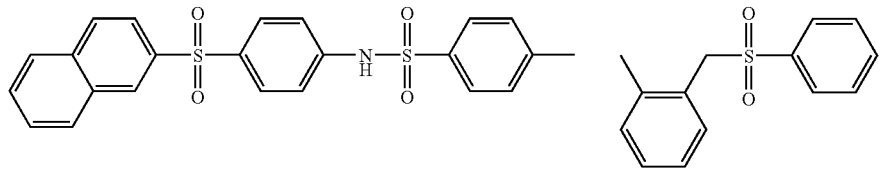
B-21
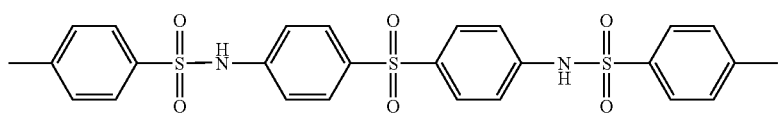
B-22
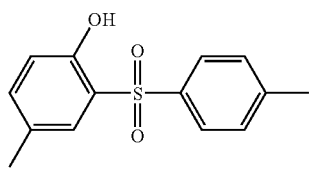
B-23
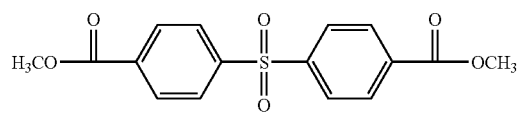
B-24
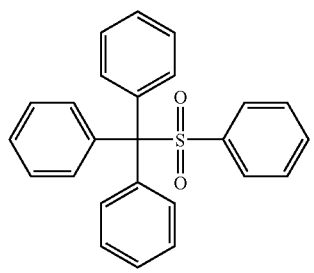
B-25
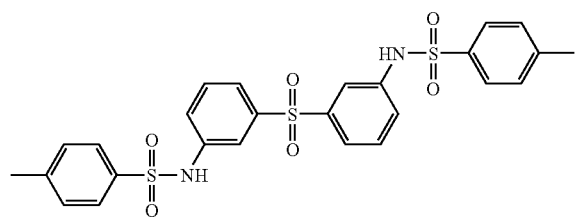
B-26
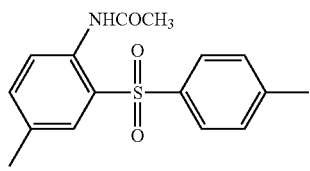
B-27
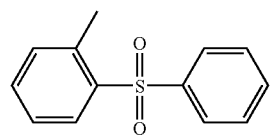
B-28
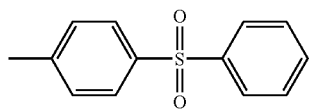
B-29
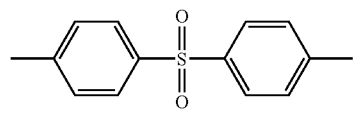
B-30
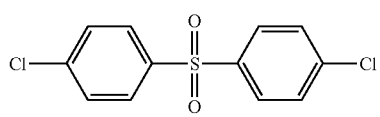
B-31
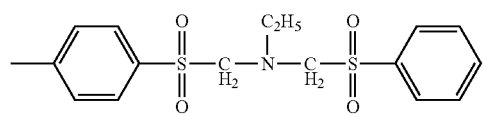
B-32
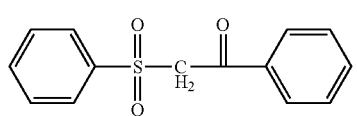
B-33
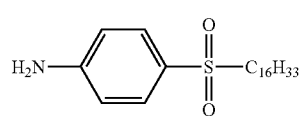
B-34
B-35

Hereinbelow, the compound of Formula (15) is explained.

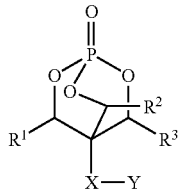

Formula (15)

In the above Formula (15), $R^1$, $R^2$ and $R^3$ are preferably each independently a hydrogen atom or an alkyl group having 1 to 5 carbon atoms (e.g., methyl, ethyl, propyl, isopropyl, butyl, amyl and isoamyl), and at least one of $R^1$, $R^2$ and $R^3$ is particularly preferably an alkyl group having 1 to 3 carbon atoms (e.g., methyl, ethyl, propyl and isopropyl). X is preferably a divalent linking group composed of one or more kinds of groups selected from the group consisting of a single bond, —O—, —CO—, an alkylene group (preferably having 1 to 6 carbon atoms, and more preferably 1 to 3 carbon atoms; e.g., methylene, ethylene and propylene) or an arylene group (preferably having 6 to 24 carbon atoms, and more preferably 6 to 12 carbon atoms; e.g., phenylene, biphenylene and naphthylene), and particularly preferably a divalent linking group composed of one or more kinds of groups selected from the group consisting of —O—, an alkylene group or an arylene group. Y is preferably a hydrogen atom, an alkyl group (preferably having 2 to 25 carbon atoms, and more preferably 2 to 20 carbon atoms; e.g., ethyl, isopropyl, t-butyl, hexyl, 2-ethylhexyl, t-octyl, dodecyl, cyclohexyl, dicyclohexyl and adamanthyl), an aryl group (preferably having 6 to 24 carbon atoms, and more preferably 6 to 18 carbon atoms; e.g., phenyl, biphenyl, terphenyl and naphthyl) or an aralkyl group (preferably having 7 to 30 carbon atoms, and more preferably 7 to 20 carbon atoms; e.g., benzyl, cresyl, t-butylphenyl, diphenylmethyl and triphenylmethyl), and particularly preferably an alkyl group, an aryl group or an aralkyl group. For combination of —X—Y, the total number of carbon atoms of —X—Y is preferably 0 to 40, more preferably 1 to 30, and most preferably 1 to 25. Preferred examples of the compound represented by Formula (15) are given below.

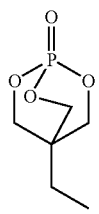

PL-1

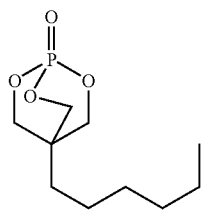

PL-2

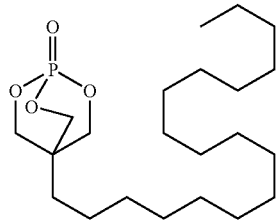

PL-3

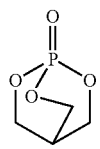

PL-4

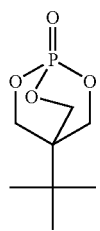

PL-5

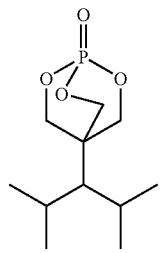

PL-6

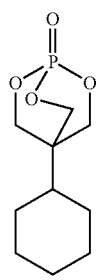

PL-7

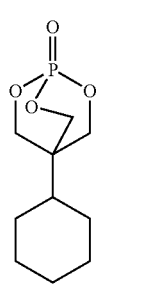

PL-8

-continued
PL-9
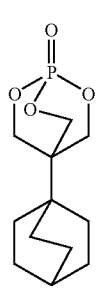
PL-10
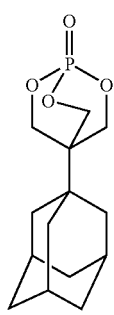
PL-11
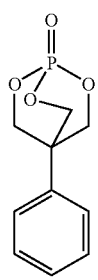
PL-12
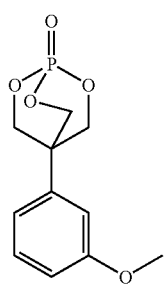
PL-13
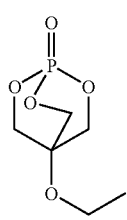
-continued
PL-14
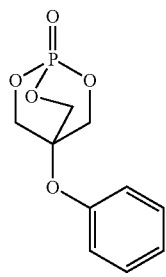
PL-15
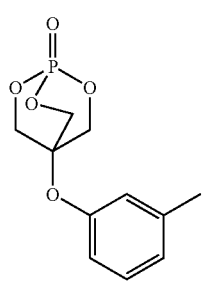
PL-16
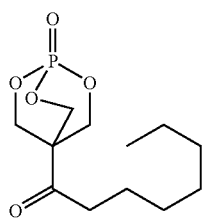
PL-17
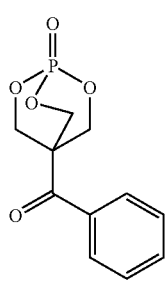
PL-18, PL-19
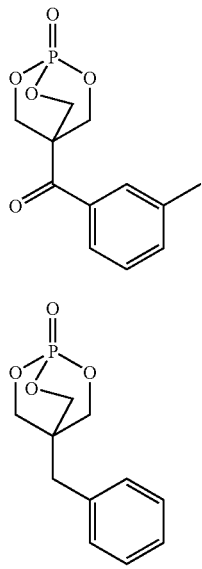

-continued
PL-20
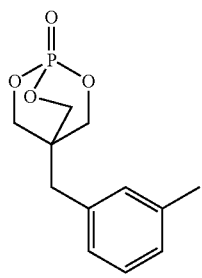
PL-21
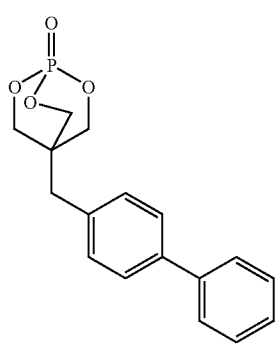
PL-22
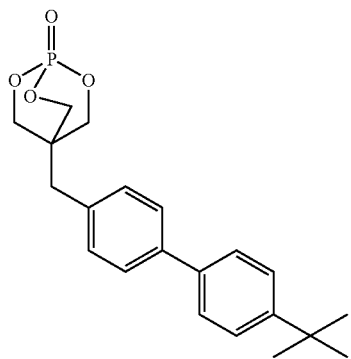
PL-23
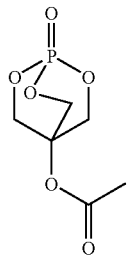
PL-24
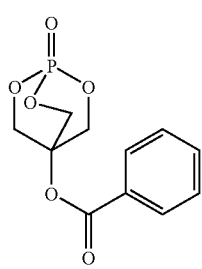
-continued
PL-25
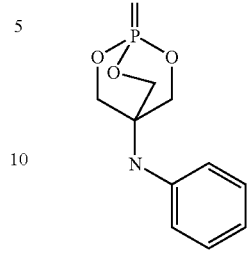
PL-26
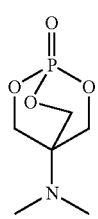
PL-27
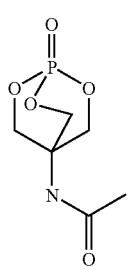
PL-28
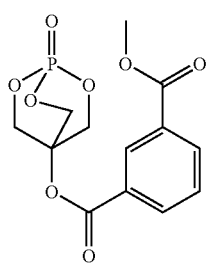
PL-29
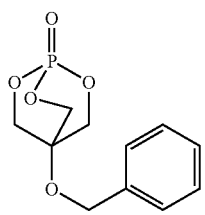
PL-30

PL-31
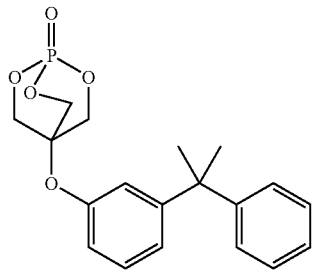
PL-36
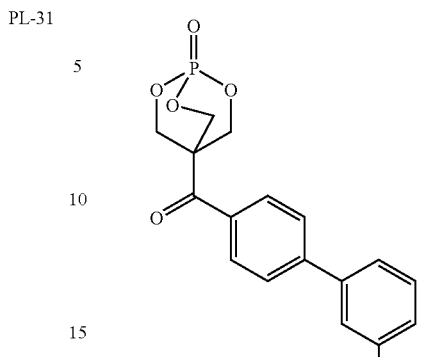
PL-32
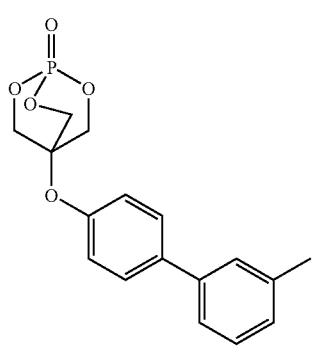
PL-37
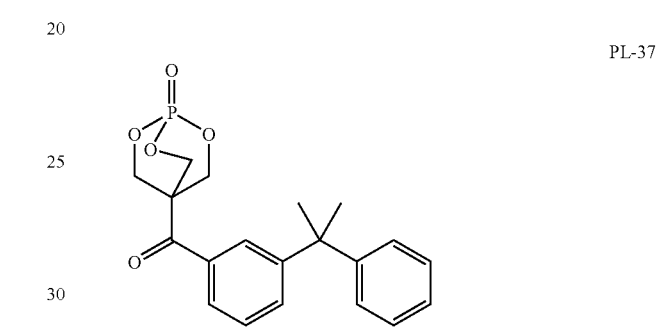
PL-33
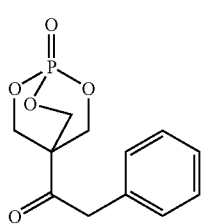
PL-38
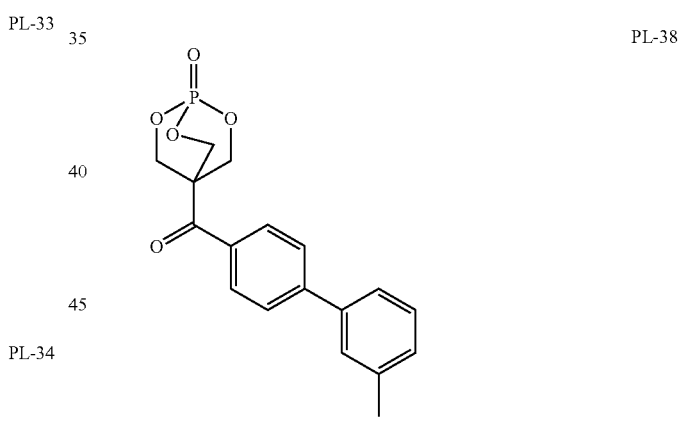
PL-34
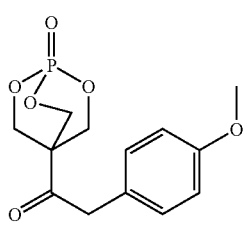
PL-39
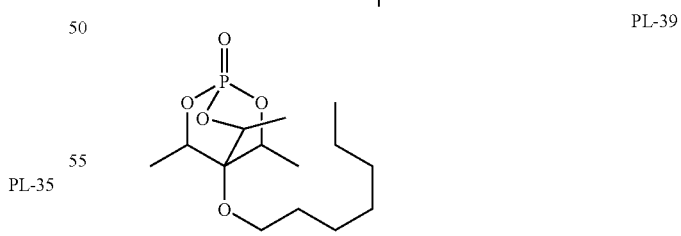
PL-35
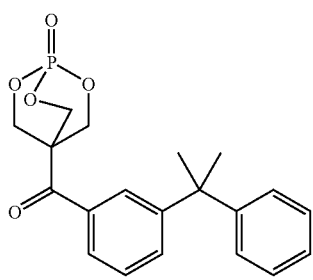
PL-40
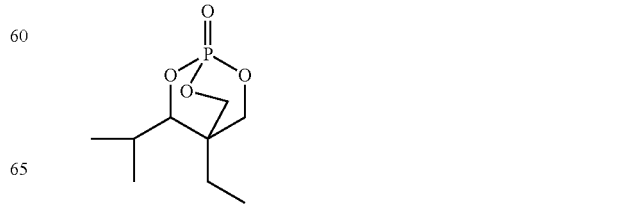

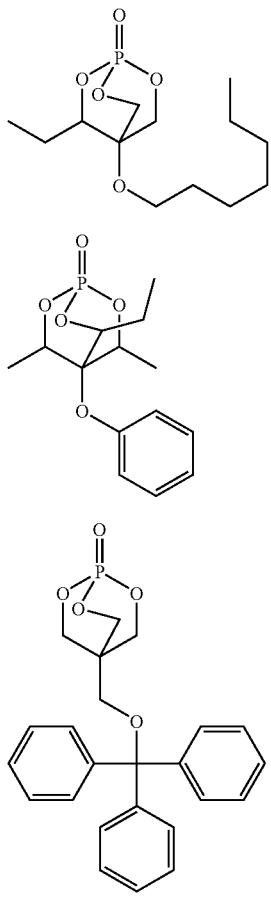

The compound of Formula (16) will be illustrated.

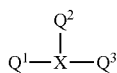

Formula (16)

$Q^1$, $Q^2$ and $Q^3$ each independently represent 5- or 6-membered ring, which may be a heterocyclic hydrocarbon ring, a monocyclic hydrocarbon ring, and may form a condensed ring with other rings. The hydrocarbon ring is preferably a substituted or unsubstituted cyclohexane ring, a substituted or unsubstituted cyclopentane ring, an aromatic hydrocarbon ring, and more preferably an aromatic hydrocarbon ring. The heterocyclic ring is preferably a ring containing at least one selected from an oxygen atom, a nitrogen atom and a sulfur atom of a 5- or 6-membered ring, and more preferably an aromatic heterocyclic ring containing at least one selected from an oxygen atom, a nitrogen atom or a sulfur atom.

$Q^1$, $Q^2$ and $Q^3$ are preferably an aromatic hydrocarbon ring or an aromatic heterocyclic ring. The aromatic hydrocarbon ring is preferably a monocyclic or bicyclic aromatic hydrocarbon ring having 6 to 30 carbon atoms (e.g., a benzene ring, a naphthalene ring, etc.); more preferably an aromatic hydrocarbon ring having 6 to 20 carbon atoms; even more preferably an aromatic hydrocarbon ring having 6 to 12 carbon atoms; and particularly preferably a benzene ring.

The aromatic heterocyclic ring is preferably an aromatic heterocyclic ring containing an oxygen atom, a nitrogen atom or a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene, etc. Preferred examples of the aromatic heterocyclic ring are pyridine, triazine and quinoline. $Q^1$, $Q^2$ and $Q^3$ are preferably an aromatic hydrocarbon ring, and more preferably a benzene ring. $Q^1$, $Q^2$ and $Q^3$ may be substituted, and the substituent may be exemplified by the following substituent T.

X represents B, C—R (R represents a hydrogen atom or a substituent.), N, P and P=O. X is preferably B, C—R (R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (e.g., a fluorine atom, a chlorine atom, a bromine atom and an iodine atom) and a carboxyl group; more preferably an aryl group, an alkoxy group, an aryloxy group, a hydroxyl group and a halogen atom; even more preferably an alkoxy group and a hydroxyl group; and particularly preferably a hydroxyl group.) and N. X is more preferably C—R and N, and particularly preferably C—R.

The compound represented by Formula (16) is preferably a compound represented by the following Formula (17).

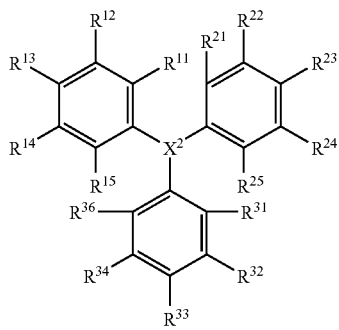

Formula (17)

wherein $X^2$ represents B, C—R (R represents a hydrogen atom or a substituent.) and N. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represent a hydrogen atom or a substituent.

X represents B, C—R (R represents a hydrogen atom or a substituent.), N, P and P=O. X is preferably B, C—R (R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (e.g., a fluorine atom, a chlorine atom, a bromine atom and an iodine atom) and a carboxyl group; more preferably an aryl group, an alkoxy group, an aryloxy group, a hydroxyl group and a halogen atom; even more preferably an alkoxy group and a hydroxyl group; and particularly preferably a hydroxyl group.), N and P═O. X is more preferably C—R and N, and particularly preferably C—R.

$R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represent a hydrogen atom or a substituent, and the substituent may be exemplified by the following substituent T. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ are preferably an alkyl group, an alkenyl group, an alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric acid amide group, a hydroxyl group, a mercapto group, a halogen atom (e.g., a fluorine atom, a chlorine atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms and more preferably 1 to 12 carbon atoms, and having a heteroatom such as a nitrogen atom, an oxygen atom, or a sulfur atom; specifically, e.g., imidazolyl, pyridyl, quinolyl, furyl, piperidyl, morpholino, benzoxazolyl, benzimidazolyl, benzothiazolyl, etc.), a silyl group; more preferably an alkyl group, an aryl group, a substituted or unsubstituted amino group, an alkoxy group and an aryloxy group; and even more preferably an alkyl group, an aryl group and an alkoxy group.

These substituents may be further substituted. When there are two or more substituents, they may be identical or different. If possible, they may be bonded to each other to form a ring.

The above-described substituent T will be illustrated below. Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, octyl, decyl, hexadecyl, cyclopropyl, cyclopentyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atom, and particularly preferably 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; specifically, e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), etc. These substituents may be further substituted. When there are two or more substituents, they may be identical or different. If possible, they may be bonded to each other to form a ring.

Specific examples of the compound represented by Formula (16) are given below.
D-1
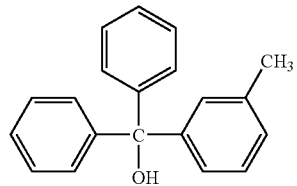
D-2
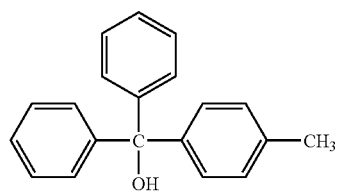
D-3
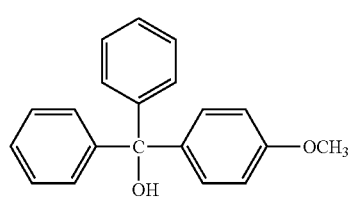
D-4
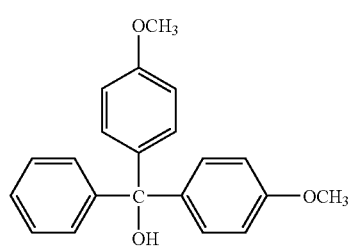
D-5
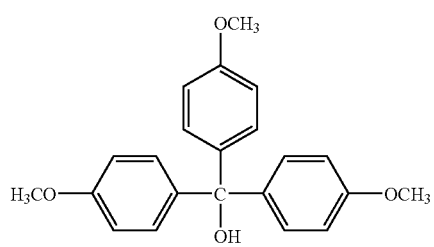
D-6
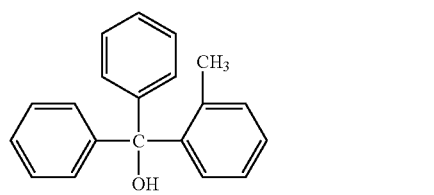
D-7
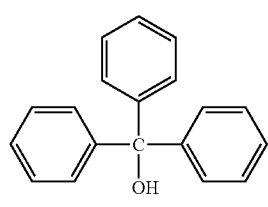
D-8
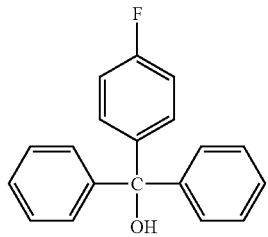
D-9
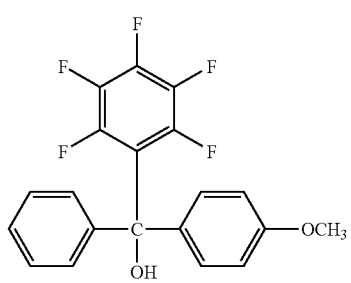
D-10
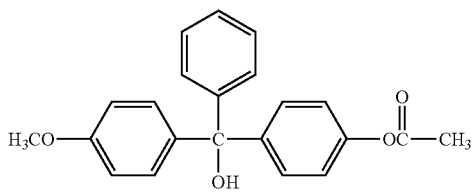
D-11
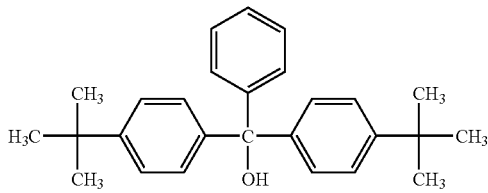
D-12
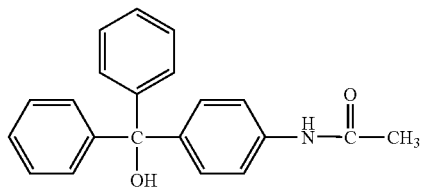
D-13
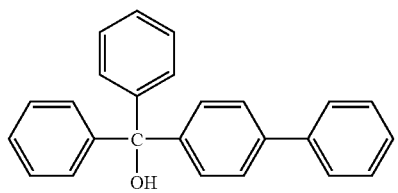
D-14
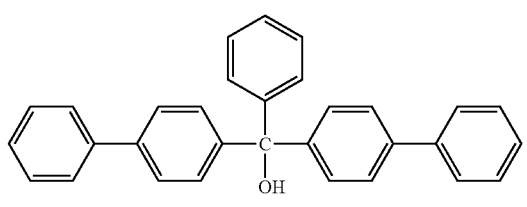

-continued
D-15 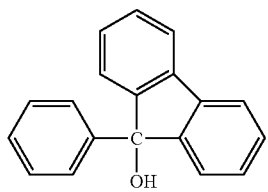
D-16 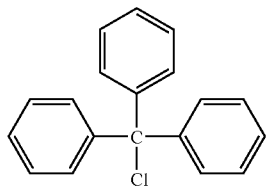
D-17 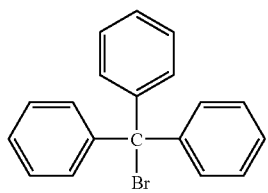
D-18 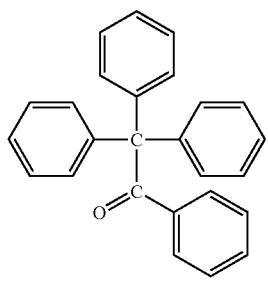
D-19 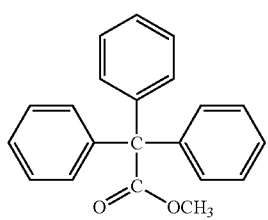
D-20 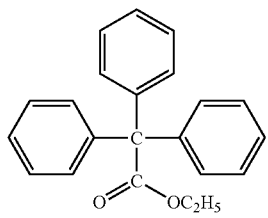
D-21 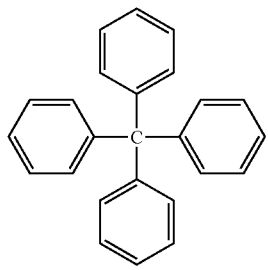
-continued
D-22 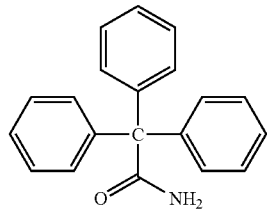
D-23 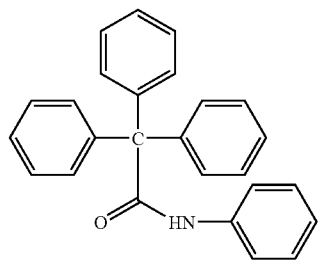
D-24 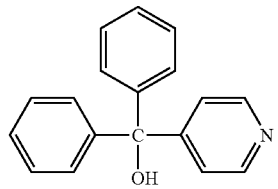
E-1 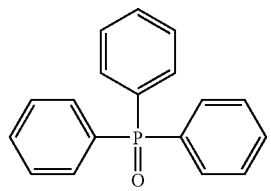
E-2 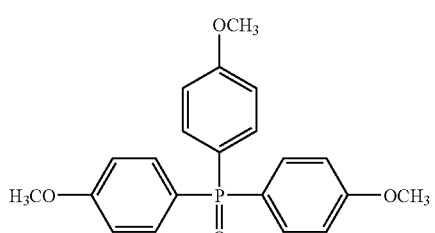
E-3 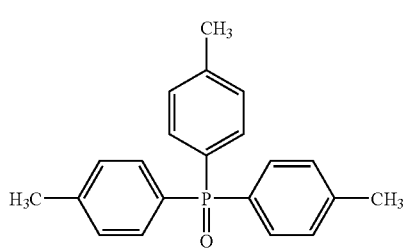

E-4
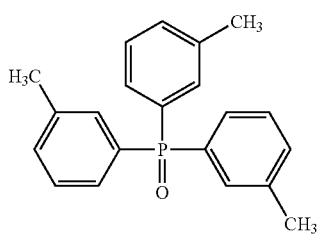
E-5
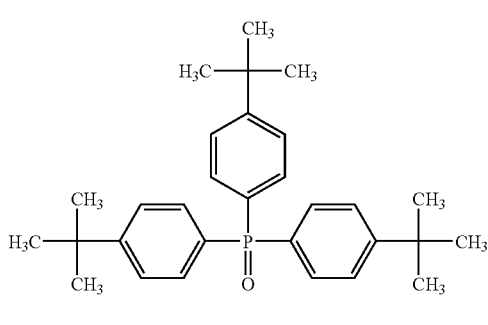
E-6
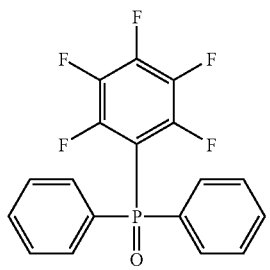
E-7
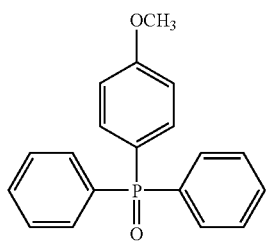
E-8
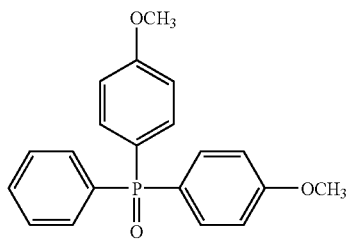
E-9
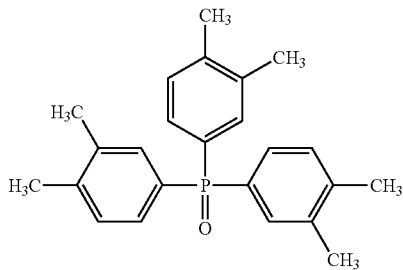
E-10
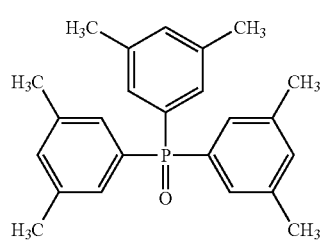
E-11
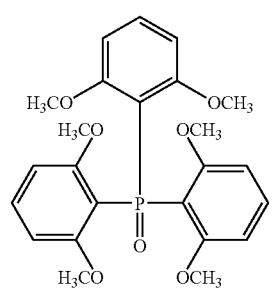
E-12
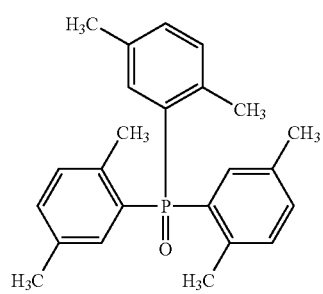
E-13
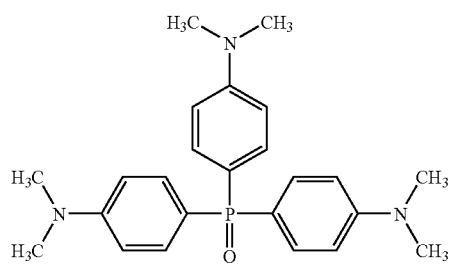
E-14
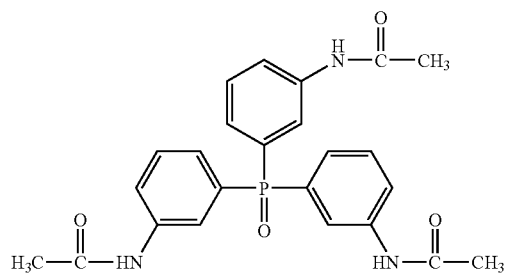

-continued
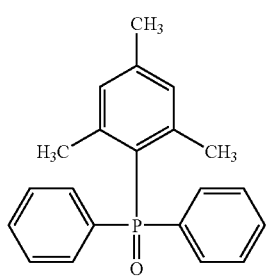
E-15
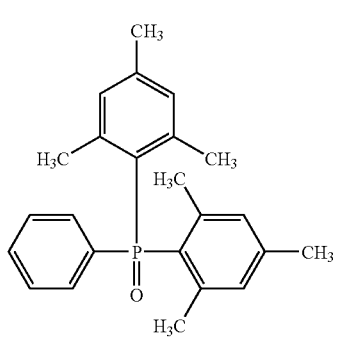
E-16
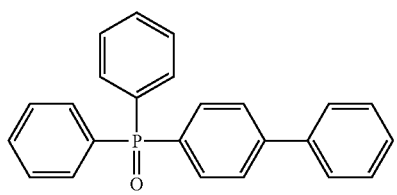
E-17
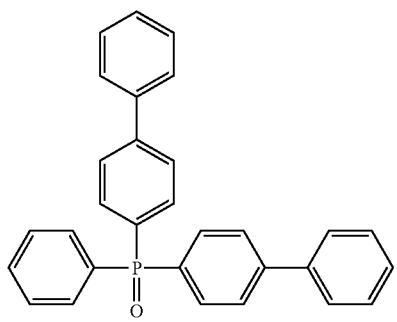
E-18
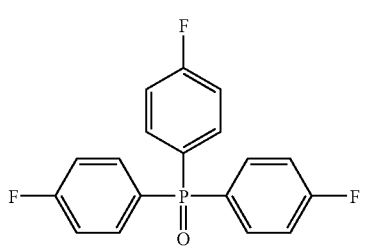
E-19
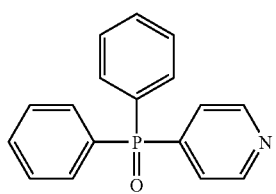
E-20
-continued
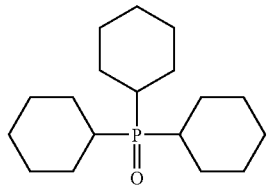
E-21
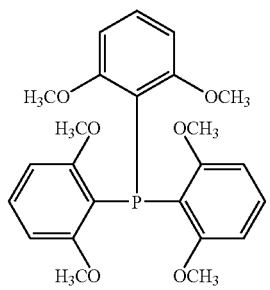
E-22
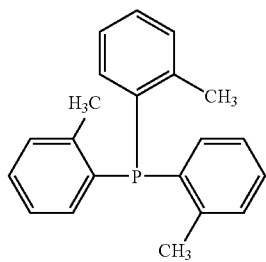
E-23
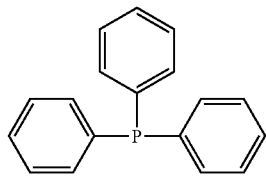
E-24
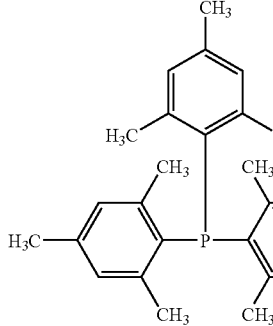
E-25
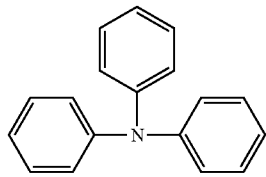
E-26

-continued
E-27
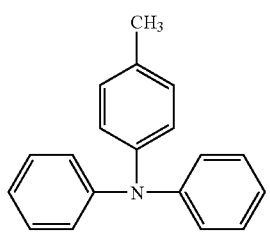
E-28
E-29
E-30
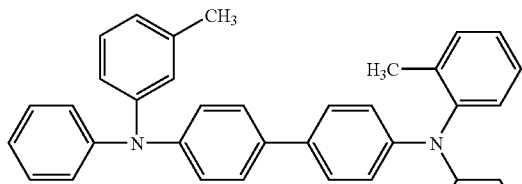
E-31
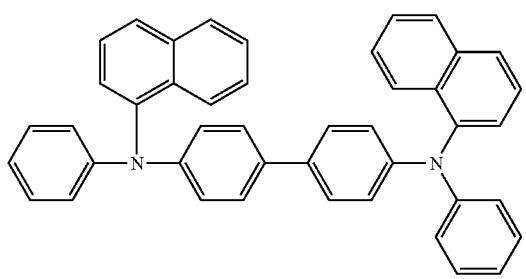
E-32
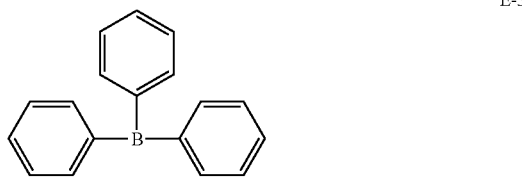
Preferred examples of the compound represented by Formula (18) or Formula (19) are given below.
FA-1
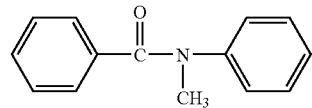
FA-2
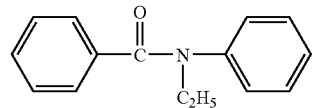
FA-3
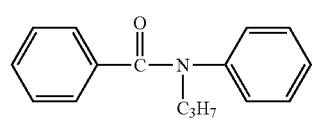
FA-4
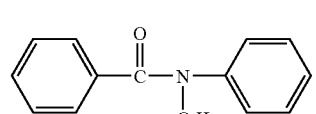
FA-5
FA-6
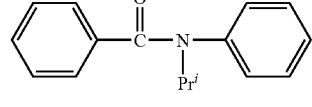
FA-7
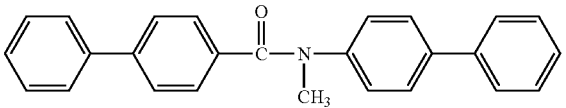
FA-8
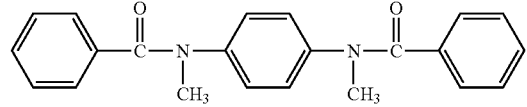
FA-9
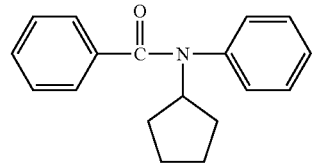
FA-10
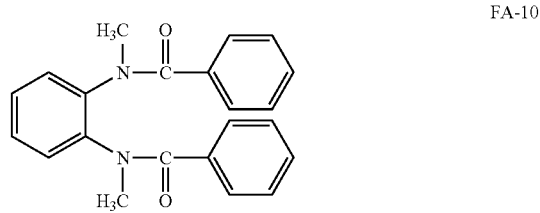

-continued
FA-11
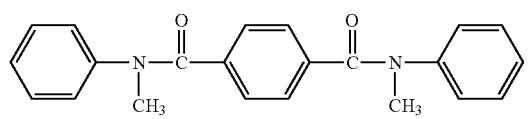
FA-12
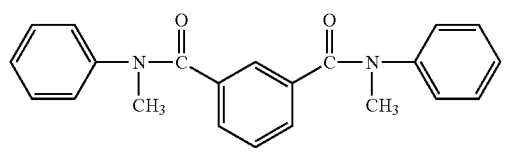
FA-13
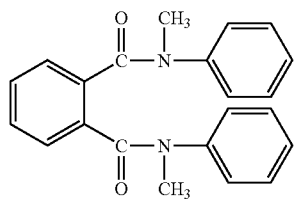
FA-14
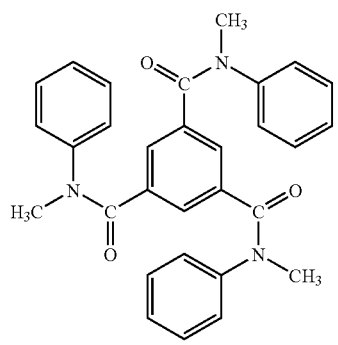
FA-15
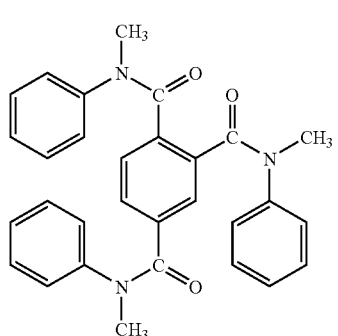
FA-16
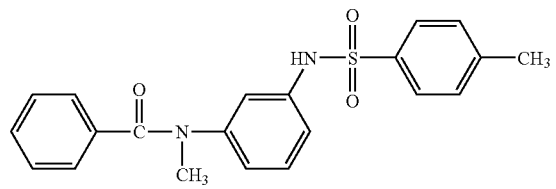
FA-17
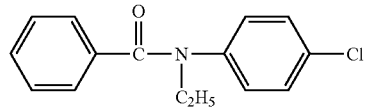
-continued
FA-18
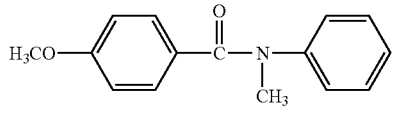
FA-19
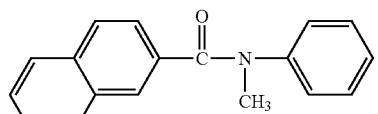
FA-20
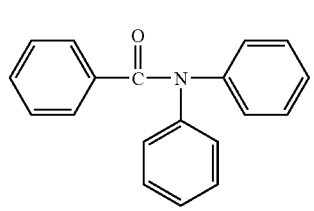
FA-21
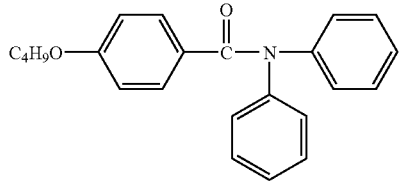
FA-22
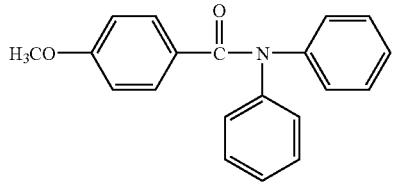
FA-23
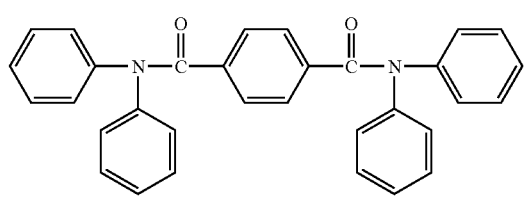
FA-24
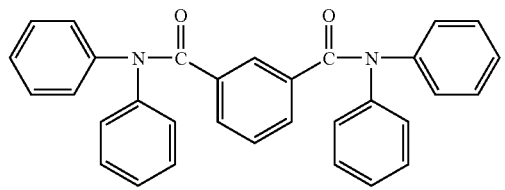

-continued
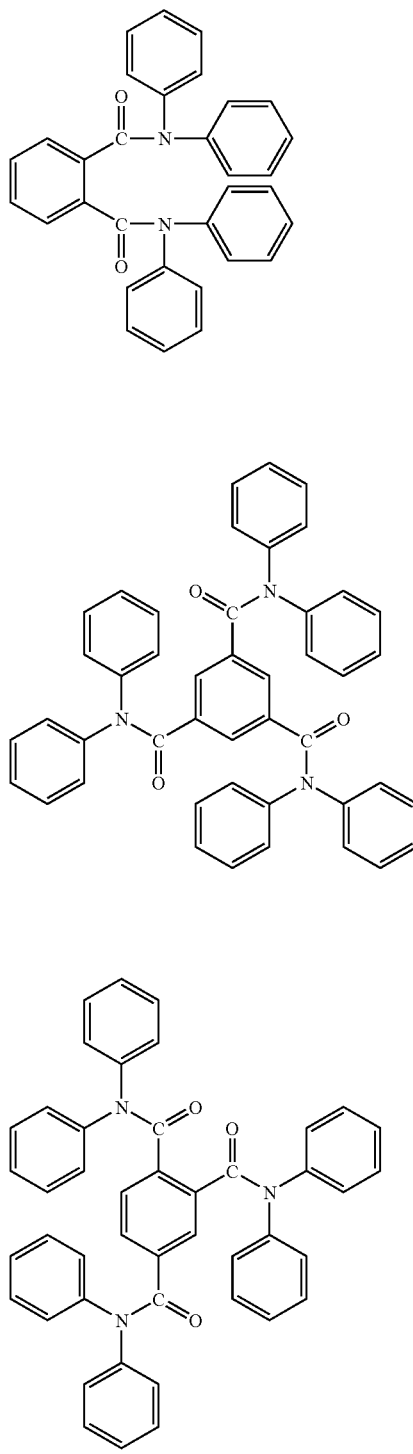
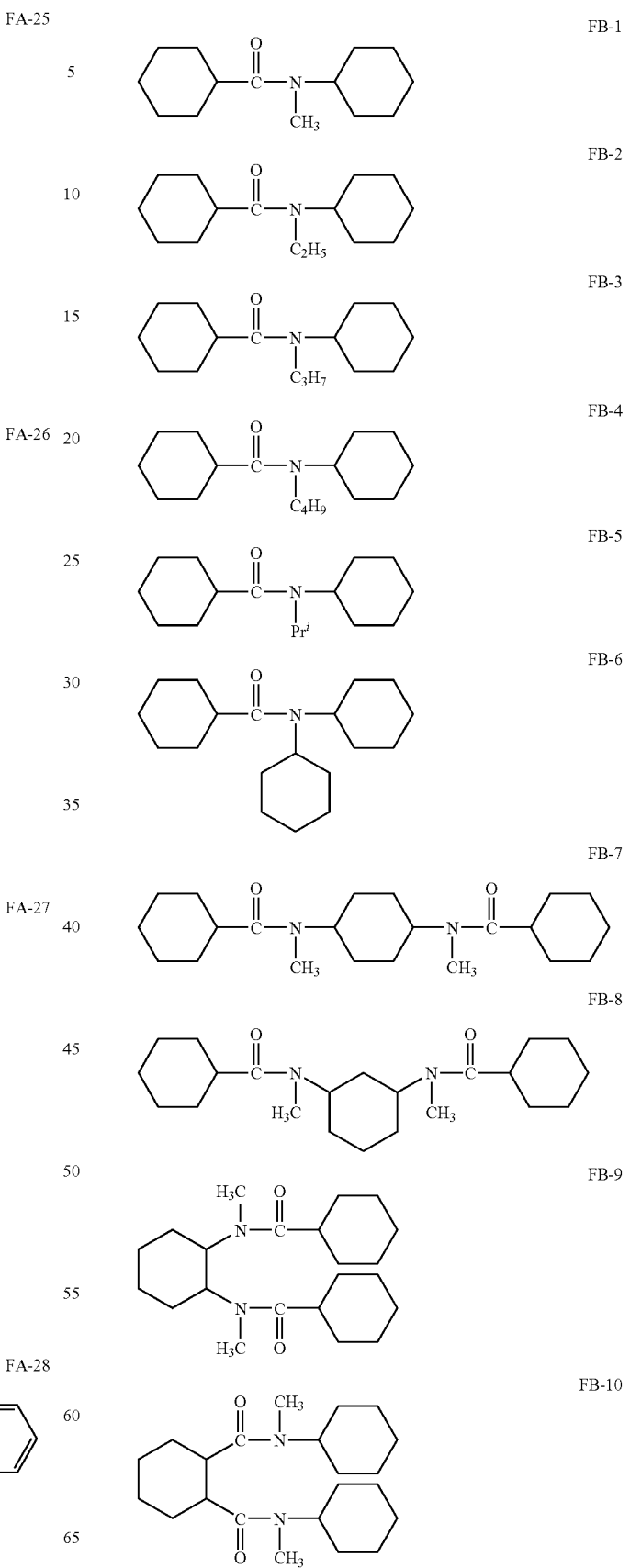

-continued
FB-11
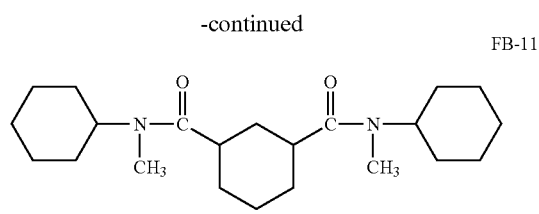
FB-12
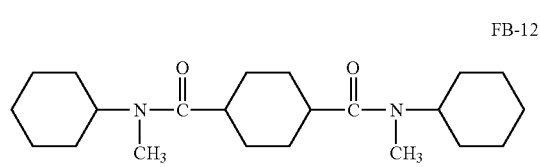
FB-13
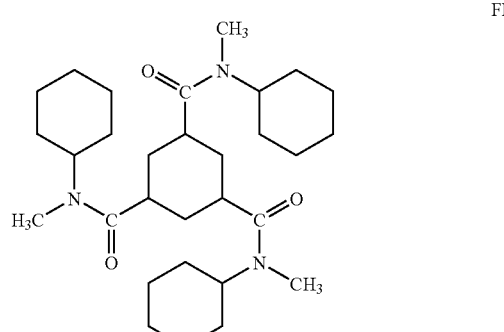
FB-14
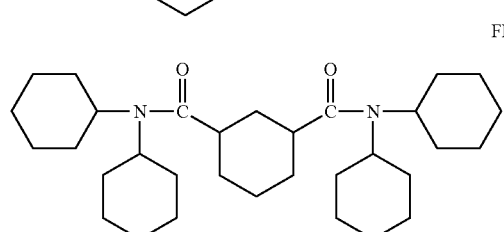
FB-1
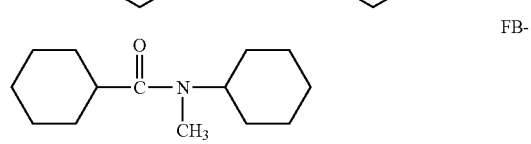
FB-2
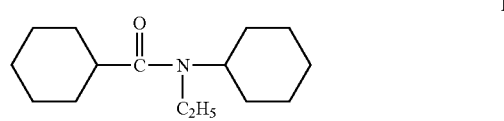
FB-3
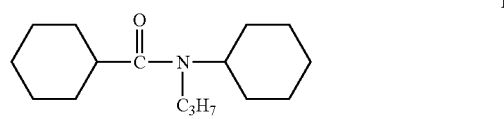
FB-4
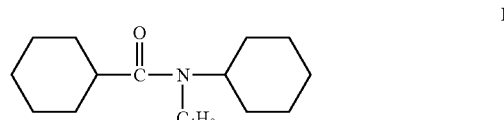
FB-5
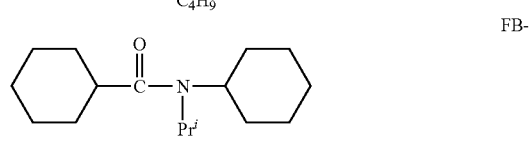
-continued
FB-6
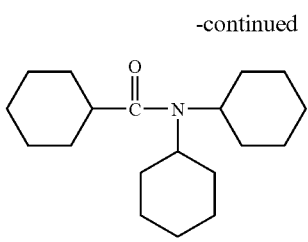
FB-7
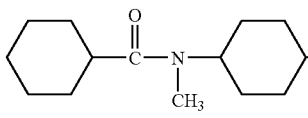
FB-8
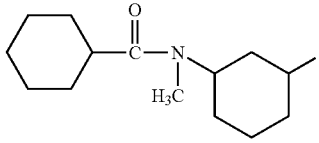
FB-9
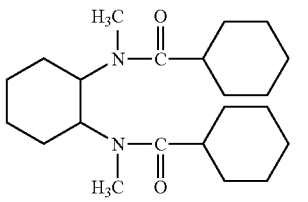
FB-10
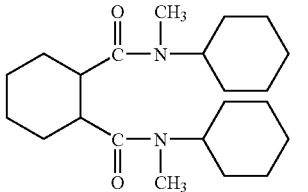
FB-11
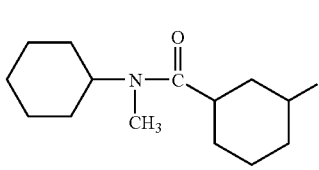
FB-12
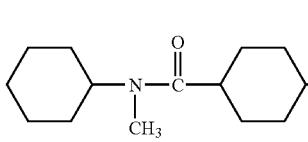
FB-13
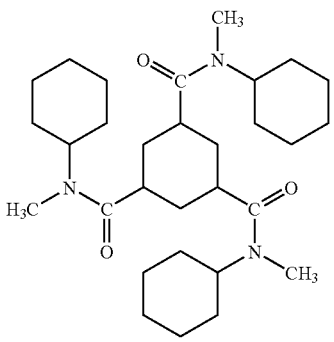

-continued

FB-14, FB-15, FB-16, FB-15, FB-16, FB-17

FB-18, FB-19, FB-20, FB-21, FB-22, FB-23, FB-24, FC-1, FC-2, FC-3

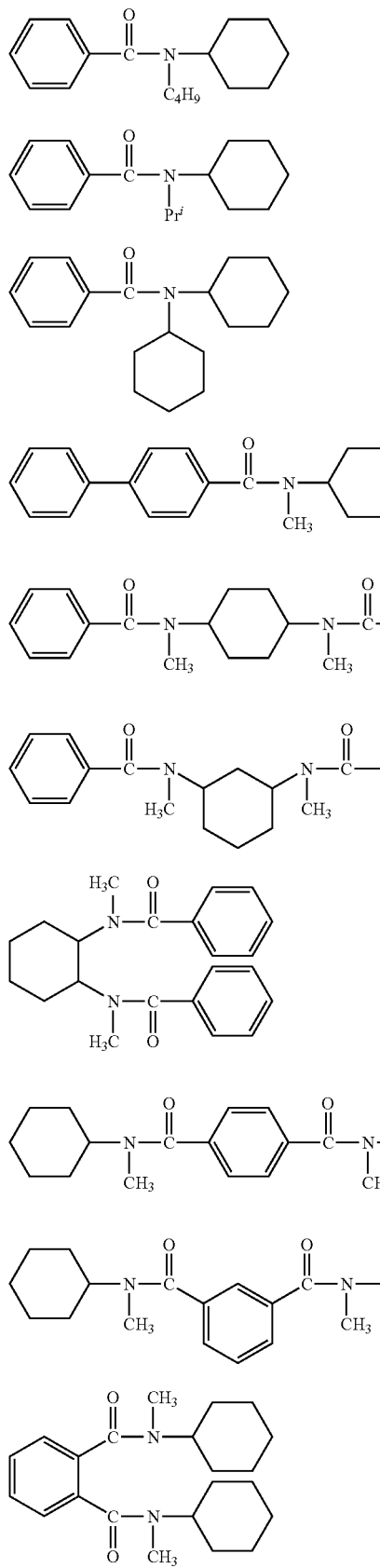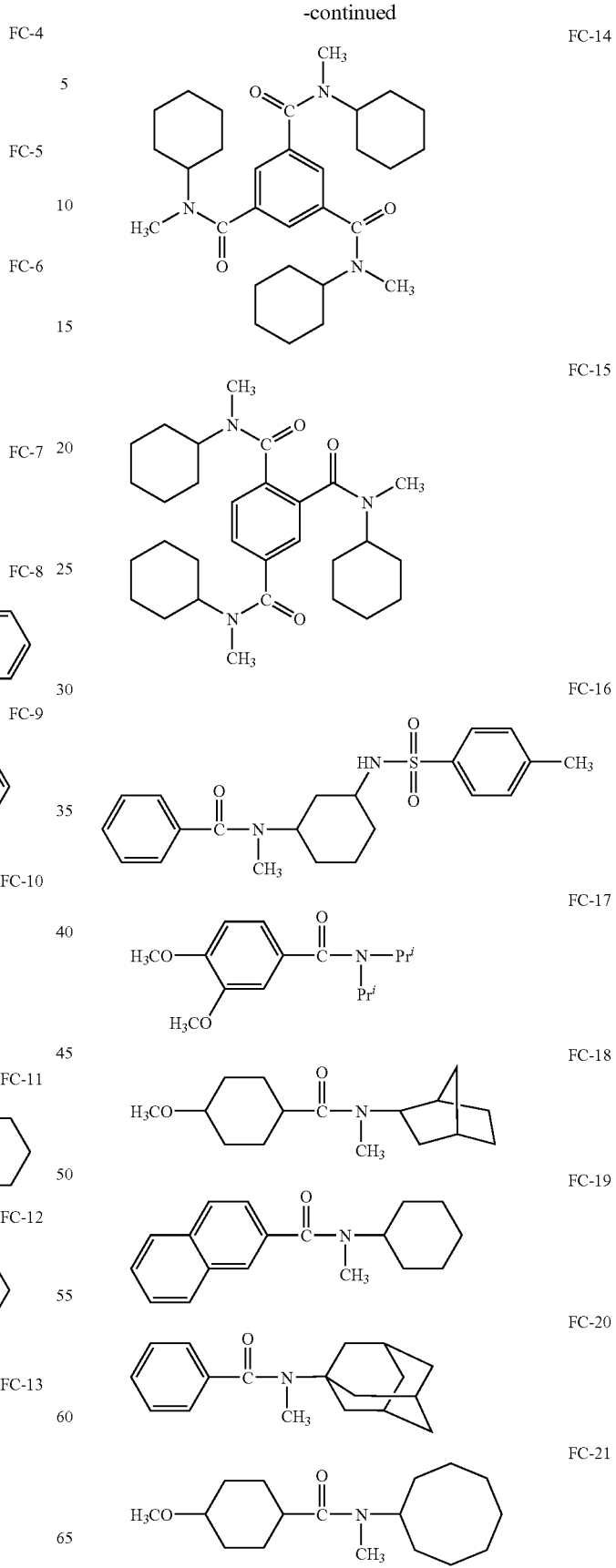

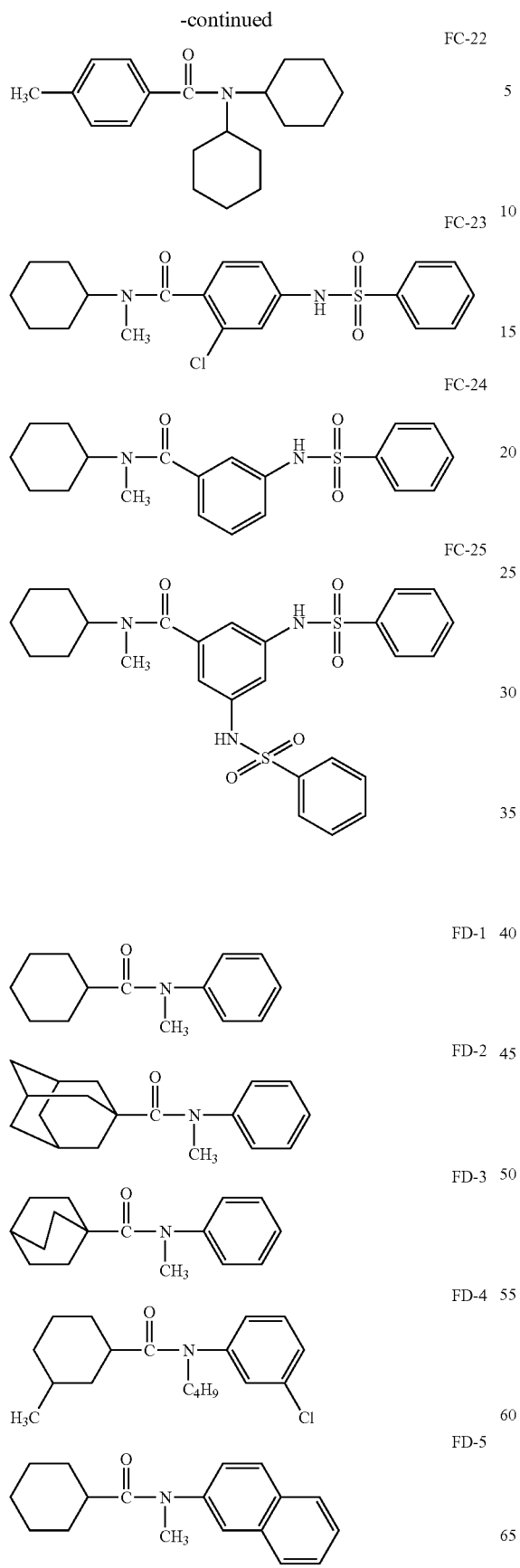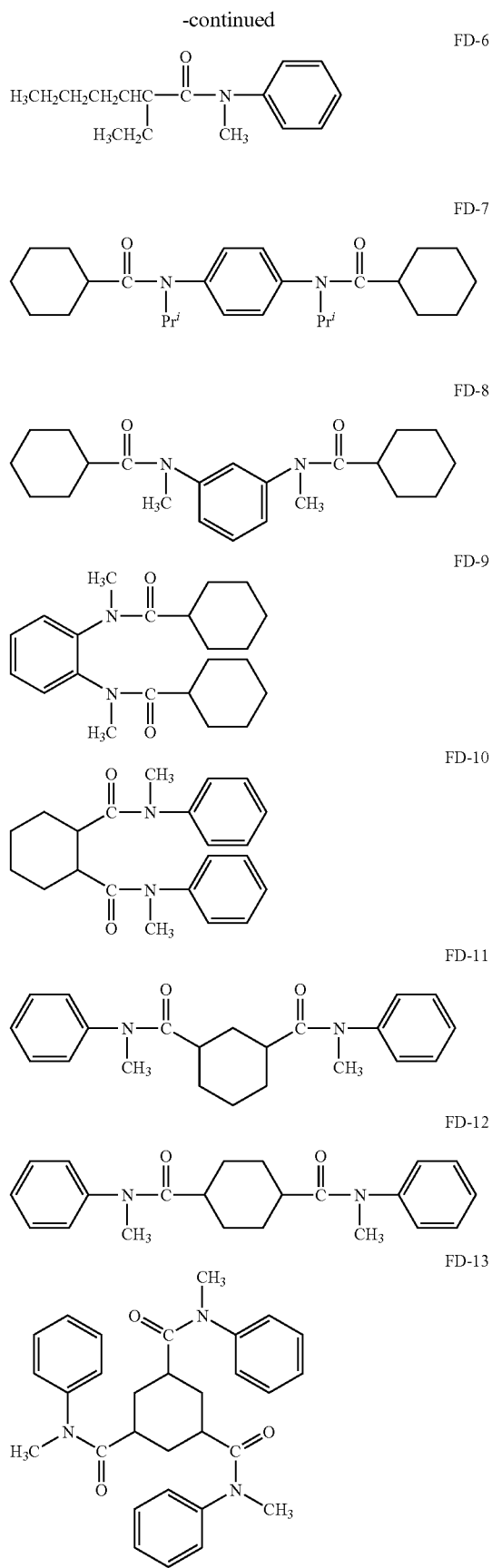

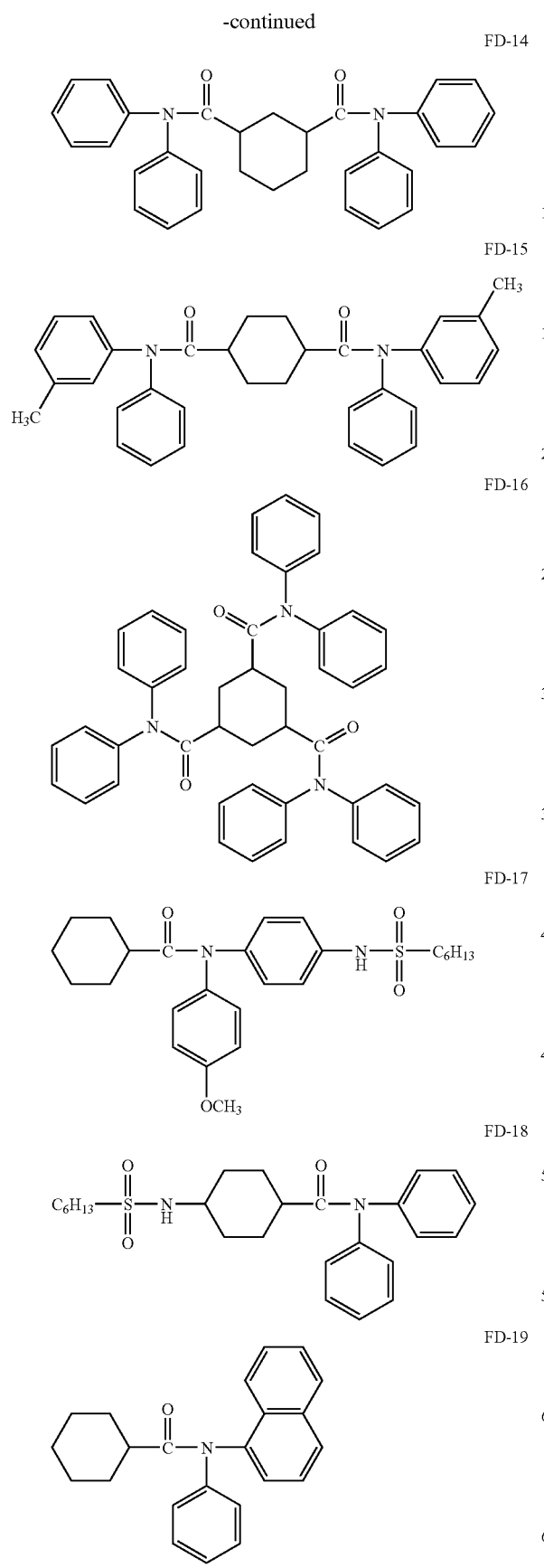

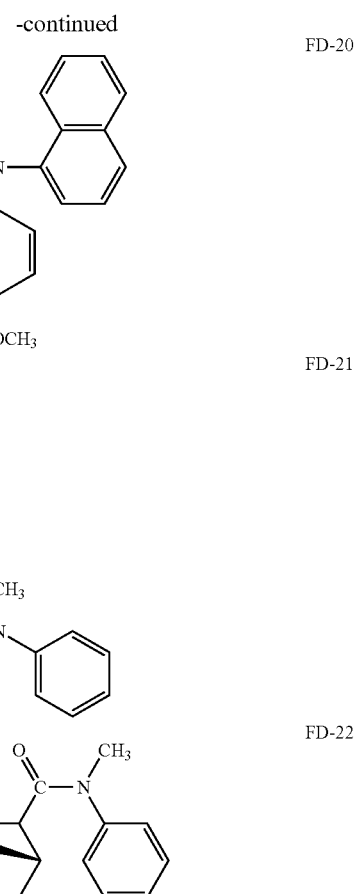

The present inventors of the invention have made extensive studies and, as a result, have found that an optical anisotropy decreases even though a polyhydric alcohol ester compound, a carboxylic acid ester compound, a polycyclic carboxylic acid compound and a bisphenol derivative, which have an octanol-water partition coefficient (Log P value) of 0 to 7, are added to cellulose acylate.

Specific examples of the polyhydric alcohol ester compound, the carboxylic acid ester compound, the polycyclic carboxylic acid compound and the bisphenol derivative, which have the octanol-water partition coefficient (Log P value) of 0 to 7, are given below.

(Polyhydric Alcohol Ester Compound)

The polyhydric alcohol ester of the invention is an ester of di- or more polyhydric alcohol and at least one monocarboxylic acid. Examples of the polyhydric alcohol ester compound are given below.

(Polyhydric Alcohol)

Preferred examples of polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, etc. Particularly preferred are triethylene glycol, tetraethylene glycol, dipropylene glycol, tripropylene glycol, sorbitol, trimethylolpropane and xylitol.

(Monocarboxylic Acid)

For the monocarboxylic acid in the polyhydric alcohol ester of the invention, a known aliphatic monocarboxylic acid, an alicyclic monocarboxylic acid, an aromatic monocarboxylic acid, etc. can be used. It is preferable that water vapor permeability, water content, retainability of a cellulose acylate film are improved when an alicyclic monocarboxylic acid and an aromatic monocarboxylic acid are used.

Preferred examples of the monocarboxylic acid are given below.

For an aliphatic monocarboxylic acid, a straight-chained or branched aliphatic acid preferably having 1 to 32 carbon atoms, more preferably 1 to 20 carbon atoms, and particularly preferably 1 to 10 carbon atoms can be used. It is preferable to contain an acetic acid because of improving compatibility with a cellulose ester. It is also preferable to use a mixture of an acetic acid and other monocarboxylic acids.

Preferred examples of the aliphatic monocarboxylic acid include a saturated fatty acid such as an acetic acid, a propionic acid, a butyric acid, a valeric acid, a caproic acid, an enanthic acid, a caprylic acid, a pelargonic acid, a capric acid, a 2-ethyl-hexane carboxylic acid, an undecylic acid, a lauric acid, a tridecylic acid, a myristic acid, a pentadecylic acid, a palmitic acid, a heptadecylic acid, a stearic acid, a nonadecanoic acid, an arachic acid, a behenic acid, a lignoceric acid, a cerotic acid, a heptacosane acid, a montanoic acid, a melissic acid, a lacseric acid, etc.; and an unsaturated fatty acid such as an undecylenic acid, an oleic acid, a sorbic acid, a linoleic acid, a linolenic acid, an arachidonic acid, etc. These may be further substituted.

Preferred examples of the alicyclic monocarboxylic acid include a cyclopentanecarboxylic acid, a cyclohexanecarboxylic acid, a cyclooctanecarboxylic acid or derivatives thereof.

Preferred examples of the aromatic monocarboxylic acid include a benzoic acid, one in which an alkyl group is introduced into a benzene ring of a benzoic acid, such as a toluic acid, an aromatic monocarboxylic acid comprising two or more benzene rings such as a biphenylcarboxylic acid, a naphthalene carboxylic acid and a tetralincarboxylic acid, and derivatives thereof. Particularly, a benzoic acid is preferable.

A carboxylic acid in the polyhydric alcohol ester of the invention may be used alone or in a combination of two or more. In addition, all the OH group in polyhydric alcohol may be esterified, and a part of the OH group may be present as it is. Preferably, an aromatic ring or 3 or more of a cycloalkyl ring may be provided in a molecule.

For the polyhydric alcohol ester compound, the following compounds can be exemplified.

1-1
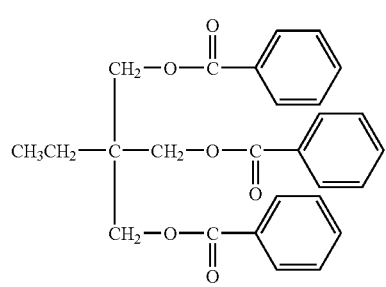

1-2
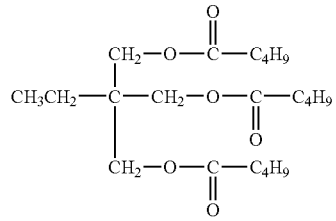

1-3
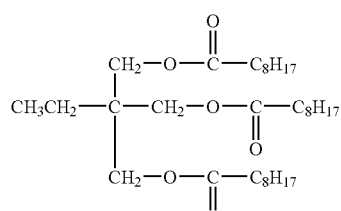

1-4
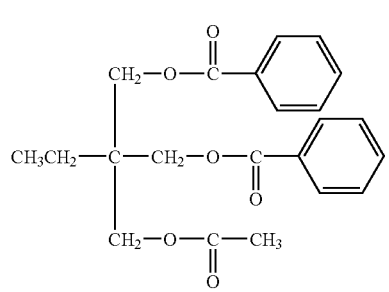

1-5
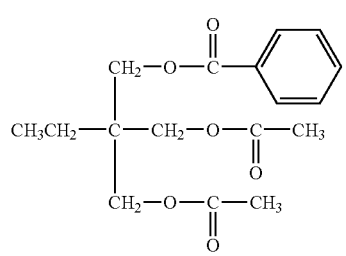

1-6
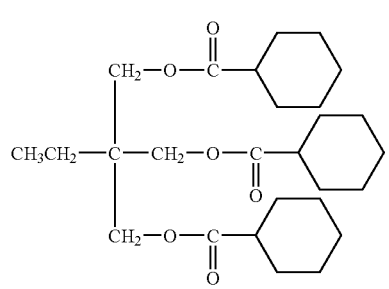

1-7
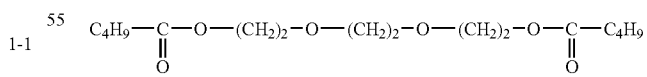

1-8
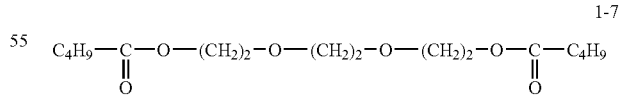

1-9
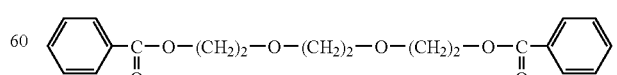

1-10

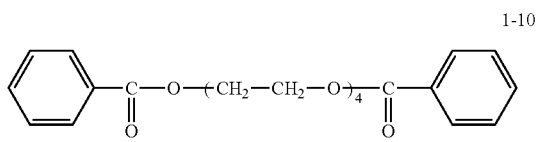

(Carboxylic Acid Ester Compound)

For the carboxylic acid ester compound, the following compounds can be exemplified. Specifically, examples of the carboxylic acid ester compound include a phthalic acid ester and a citric acid ester. Examples of the phthalic acid ester include dimethyl phthalate, diethyl phthalate, dicyclohexyl phthalate, dioctyl phthalate, and diethylhexyl phthalate. Examples of the citric acid ester include acetyl triethyl citrate and acetyl tributyl citrate. In addition, examples of other carboxylic acid esters include butyl oleate, methylacetyl ricinoleate, dibutyl sebacate, triacetin and trimethylolpropane tribenzoate. Alkylphthalylalkyl glycolate is also preferably used for this purpose. Alkyl of alkylphthalylalkyl glycolate is an alkyl group of 1 to 8 carbon atoms. Examples of alkylphthalylalkyl glycolate include methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, propylphthalylethyl glycolate, methylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate. Preferably, methylphthalylmethyl glycolate, ethylphthalylethyl glycolate, propylphthalylpropyl glycolate, butylphthalylbutyl glycolate and octylphthalyloctyl glycolate may be used, and particularly preferably ethylphthalylethyl glycolate may be used. Furthermore, alkylphthalylalkyl glycolate may be used in a combination of two or more.

Examples of carboxylic acid ester compounds can be exemplified by the following compounds:

J-1

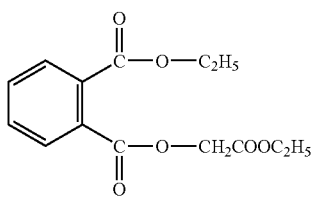

J-2

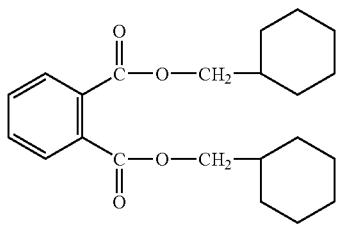

J-3

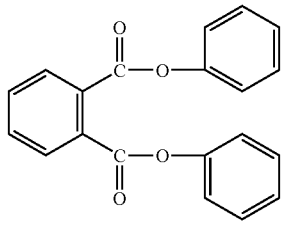

J-4

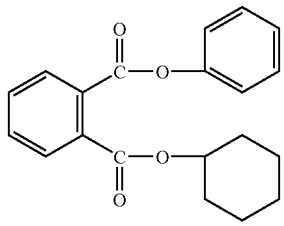

J-5

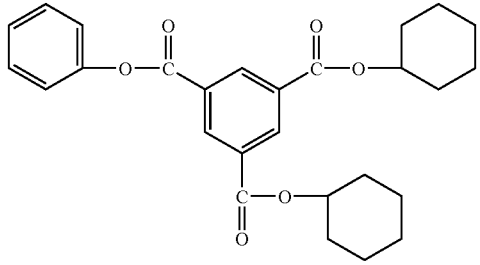

J-6

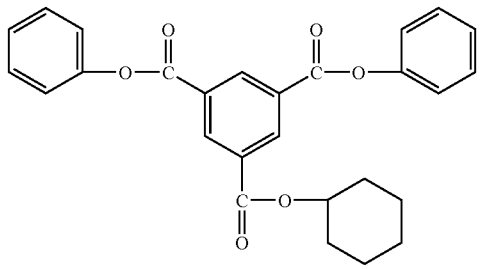

J-7

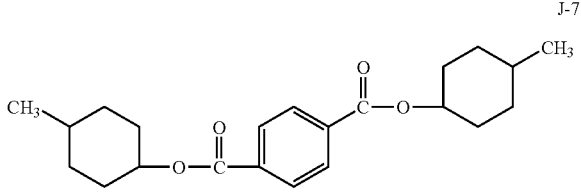

-continued

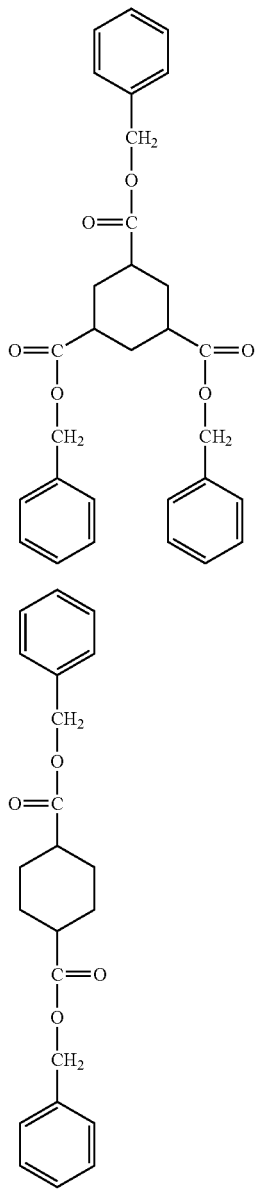

J-8

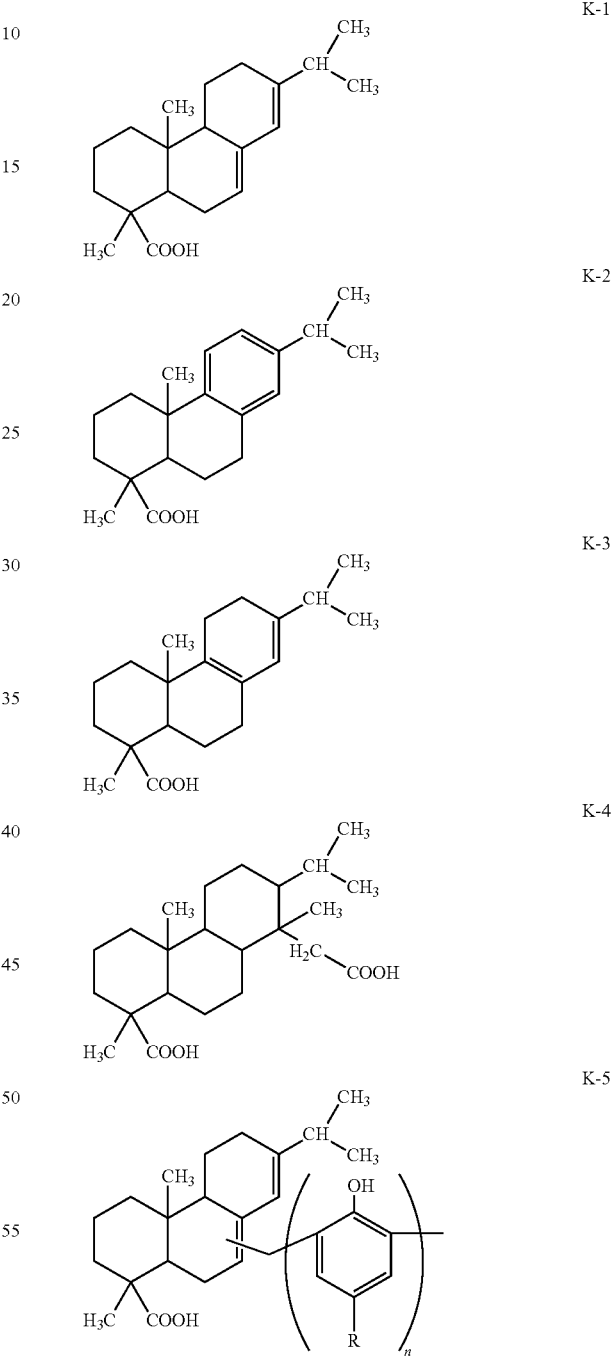

shaped structures within the molecule is preferred. Further, at least one bond in the ring-shaped structure not having an unsaturated bond is preferred. Specifically, abietic acid derivatives such as abietic acid, dehydro-abietic acid, and parastric acid are mentioned, and the chemical formulas thereof are presented below.

(Porous Carboxylic Acid Compound)

The porous carboxylic acid compound used in the invention being a compound having the molecular weight of 3000 or less is preferred, and particularly being a compound having the molecular weight of 250 to 2000 is preferred. Regarding the cyclic structure, a ring formed of 3 to 8 atoms is preferred, and particularly 6- and/or 5-membered ring is preferred. The ring may contain carbon, oxygen, nitrogen, sulfur or other atoms, and a part of the bonding of the ring may have unsaturated bonds, for example, a 6-membered ring may be a benzene ring or a cyclohexane ring. The compound of the invention is formed of a plurality of the above-mentioned cyclic structures. For example, the compound may have any one of a benzene ring or a cyclohexane ring within the molecule; may have two cyclohexane rings; or may have naphthalene derivatives or anthracene or the like derivatives. More preferably, the compound having 3 or more of such ring- (Bisphenol Derivatives)

Bisphenol derivatives used in the invention being a compound having the molecular weight of 10000 or less is preferred, and within this range, the compound may be a monomer, an oligomer or a polymer. Further, the compound may be a copolymer with other polymers, or may be modified at the end-portion with a reactive substituent. The chemical formulas thereof are given below.

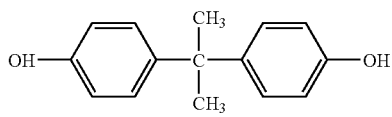

L-1

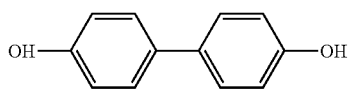

L-2

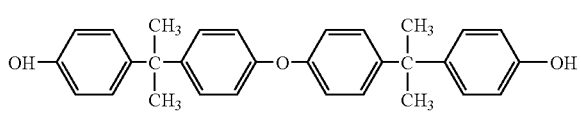

L-3

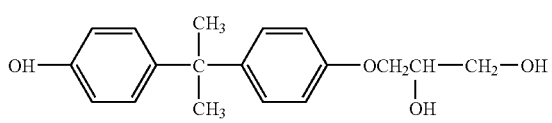

L-4

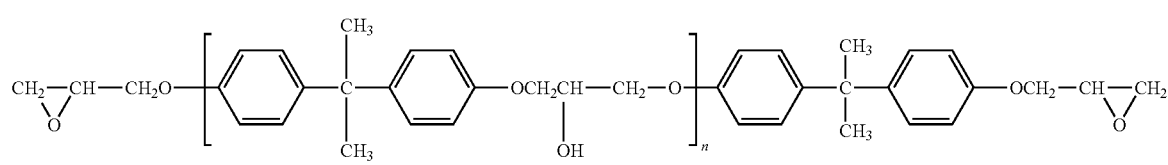

L-5

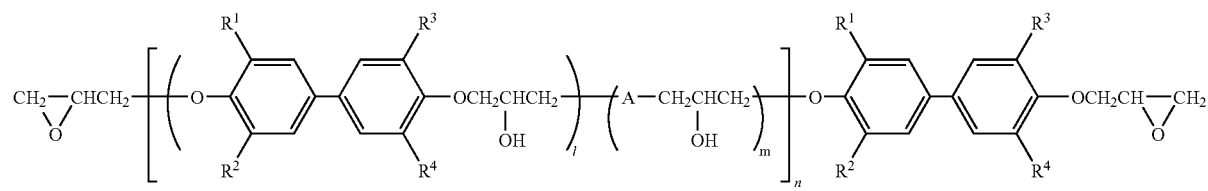

L-6

Among the specific examples of bisphenol derivatives, R1 to R4 are a hydrogen atom or an alkyl group having 1 to 10 carbon atoms. l, m and n are a repeated unit, which is preferably an integer of 1 to 100, and more preferably an integer of 1 to 20.

[Chromatic Dispersion Controlling Agent]

A compound lowering the chromatic dispersion of the cellulose acylate films (hereinafter, referred to as a "chromatic dispersion controlling agent") will be described. In order to improve Rth of the chromatic dispersion of cellulose acylate films in the invention, it is desirable in that at least one compound, which lowers the Rth of the chromatic dispersion represented by the following equation (iv) $\Delta Rth = |Rth\ 400 - Rth\ 700|$, be in the range satisfying the following equations (v) and (vi):

$$\Delta Rth = |Rth\ 400 - Rth\ 700| \tag{iv}$$

$$(\Delta Rth(B) - \Delta Rth(0))/B \leq -2.0 \tag{v}$$

$$0.01 \leq B \leq 30; \tag{vi}$$

it is more desirable in that the above equations (v) and (vi) being in the range of:

$$(\Delta Rth(B) - \Delta Rth(0))/B \leq -3.0 \tag{v}$$

$$0.05 \leq B \leq 25; \text{ and} \tag{vi}$$

it is even more desirable in that the above equations (v) and (vi) being in the range of:

$$(\Delta Rth(B) - \Delta Rth(0))/B \leq -4.0 \tag{v}$$

$$0.1 \leq B \leq 20. \tag{vi}$$

The chromatic dispersion controlling agent is absorbed in an ultraviolet region of 200 to 400 nm, and the Re and Rth chromatic dispersion of cellulose acylate films are controlled by containing at least one compound, which lowers $|Re_{(400)} - Re_{(700)}|$ and $|Rth_{(400)} - Rth_{(700)}|$ of the films, in an amount of 0.01 to 30% by mass with respect to the cellulose acylate solid content. The Re and Rth chromatic dispersion of cellulose acylate films are controlled by containing 0.1 to 30% by mass as an addition amount.

The cellulose acylate film has a chromatic dispersion property such that the Re and Rth values in general are larger in the longer wavelength than in the shorter wavelength side. Therefore, in order to enlarge the relatively small Re and Rth in the shorter wavelength side, smoothing the chromatic dispersion is requested. Meanwhile, the compound absorbed at an ultraviolet region of 200 to 400 nm has a chromatic dispersion property such that the light absorbance is larger in the longer wavelength than in the shorter wavelength side. When the compound itself exists uniformly inside the cellulose acylate film, it is assumed that the birefringence of the compound, that is, the chromatic dispersion of Re, Rth and light absorbance is large in the shorter wavelength side.

As described above, by using a compound having absorbance at 200 to 400 nm, and the chromatic dispersion of Re and Rth of the compound itself assumed to be large in the shorter wavelength side, it is possible to control the Re, Rth chromatic dispersion of the cellulose acylate film. Therefore, the compound which controls the chromatic dispersion being sufficiently and homogeneously soluble to cellulose acylated is requested. The range of the absorbance in the ultraviolet region of these compounds is preferably 200 to 400 nm, more preferably 220 to 395 nm, and even more preferably 240 to 390 nm.

Recently, in the liquid crystal display devices such as television, laptop computer and mobile cellular phone, the brightness was increase with less electrical power. Therefore, a light element, which is used in the liquid crystal display devices, having excellent transmittance is requested. In this regard, in the case of adding a compound, which has the absorbance at an ultraviolet region of 200 to 400 nm and which lowers $|Re_{(400)}-Re_{(700)}|$ and $|Rth_{(400)}-Rth_{(700)}|$ of films, to cellulose acylate films, a light element having excellent spectral transmittance is requested. According to cellulose acylate films of the invention, the spectral transmittance at a wavelength of 380 nm is 45% to 95%; however, the spectral transmittance at a wavelength of 380 nm being 10% or less is desired.

Accordingly, the chromatic dispersion controlling agent preferably used in the invention having the molecular weight of 250 to 1000 is preferred in the view point of volatability. It is more preferably 260 to 800, even more preferably 270 to 800, and particularly preferably 300 to 800. Within these ranges of molecular weight, the chromatic dispersion controlling agent may be in a form of specific monomer, or in a form of oligomer or polymer formed from multiple bonding of the monomer unit.

It is preferable not to emit the chromatic dispersion controlling agent during dope casting and drying process of the cellulose acylate film preparation.

(Compound Addition Amount)

The above-mentioned chromatic dispersion controlling agent preferably used in the invention is added preferably in the amount of 0.01 to 30% by mass, more preferably 0.1 to 20% by mass, and particularly preferably 0.2 to 10% by mass with respect to cellulose acylate.

(Compound Addition Method)

Further, the chromatic dispersion controlling agent may be used alone or in combination of 2 or more compounds in an arbitrary ratio.

Also, the timing of the chromatic dispersion controlling agent addition may be any time during the dope preparation process or after the completion of the dope preparation process.

Specific examples of the chromatic dispersion controlling agent preferably used in the invention include benzotriazole compounds, benzophenone compounds, cyano group-containing compounds, oxybenzophenone compounds, salicylic acid ester compounds, nickel complex salt compounds or the like.

Examples of benzotriazole compound represented by Formula (101) can be preferably used as a chromatic dispersion controlling agent of the invention.

$Q^1$-$Q^2$-OH           Formula (101)

Wherein $Q^1$ is a nitrogen-containing aromatic heterocyclic ring, $Q^2$ is an aromatic ring.

$Q^1$ is a nitrogen-containing aromatic heterocyclic ring, preferably represents a 5- to 7-membered nitrogen-containing aromatic heterocyclic ring, and more preferably represents a 6-membered nitrogen-containing aromatic heterocyclic ring. Examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene and the like. More preferably, a 5-membered nitrogen-containing aromatic heterocyclic ring include imidazole, pyrazole, triazole, tetrazole, thiazole, oxazole, benzotriazole, benzothiazole, benzoxazole, thiadiazole, oxadiazole preferably with benzotriazole being particularly preferable.

The nitrogen-containing aromatic heterocyclic ring represented by $Q^1$ may be further substituted, and the substituent is preferably the following substituent T. Further, in the case where the nitrogen-containing aromatic heterocyclic ring contains a plurality of substituent, each substituent may be condensed to form a ring structure.

The aromatic ring represented by $Q^2$ may be an aromatic hydrocarbon ring or an aromatic heterocyclic ring. Also, the aromatic rings may be monocyclic or may form a fused ring with other rings.

The aromatic hydrocarbon ring is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring is preferably an aromatic heterocyclic rings containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferable examples of the aromatic heterocyclic ring include pyridine, triazine, and quinoline.

The aromatic ring represented by $Q^2$ is preferably an aromatic hydrocarbon ring, more preferably a naphthalene ring or a benzene ring, and particularly preferably a benzene ring. $Q^2$ may be further substituted, and the substituent is preferably the following substituent T.

Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, octyl, decyl, hexadecyl, cyclopropyl, cyclopenyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atoms, and particularly 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), and the like. These substituents may be further substituted. When there are two or more substituents, they may be identical or different. If possible, they may be bonded to each other to form a ring.

The compound represented by Formula (101) is preferably a compound represented by the following formula (101-A):

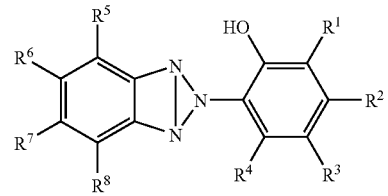

Formula (101-A)

wherein $R^1$, $R^2$, $R^3$, $R^4$, $R^5$, $R^6$, $R^7$ and $R^8$ are each independently a hydrogen or a substituent.

$R^1$, $R^2$, $R^3$, $R^4$, $R^5$, $R^6$, $R^7$ and $R^8$ each independently represent a hydrogen atom or a substituent, and the substituent may be exemplified by the above-described substituent T. These substituents may be further substituted with other substituents, and the substituents may be condensed to form a ring structure.

$R^1$ and $R^3$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; and particularly preferably an alkyl group having 1 to 12 carbon atoms (preferably having 4 to 12 carbon atoms).

$R^2$ and $R^4$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; particularly preferably a hydrogen atom or a methyl group; and most preferably a hydrogen atom.

$R^5$ and $R^8$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; particularly preferably a hydrogen atom or a methyl group; and most preferably a hydrogen atom.

$R^6$ and $R^7$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom or a halogen atom; and particularly preferably a hydrogen atom or a chlorine atom.

The compound represented by Formula (101) is preferably a compound represented by the following formula (101-B):

Formula (101-B)

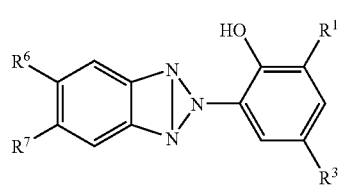

wherein $R^1$, $R^3$, $R^6$ and $R^7$ have the same as meaning as those in Formula (101-A), and their preferable ranges are the same as those in Formula (101-A).

Specific examples of the compound represented by Formula (101) will be given in the following.

UV-1

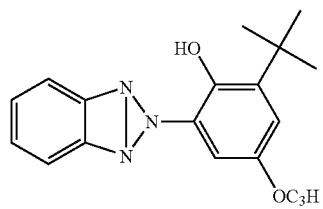

UV-2

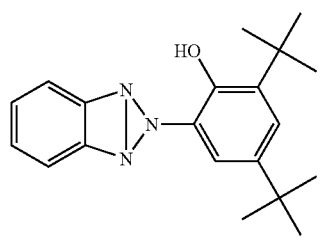

UV-3

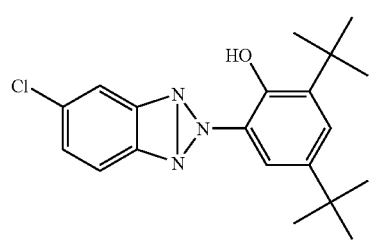

-continued

UV-4

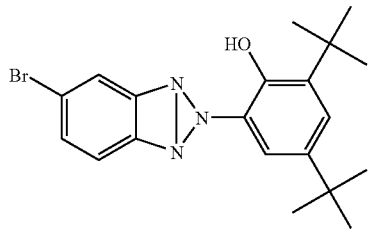

UV-5

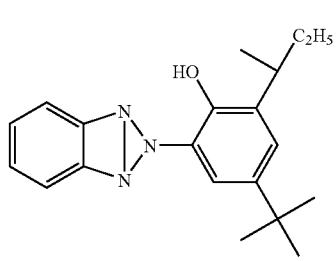

UV-6

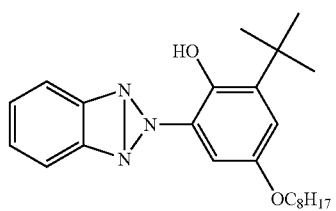

UV-7

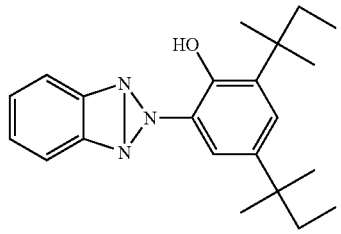

UV-8

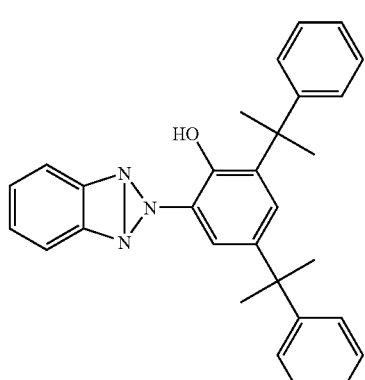

UV-9

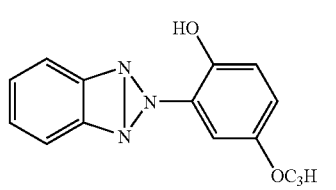

-continued
UV-10
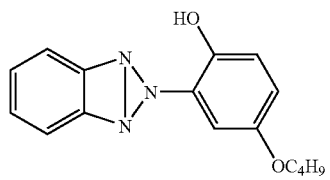
UV-11
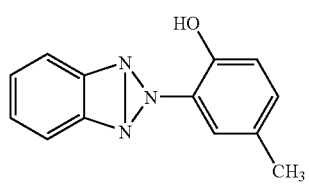
UV-12
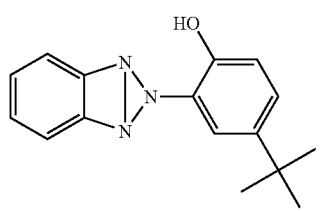
UV-13
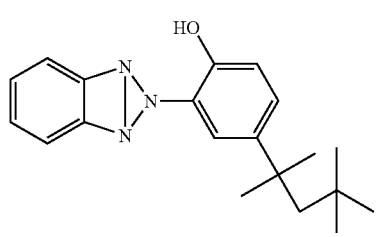
UV-14
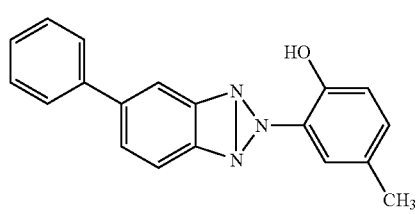
UV-15
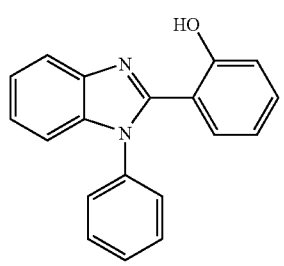
UV-16
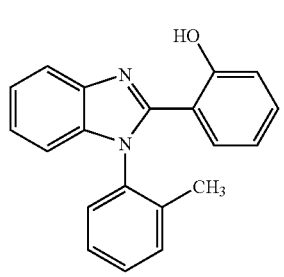
-continued
UV-17
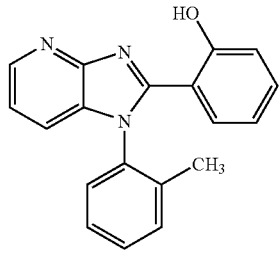
UV-18
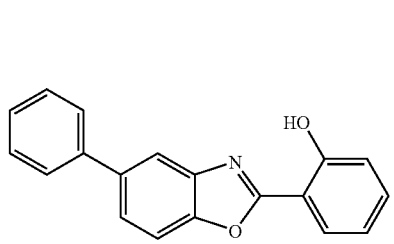
UV-19
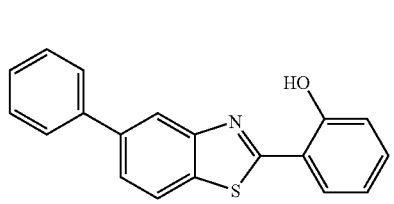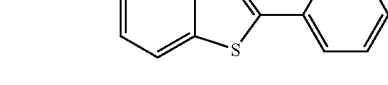
UV-20
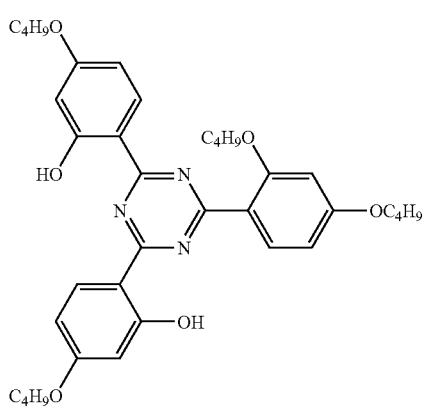
UV-21
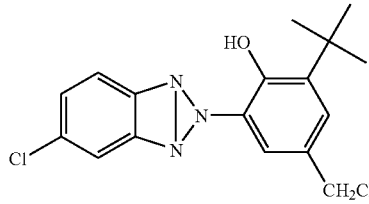
UV-22
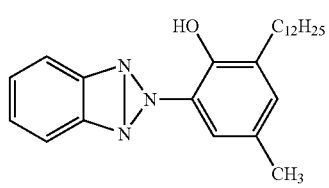

UV-23

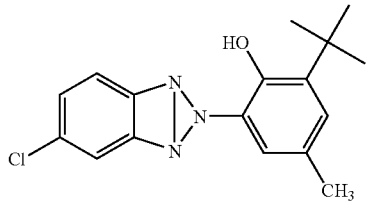

Among the benzotriazole compounds given in the above examples, the compounds excluding those having a molecular weight of 320 or less were confirmed to be advantageous in the aspect of retentivity when produced into cellulose acylate films of the invention.

As another chromatic dispersion controlling agent of the invention, the benzophenone compound represented by Formula (102) is preferably used:

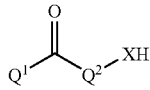

Formula (102)

wherein $Q^1$ and $Q^2$ are each independently an aromatic ring, and X is NR (wherein R is a hydrogen atom or a substituent), an oxygen atom or a sulfur atom.

The aromatic ring represented by $Q^1$ and $Q^2$ may be an aromatic hydrocarbon ring or an aromatic heterocyclic ring. These substituents may be monocyclic or may form a fused ring with other rings.

The aromatic hydrocarbon ring represented by $Q^1$ and $Q^2$ is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring represented by $Q^1$ and $Q^2$ is preferably an aromatic heterocyclic rings containing at least one selected from an oxygen atom, a nitrogen atom and a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferred examples of the aromatic heterocyclic ring are pyridine, triazine and quinoline.

The aromatic ring represented by $Q^1$ and $Q^2$ is preferably an aromatic hydrocarbon ring, more preferably an aromatic hydrocarbon ring having 6 to 10 carbon atoms, and even more preferably a substituted or unsubstituted benzene ring.

$Q^1$ and $Q^2$ may be further substituted, and the substituent is preferably the following substituent T. However, the substituent does not include carboxylic acids, sulfonic acids or quaternary ammonium salts. If possible, the substituents may be bonded to each other to form a ring structure.

X is NR (where R is a hydrogen atom or a substituent, and the substituent may be exemplified by the following substituent T), an oxygen atom or a sulfur atom. X is preferably NR (wherein R is preferably an acyl group or a sulfonyl group, and these substituents may be further substituted) or O, and particularly preferably O.

Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, octyl, decyl, hexadecyl, cyclopropyl, cyclopenyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atoms, and particularly preferably 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), and the like. These substituents may be further substituted. When there are two or more substituents, they may be identical or different. If possible, they may be bonded to each other to form a ring.

The compound represented by Formula (102) is preferably a compound represented by the following Formula (102-A):

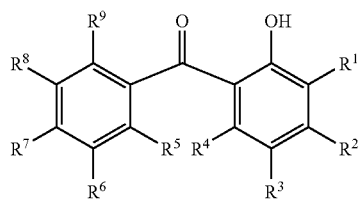

Formula (102-A)

wherein $R^1$, $R^2$, $R^3$, $R^4$, $R^5$, $R^6$, $R^7$, $R^8$ and $R^9$ are each independently a hydrogen atom or a substituent.

$R^1$, $R^2$, $R^3$, $R^4$, $R^5$, $R^6$, $R^7$, $R^8$ and $R^9$ each independently represent a hydrogen atom or a substituent, and the substituent may be exemplified by the above-described substituent T. These substituents may be further substituted with other substituents, and the substituents may be condensed to form a ring structure.

$R^1$, $R^3$, $R^4$, $R^5$, $R^6$, $R^8$ and $R^9$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^2$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably an alkoxy group having 1 to 20 carbon atoms; and particularly preferably an alkoxy group having 1 to 12 carbon atoms.

$R^7$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 20 carbon atoms (preferably having 1 to 12 carbon atoms, more preferably 1 to 8 carbon atoms, and even more preferably a methyl group); and particularly preferably a methyl group or a hydrogen atom.

The compound represented by Formula (102) is more preferably a compound represented by the following Formula (102-B):

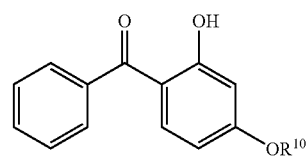

Formula (102-B)

wherein $R^{10}$ is a hydrogen atom, a substituted or unsubstituted alkyl group, a substituted or unsubstituted alkenyl group, a substituted or unsubstituted alkynyl group, or a substituted or unsubstituted aryl group.

$R^{10}$ is a hydrogen atom, a substituted or unsubstituted alkyl group, a substituted or unsubstituted alkenyl group, a substituted or unsubstituted alkynyl group, or a substituted or unsubstituted aryl group, and the substituents on the aforementioned groups can be exemplified by the substituent T.

$R^{10}$ is preferably a substituted or unsubstituted alkyl group, more preferably a substituted or unsubstituted alkyl group having 5 to 20 carbon atoms, even more preferably a substituted or unsubstituted alkyl group having 5 to 12 carbon atoms (e.g., a hexyl group, a 2-ethylhexyl group, an octyl group, a decyl group, a dodecyl group, a benzyl group, etc.), and particularly preferably a substituted or unsubstituted alkyl group having 6 to 12 carbon atoms (e.g., a 2-ethylhexyl group, an octyl group, a decyl group, a dodecyl group or a benzyl group).

The compound represented by Formula (102) can be synthesized by a known method described in JP-A No. 11-12219.

Specific examples of the compound represented by Formula (102) are given below.

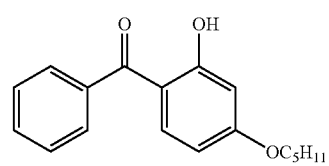

UV-101

-continued
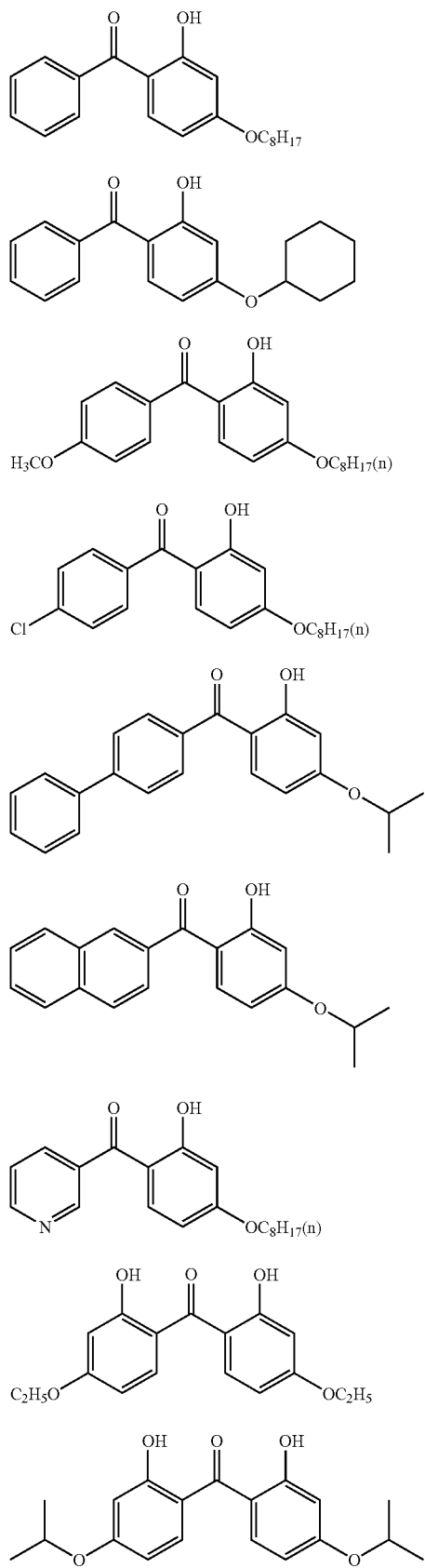
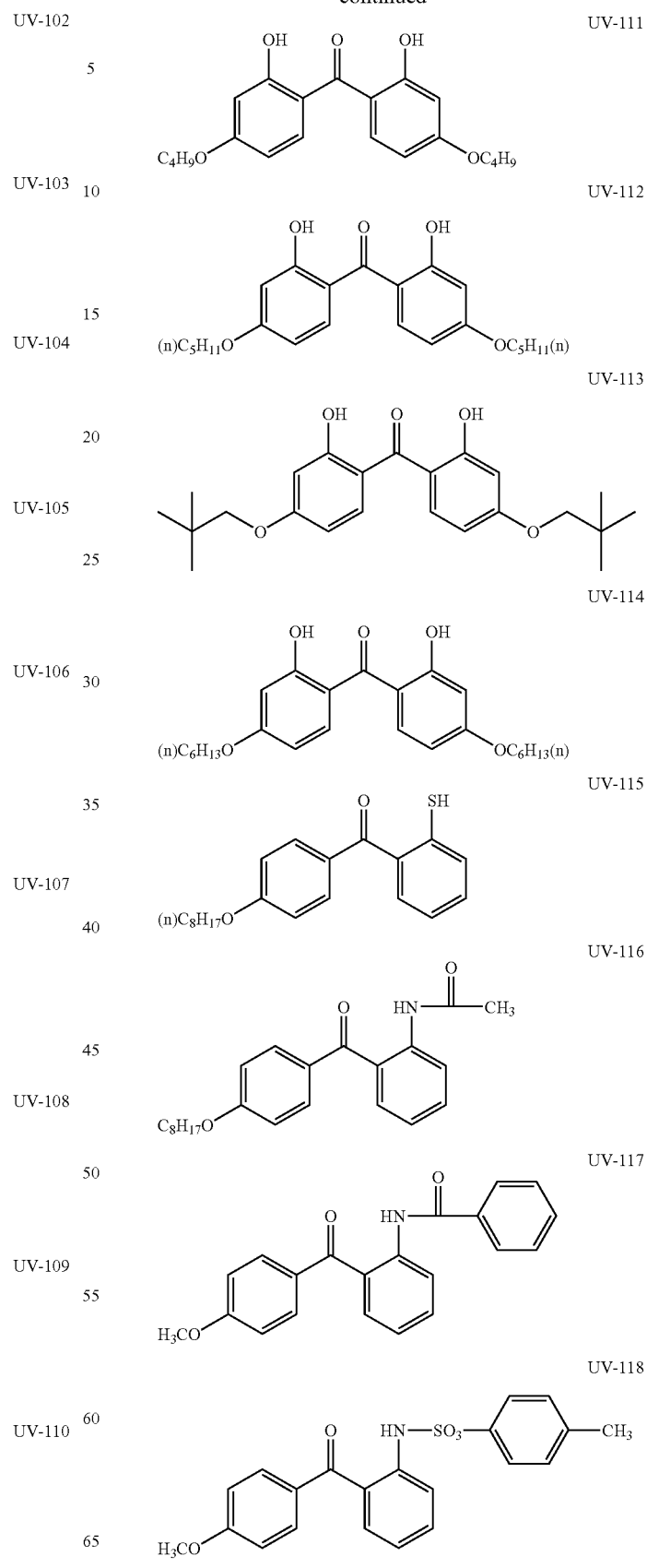

-continued

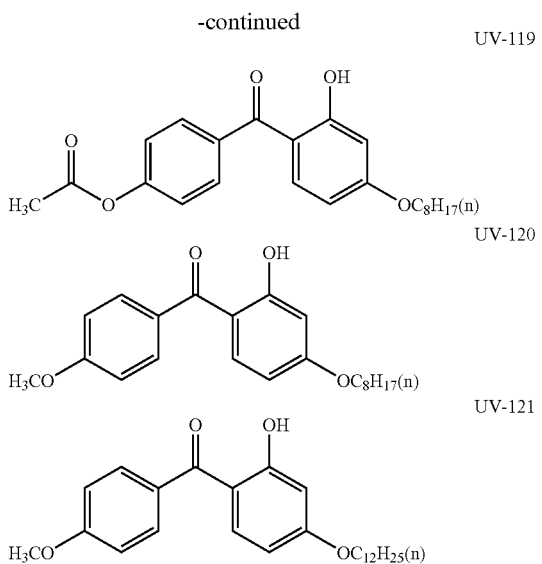

As another chromatic dispersion controlling agent used in the invention, a cyano group-containing compound represented by Formula (103) is preferably used:

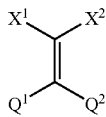

Formula (103)

wherein $Q^1$ and $Q^2$ are each independently an aromatic ring. $X^1$ and $X^2$ are each a hydrogen atom or a substituent, and at least one of them is a cyano group, a carbonyl group, a sulfonyl group or an aromatic heterocyclic ring. The aromatic ring indicated as $Q^1$ and $Q^2$ may be an aromatic hydrocarbon ring or an aromatic heterocyclic ring. Further, these may be monocyclic or may for a fused ring with other rings.

The aromatic hydrocarbon ring is preferably a monocyclic or bicyclic aromatic hydrocarbon ring having 6 to 30 carbon atoms (e.g., benzene ring, naphthalene ring, etc.), more preferably an aromatic hydrocarbon ring having 6 to 20 carbon atoms, even more preferably an aromatic hydrocarbon ring having 6 to 12 carbon atoms, and particularly preferably a benzene ring.

The aromatic heterocyclic ring is preferably an aromatic heterocyclic ring containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. The aromatic heterocyclic ring is preferably pyridine, triazine or quinoline.

The aromatic ring indicated as $Q^1$ and $Q^2$ is preferably an aromatic hydrocarbon ring, and more preferably a benzene ring.

$Q^1$ and $Q^2$ may be further substituted, and the following substituent T is preferably used. Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, octyl, decyl, hexadecyl, cyclopropyl, cyclopentyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atom, and particularly preferably 1 to 8 carbon atoms, e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzol, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms, e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atoms, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably 0 to 12 carbon atom; sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms and more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl), and the like. These substituents may be further substituted. When there are two substituents, the may be identical or different. If possible, the substituents may be connected to each other to form a ring.

$X^1$ and $X^2$ are a hydrogen atom or a substituent and at least one group is a cyano group, a carbonyl group, a sulfonyl group, an aromatic heterocyclic ring. A substituent represented by $X^1$ and $X^2$ may be exemplified by the above-mentioned substituent T. In addition, the substituent represented by $X^1$ and $X^2$ may be further substituted by other substituents and each substituent represented by $X^1$ and $X^2$ may be annelated to form a ring structure.

$X^1$ and $X^2$ are preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is preferably a compound represented by the following Formula (103-A):

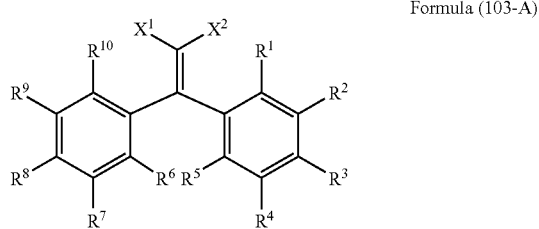

Formula (103-A)

wherein $R^1$, $R^2$, $R^3$, $R^4$, $R^5$, $R^6$, $R^7$, $R^8$, $R^9$ and $R^{10}$ are each independently a hydrogen atom or a substituent. $X^1$ and $X^2$ have the same meanings as those in Formula (103) and their preferable ranges are the same as those in Formula (103).

$R^1$, $R^2$, $R^3$, $R^4$, $R^5$, $R^6$, $R^7$, $R^8$, $R^9$ and $R^{10}$ each independently represent a hydrogen atom or a substituent, and the substituent may be exemplified by the above-described substituent T. These substituents may be further substituted with other substituents, and the substituents may be annelated to form a ring structure.

$R^1$, $R^2$, $R^4$, $R^5$, $R^6$, $R^7$, $R^9$ and $R^{10}$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^3$ and $R^8$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 12 carbon atoms, or an alkoxy group having 1 to 12 carbon atoms; and particularly preferably a hydrogen atom.

The compound represented by Formula (103) is more preferably a compound represented by the following Formula (103-B):

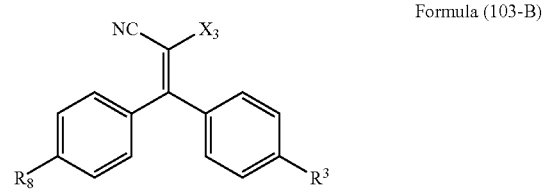

Formula (103-B)

wherein $R^3$ and $R^8$ have the same meanings as those in Formula (103-A) and their preferable ranges are the same as those in Formula (103-A). $X^3$ represents a hydrogen atom or a substituent.

$X^3$ represents a hydrogen atom or a substituent, and the substituent may be exemplified by the above-described substituent T. The substituent may be further substituted with other substituents, if possible. $X^3$ is preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is more preferably a compound represented by the following Formula (103-C):

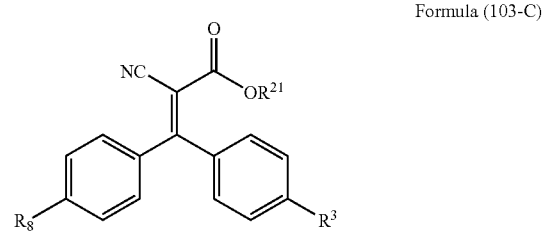

Formula (103-C)

wherein $R^3$ and $R^8$ have the same meanings as those in Formula (103-A) and their preferable ranges are the same as those in Formula (103-A). $R^{21}$ represents an alkyl group having 1 to 20 carbon atoms.

When both of $R^3$ and $R^8$ are a hydrogen atom, $R^{21}$ is preferably an alkyl group having 2 to 12 carbon atoms, more preferably an alkyl group having 4 to 12 carbon atoms, even more preferably an alkyl group having 6 to 12 carbon atoms, particularly preferably an octyl group, a tert-octyl group, a 2-ethylhexyl group, a decyl group, or a dodecyl group, and most preferably 2-ethylhexyl group.

When $R^3$ and $R^8$ are not a hydrogen atom, the compound represented by the Formula (103-C) has a molecular weight of 300 or more and $R^{21}$ is preferably an alkyl group having 20 or less carbon atoms The compound represented by Formula (103) of the invention can be synthesized by a method described in Journal of American Chemical Society, Vol. 63, pp. 3452 (1941).

Specific examples of the compound represented by Formula (103) are given below.

UV-201
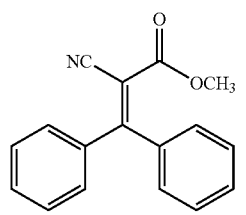

UV-202
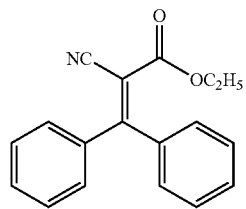

UV-203
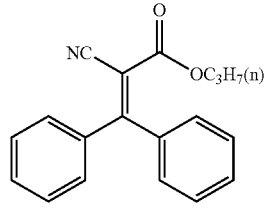

UV-204
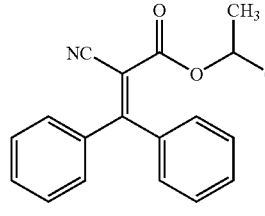

UV-205
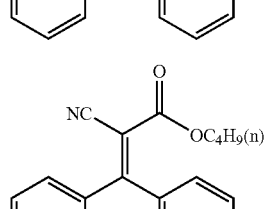

UV-206
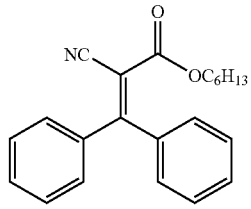

UV-207
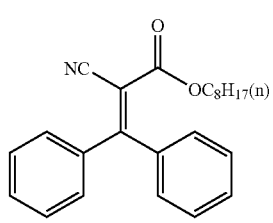

UV-208
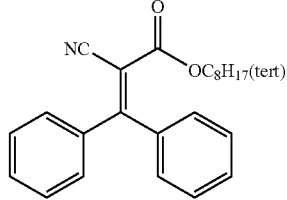

UV-209
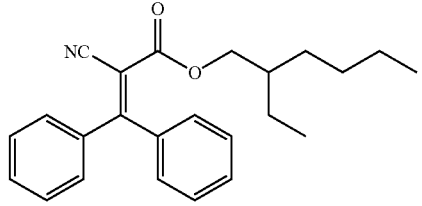

UV-210
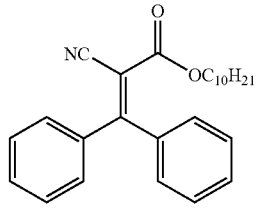

UV-211
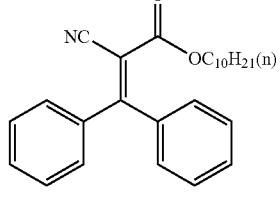

UV-212

-continued
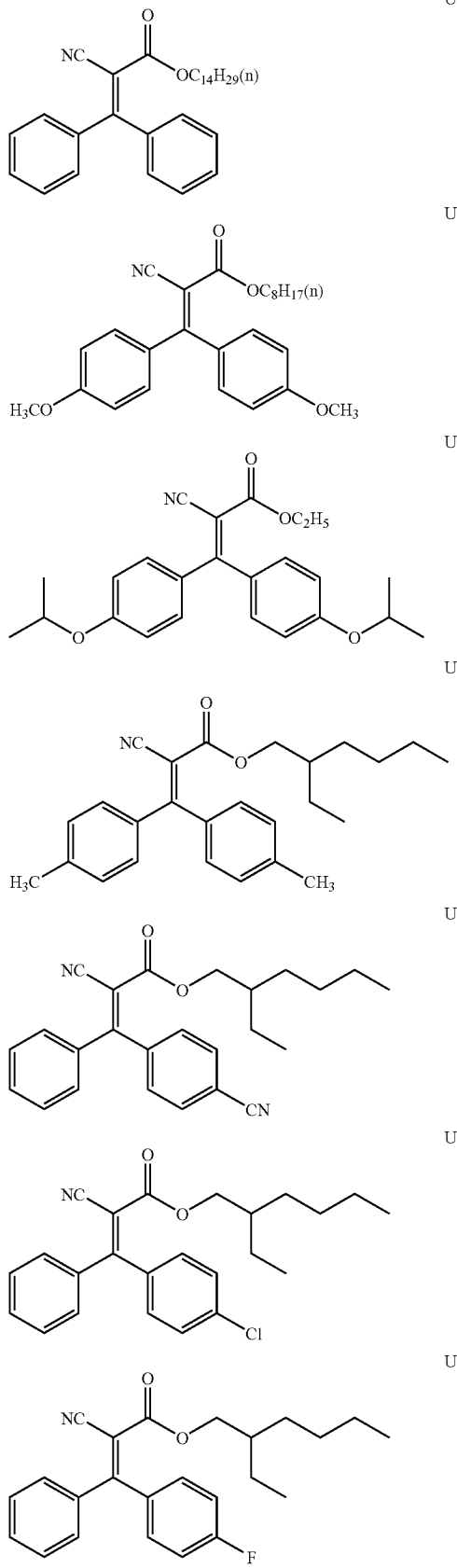
UV-213
UV-214
UV-215
UV-216
UV-217
UV-218
UV-219
-continued
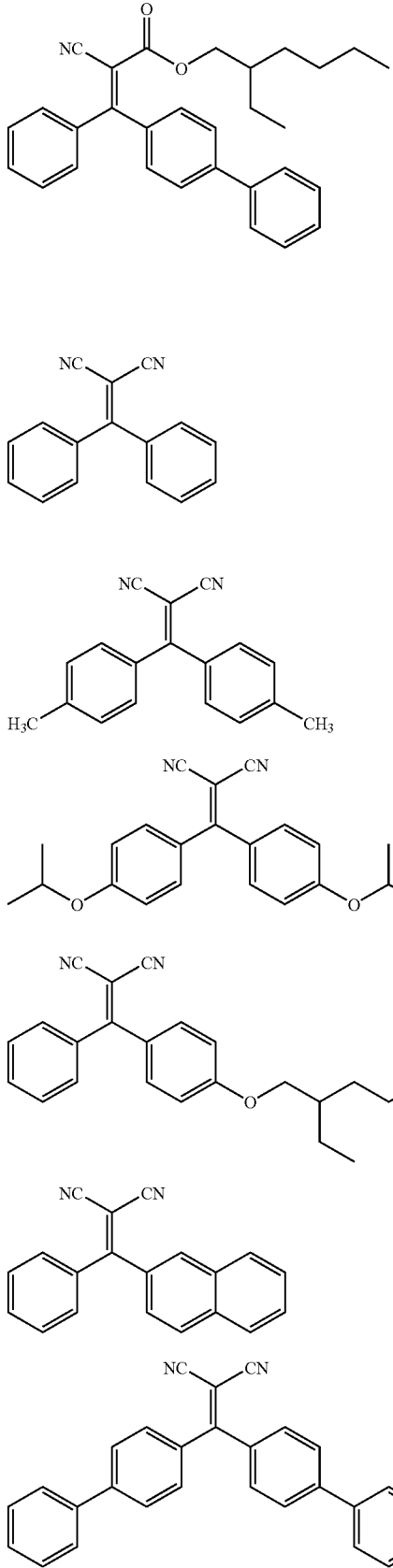
UV-220
UV-221
UV-222
UV-223
UV-224
UV-225
UV-226

-continued

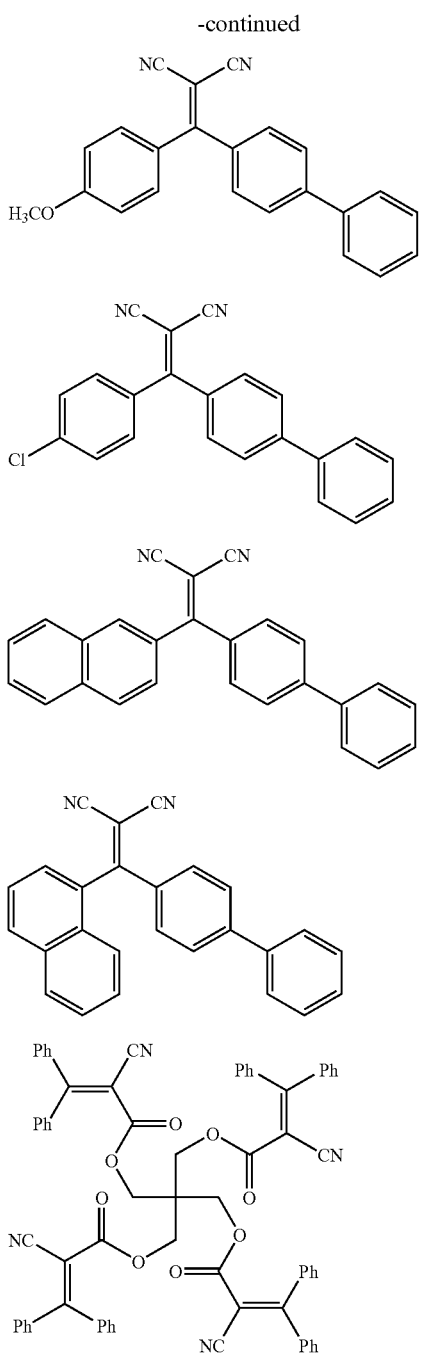

UV-227

UV-228

UV-229

UV-230

UV-231

[Fine Particles of Matting Agent]

It is preferable that the cellulose acylate film according to the invention contains fine particles as a matting agent. Examples of the fine particles usable in the invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Fine particles containing silicon are preferred because of having a low turbidity. In particular, silicon dioxide is preferred. It is preferable that fine particles of silicone dioxide have an average primary particle size of 20 nm or less and an apparent specific gravity of 70 g/l or more. Fine particles having a small average primary particle size of 5 to 16 nm are more preferable, since the haze of the resultant film can be lowered thereby. The apparent specific gravity is preferably form 90 to 200 g/l or more and more preferably from 100 to 200 g/l or more. A higher apparent specific gravity makes it possible to prepare a dispersion having the higher concentration, thereby improving haze and aggregates.

These fine particles form the secondary particles having an average particle size of usually from 0.1 to 3.0 μm. In a film, these fine particles occur as aggregates of the primary particles and provide irregularities of 0.1 to 3.0 μm on the film surface. It is preferred that the average secondary particle size is from 0.2 μm to 1.5 μm, more preferably from 0.4 μm to 1.2 μm and most preferably from 0.6 μm to 1.1 μm. The primary or secondary particle size is determined by observing a particle in the film under a scanning electron microscope and referring the diameter of its circumcircle as the particle size. 200 particles are observed at various sites and the mean is referred to as the average particle size.

As the fine particles of silicon dioxide, use can be made of marketed products such as AEROSIL R972, R972V, R974, R812, 200, 200V, 300, R202, OX50 and TT600 (each manufactured by Dehussa Japan Co., Ltd.). As the fine particles of zirconium oxide, use can be made of products marketed under the trade name of, for example, AEROSIL R976 and R811 (each manufactured by Dehussa Japan Co., Ltd.).

Among these products, AEROSIL 200V and AEROSIL R972V are particularly preferable, since they are fine particles of silicon dioxide having an average primary particle size of 20 nm or less and an apparent specific gravity of 70 g/l or more and exert an effect of largely lowering the coefficient of friction while maintaining the turbidity of the optical film at a low level.

To obtain a cellulose acylate film having particles with a small average secondary particle size, some techniques may be proposed in the step of preparing a dispersion of the fine particles in the invention. For example, the fine particles are mixed with a solvent under stirring to preliminarily give a fine particle dispersion. Then this fine particle dispersion is added to a small amount of a cellulose acylate solution having been prepared separately and dissolved therein under stirring. Then it is further mixed with a main cellulose acylate dope solution. This is a preferable preparation method from the viewpoints of achieving a high dispersibility of the fine particles of silicon dioxide while causing little re-aggregation of the fine particles of silicon dioxide. An alternative method comprises adding a small amount of a cellulose ester to a solvent, dissolving it under stirring, then adding fine particles thereto, dispersing the fine particles in a dispersing machine to give a solution of the fine particle additive, and then sufficiently mixing the solution of the fine particle additive with a dope solution in an in-line mixer. Although the invention is not restricted to these methods, it is preferable in the step of mixing and dispersing the fine particles of silicon dioxide in, for example, a solvent that the silicon oxide concentration ranges from 5 to 30% by weight, preferably from 10 to 25% by weight and most preferably from 15 to 20% by weight. A higher dispersion concentration is preferred, since the solution turbidity in response to the amount added is lowered and haze and aggregation are improved thereby. The final content of the cellulose acylate in the dope solution preferably ranges from 0.01 to 1.0 g/m$^2$, more preferably from 0.03 to 0.3 g/m$^2$ and most preferably from 0.08 to 0.16 g/m$^2$.

Preferable examples of lower alcohols usable as the solvent include methyl alcohol, ethyl alcohol, propyl alcohol, isopropyl alcohol and butyl alcohol. As solvents other than lower alcohols, it is preferable to use solvents which have been used in forming cellulose ester films.

[Plasticizer, Anti-deterioration Agent, Releasing Agent]

The cellulose acylate film of the invention may include, in addition to the optical anisotropy reducing compound and the wavelength dispersion regulating agent mentioned above, various additives (such as a plasticizer, an anti-ultraviolet agent, an anti-deterioration agent, a releasing agent, and an infrared absorber), which may be added in the preparation steps according to the purpose and which may be a solid or an oily substance. For example, a mixing of an ultraviolet absorbing material at 20° C. or lower or at 20° C. or higher, and a mixing of a plasticizer are possible as described in JP-A No. 2001-151901. Also an infrared absorbing dye is described for example in JP-A No. 2001-194522. Also the addition may be executed any time in the process of preparation of a dope solution, or by adding an additive adding step in a final preparation step of such process. Also in the case where the cellulose acylate film is formed of plural layers, the kind and the amount of the additive may be different in each layer. These are known technologies as described for example in JP-A No. 2001-151902. For such technologies, there are preferably used materials described in detail in Japan Institute of Invention and Innovation, Journal of Technical Disclosure (Technical Publication No. 2001-1745, pp. 16-22, Mar. 15, 2001, published by Japan Institute of Invention and Innovation).

[Ratio of Addition of Compounds]

In the cellulose acylate film of the invention, the total amount of compounds having a molecular weight of 3,000 or less is preferably 5 to 45%, more preferably 10 to 40% and even more preferably 15 to 30% with respect to the weight of cellulose acylate. Such compounds include an optical anisotropy reducing compound, a wavelength dispersion regulating agent, an anti-ultraviolet agent, a plasticizer, an anti-deterioration agent, fine particles, a releasing agent, an infrared absorber and the like as described above, and have a molecular weight of preferably 3,000 or less, more preferably 2,000 or less and even more preferably 1,000 or less. In the case where the total amount of these compounds is 5% or less, properties of the cellulose acylate alone tend to be exhibited, thereby resulting in fluctuations in optical performances and physical strength in response to changes in temperature and humidity. Further, the total amount of these compounds above 45% may exceeds a limit of solubility of these compounds in the cellulose acylate film, thus causing a precipitation on the film surface and leading to a white turbidity of the film (bleeding from the film).

[Organic Solvent for Cellulose Acylate Solution]

In the invention, the cellulose acylate film is preferably produced by a solvent cast method, utilizing a solution (dope) prepared by dissolving cellulose acylate in an organic solvent. A principal solvent to be used in the invention is preferably selected from an ester, a ketone, and an ether having 3 to 12 carbon atoms, and a halogenated hydrocarbon having 1 to 7 carbon atoms. The ester, ketone or ether may have a ring structure. A compound having two or more functional groups of ester, ketone or ether (namely —O—, —CO— or —COO—) can also be used as a principal solvent, and another functional group such as an alcoholic hydroxyl group may be present. In a principal solvent having two or more functional groups, the number of carbon atoms of such solvent may maintained within a range defined for a compound having either of such functional groups.

For the cellulose acylate film of the invention, a halogenated hydrocarbon of chlorine type may be used as the principal solvent, or a non-chlorine solvent may be used as the principal solvent as described in Japan Institute of Invention and Innovation, Journal of Technical Disclosure, Technical Publication No. 2001-1745, pp. 12-16.

A solvent for the cellulose acylate solution and film of the invention, including a dissolving method, is described, as preferred embodiments, in following Patent Documents: JP-A Nos. 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988 and 11-60752. These Patent Documents describe not only a solvent preferable for the cellulose acylate of the invention but also properties of a solution thereof and substances to be present, and constitute preferable embodiments also in the present invention.

[Manufacturing Process of Cellulose Acylate Film]

[Dissolving Process]

A solution (dope) of the cellulose acylate of the invention is not restricted in a method of dissolution, and may be prepared at a room temperature, or by a cooled dissolving method or a high-temperature dissolving method, or a combination thereof. For a process of preparation of a cellulose acylate solution of the invention, and processes of concentration and filtration of the solution associated with the dissolving process, there can be preferably used a manufacturing process described in detail in Japan Institute of Invention and Innovation, Journal of Technical Disclosure (Technical Publication No. 2001-1745, pp. 22-25, Mar. 15, 2001, published by Japan Institute of Invention and Innovation).

(Transparency of Dope Solution)

The cellulose acylate solution preferably has a dope transparency of preferably 85% or higher, more preferably 88% or higher and more preferably 90% or higher. It was confirmed that various additives are sufficiently dissolved in the cellulose acylate solution (dope) of the invention. For the specific calculation method of dope transparency, the dope solution is filled in glass cell of 1 cm square and absorbance at 550 nm is measured using the spectrophotometer (UV-3150, manufactured by Shimadzu Corporation). The absorbance of the solvent is previously measured as the blank, and the transparency of cellulose acylate is calculated from a ratio to the absorbance of the blank.

[Casting, Drying and Winding Process]

Next, the process of producing a film using the cellulose acylate solution of the invention is described below. The cellulose acylate film of the invention can be produced by the method and apparatus conventionally used for preparation of the cellulose triacetate films according to the solution casting method and solution casting apparatus. First, the dope (cellulose acylate solution) prepared in a dissolving tank (pot) is stored into a stock tank, defoamed and finally prepared. Then, the dope is sent from outlet to a pressurized die through a quantitative gear pump of pressing type, which can quantitatively send the dope with high precision, for example, according to rotation number, and from a metal fittings of the pressurized die (slit), the dope is evenly cast on a metal support of casting part running endlessly. At the peeling point where the metal support nearly once rotates, the insufficiently dried dope film (which is referred to as web) is peeled from the metal support. While both sides of the web are fixed with clips to keep the width, the web is transferred and dried with a tenter, then the web is successively transferred with rollers of drying apparatus to complete drying, and wound up by a winder in a predetermined length. The combination of the tenter and the rollers of drying apparatus can be varied according to the purpose. In the solution casting method used for the functional protective film of optical member for electric display or silver halide photosensitive material, in which the cellulose acylate films according to the invention are mainly used, in addition to the solution casting apparatus, a coating apparatus is also often used for the purpose of providing processing of the film surface such as an undercoating layer, an antistatic layer, an anti-halation layer and a protective layer. This is described in detail in the Laid-open Technical Report, pp. 25 to 30 (No. 2001-1745, Mar. 15, 2001, Japan Institute of Invention and Innovation), and classified as casting (including co-cast), metal support, drying and peeling, which is preferably used in the invention. The thickness of the cellulose acylate film is preferably in the range of 10 to 120 μm, more preferably 20 to 100 μm, and more preferably 30 to 90 μm.

[Changes of Optical Property of Film after High Humidity Processing]

[Evaluation of Physical Properties for Cellulose Acylate Film]

Regarding the change in the optical properties according to the environmental change of the cellulose acylate film of the invention, it is preferable that the variation of Re and Rth of the film processed at 60° C. and 90% RH for 240 hours is 15 nm or less, more preferably 12 nm or less and more preferably 10 nm or less.

[Change in Optical Property of Film after High Temperature Processing]

More over, it is preferable that the variation of Re and Rth of the film processed at 80° C. for 240 hours is 15 nm or less, more preferably 12 nm or less, and more preferably 10 nm or less.

[Amount of Volatilized Compound after Heating Process of Film]

For the compound for lowering Rth and the compound for decreasing ΔRth, which can be preferably used in cellulose acylate film of the invention, it is preferable that the amount of the compound volatilized from the film, which is processed at 80° C. for 240 hours is 30% or below, more preferably 25% or below, and more preferably 20% or below.

Further, the amount of the compound volatilized from the film is evaluated as followings. The film treated at 80° C. for 240 hours and the untreated film were dissolved in a solvent, respectively and the compounds were detected by high performance liquid chromatography. The amount of the residual compounds in the film is calculated as peak areas of the compounds by the following equation.

Volatilization ratio (%)={(amount of residual compounds in untreated products)−(amount of residual compounds in treated products)/(amount of residual compounds in untreated products)× 100

[Glass Transition Temperature Tg of Film]

The glass transition temperature Tg of the cellulose acylate film of the invention is 80 to 165° C. From the viewpoint of heat resistance, Tg is preferably 100 to 160° C., and more preferably 110 to 150° C. The glass transition temperature Tg is measured using a 10 mg sample of the cellulose acylate film of the invention by differential scanning calorimeter (DSC2910, manufactured by T.A Instrument) from room temperature to 200° C. at a rate of the temperature rising and falling of 5° C./min.

[Haze of Film]

The haze of the cellulose acylate film of the invention is preferably 0.01 to 2.0%, more preferably 0.05 to 1.5%, and particularly preferably 0.1 to 1.0%. The transparency of the film as an optical film is important. The haze is measured using a sample of the cellulose acylate film of the invention cut into the size of 40 mm×80 mm by hazemeter (HGM-2DP, manufactured by Suga test instruments Co., Ltd.) under the condition of 25° C. and 60% RH according to JIS K-6714.

[Humidity Dependency of Re and Rth of Film]

The in-plane retardation Re and the retardation Rth in the thickness direction of the cellulose acylate film of the invention are preferably those which have a minor change due to the humidity. Specifically, the difference between the Rth value as measured under the condition of 25° C. and 10% RH and the Rth value as measured under the condition of 25° C. and 80%, namely ΔRth (=Rth 10% RH−Rth 80% RH) is preferably in the range of 0 to 50 nm, more preferably 0 to 40 nm, and more preferably 0 to 35 nm.

[Equilibrium Water Content of Film]

The equilibrium water content of the cellulose acylate film of the invention is preferably 0 to 4% under the condition of 25° C. and 80%, more preferably 0.1 to 3.5%, and particularly preferably 1 to 3%, regardless of film thickness, not to undermine the adherence to the water-soluble polymer such as polyvinylalcohol, when used as a protective film of polarized plate. 4% or more of equilibrium water content is not preferable because the dependency on humidity variation of retardation is too high, when used as a support of optically compensatory film. The water content is measured using a sample of the cellulose acylate film of the invention cut into the size of 7 mm×35 mm by moisture meter and sample drying apparatus (CA-03, VA-05, manufactured by Mitsubishi Chemical Corporation) according to the Karl Fisher's method, to divide the amount of water (g) by the mass of the sample (g).

[Moisture Permeability]

The moisture permeability of the cellulose acylate film using as an optically compensatory film of the invention is measured according to the JIS Z-0208 under the condition of 60° C. and 95% RH. The moisture permeability is preferably in the range of 400 to 2000 g/m$^2$·24 h, reduced in terms of film thickness of 80 μm, more preferably 500 to 1800 g/m$^2$·24 h and particularly preferably 600 to 1600 g/m$^2$·24 h. When the value is above 2000 g/m$^2$·24 h, the tendency that the absolute value of humidity dependency of Re value and Rh value of the film exceeds 5 nm/% RH is strengthened. More over, in the case of the optical compensation film composed of the optical anisotropic film layered on the cellulose acylate film of the invention, the tendency that the absolute value of humidity dependency of Re value and Rh value of film exceed 5 nm/% RH is strengthened, and thus it is not preferable. When the optically compensatory sheet or the polarizer is incorporated in liquid crystal display apparatus, variation of hue or deterioration of viewing angle is caused. Also, in the case where the polarizer is prepared to adhere on both sides of the polarizing film, when the moisture permeability is below 400 g/m$^2$·24 h, the defective adhesion occurs because the cellulose acylate film prevents the adhesive from being dried. When the cellulose acylated film is too thick, the moisture permeability is lowered, while the thin film increases the water permeability. Thus, any film thickness sample is necessary to be designed to reduce in term of 80 μm. The film thickness is reduced by (water permeability in terms of 80 μm=measured water permeability×measured film thickness/80 μm).

For the measuring method, the method described in "The physical property of polymer II" (polymer experiment study 4, published by Kyoritsu Publication) page 285 to 294: measurement of vapor permeability (mass method, thermo-hygrometer, vapor pressure method and absorption amount method) can be applied. The humidity of 70 mm$\phi$ cellulose acylate film sample of present invention is controlled under the condition of 25° C., and 90% RH and 60° C., and 5% RH for 24 hours, and the sample is subjected to a moisture permeability tester (KK-709007, manufactured by Toyo Seiki Seisakusho, Ltd.) to calculate a moisture content per unit area (g/m$^2$), according to JIS Z-0208 by using the following equation.

Moisture permeability=mass after moisture conditioning–mass before moisture conditioning

[Dimensional Change of Film]

Regarding the dimensional stability of the cellulose acylate film of the invention, the rate of dimensional change under high humidity, as measured after keeping the sample under the condition of 60° C., and 90% RH for 24 hours, and the rate of dimensional change under high temperature, as measured after keeping the sample under the condition of 90° C., and 5% RH for 24 hours are preferably 0.5% or less, more preferably 0.3% or less and more preferably 0.15% or less.

Specific measuring method is as follows. Two samples of the cellulose acylate film are prepared in a size of 30 mm×120 mm, and the humidity of the sample is conditioned at 25° C., and 60% RH for 24 hours. The 6 mm$\phi$ hole is opened at each of the ends of the sample at an interval of 100 mm by automatic pin gauge (manufactured by Shinto Scientific Co., Ltd.), and distance between these punched holes are measured (L0). The distance (L1) between the punched holes after treatment under the condition of 60° C., and 90% RH for 24 hours, and the distance (L2) between the punched holes after treatment under the condition of 90° C., and 5% RH for 24 hours are measured. The measuring is performed to the minimum scale of the order of 1/1000 mm. The rate of dimensional change is calculated according to the following equation.

Rate of dimensional change at 60° C., and 90% RH (high humidity)=$\{|L0-L1|/L0\}\times100$, Rate of dimensional change 90° C., and 5% RH (high temperature)=$\{|L0-L2|/L0\}\times100$

[Elastic Modulus of Film]

(Elastic Modulus)

The elastic modulus of the cellulose acylate film is preferably 200 to 500 kgf/mm$^2$, more preferably 240 to 470 kgf/mm$^2$, and more preferably 270 to 440 kgf/mm$^2$. Specifically, the samples are stretched by 0.5% tensile strength under the condition of 23° C. and 70% and stretching rate of 10%/min. The stress is measured using universal tensile tester (STM T50BP, manufactured by Toyo Baldwin Co., Ltd.) to determine the elastic modulus.

[Coefficient of Optical Elasticity of Film]

(Optical Elasticity of Film)

The coefficient of optical elasticity of a cellulose acylate according to the present invention is preferably $50\times10^{-13}$ cm$^2$/dyne or less, more preferably $30\times10^{-13}$ cm$^2$/dyne or less, and most preferably $20\times10^{-13}$ cm$^2$/dyne. As a specific measuring method, a cellulose acylate film sample of 12 mm×12 mm was applied with tensile stress in a longitudinal direction, and the retardation at that time was measured by ellipsometer (M150, JASCO Corporation), and then the coefficient of optical elasticity was calculated from the variation of the retardation with respect to the stress.

[Evaluation Method of the Cellulose Acylate Film]

In an evaluation method of the present invention, the measuring was performed by following method.

(Measuring of Wavelength Dispersion of Re, Rth)

Humidity of sample of 30 mm×40 mm was conditioned at 25° C., 60% RH for 2 hours, and Re at respective wavelengths was calculated by entering the light having wavelength of 780 nm to 380 nm in a normal direction of a film in an ellipsometer M-150 (manufactured by JASCO Corporation) to measure wavelength dispersion of Re.

(Molecular Orientation Axis)

Humidity of sample of 70 mm×100 mm was conditioned at 25° C., 60% RH for 2 hours, and the molecular orientation axis was calculated form the phase difference at the time that an incident angle in a vertical incidence has changed by an automatic birefringence meter (KOBRA21DH, Oji Scientific Instruments Co., Ltd.).

(Axis Shift)

Furthermore, an axis shift angle was measured using automatic birefringence meter. Twenty points at equal intervals are measured over the whole width in a transverse direction and an average value of absolute values was obtained. A range of phase retardation axis angle (axis shift) is that twenty points at equal intervals are measured over the whole width in a transverse direction and the difference between average of four points from the large absolute value of the axis shift and average of four points from the small absolute value of the axis shift.

(Transmittance)

The transmittance of visible light (615 nm) of sample of 20 mm×70 mm was measured at 25° C., 60% RH using a transparency measuring instrument (AKA photoelectric tube colorimeter, KOTAKI Ltd.).

(Spectroscopic Characterization)

The transmittance at wavelength of 300 to 450 nm of sample of 13 mm×40 mm was measured at 25° C., 60% RH using a spectrophotometer (U-3210, HITACHI LTD.). The inclination width was obtained at a wavelength of 75%–a wavelength of 5%. A limit wavelength was appeared at a wavelength of (inclination angle/2)+5%. An absorption edge was appeared at a wavelength having transmittance of 0.4%. From this, the transmittance at 380 nm and 350 nm was evaluated.

[Property of Film Surface]

It is preferred that a surface of cellulose acylate film of the present invention has an arithmetic average roughness (Ra) of the surface unevenness of the film of 0.1 μm or less, and a maximum height (Ry) of 0.5 μm or less based on JISB0601-1994. More preferably, the arithmetic average roughness (Ra) is 0.05 μm or less and the maximum height (Ry) is 0.2 μm or less. Shapes of recess and projection of the film surface can be evaluated using an atomic force microscope (AFM).

[Irregularity in Plane of Retardation of Cellulose Acylate Film]

It is preferred that the cellulose acylate film of the present invention satisfies following equation.

$|Re(MAX)-Re(MIN)|\leq 3$ and $|Rth(MAX)-Rth(MIN)|\leq 5$ (wherein, Re(MAX), Rth(MAX) are maximum retardation values of a film of 1 m square cut off optionally, and Re(MIN), Rth(MIN) are minimum values thereof, respectively).

[Retention Property of Film]

For the cellulose acylate film of the present invention, retention property is required for various compounds which are added to the film. Specifically, the mass change of the film is preferably 0 to 5% when the cellulose acylate film of the present invention is left under the condition of 80° C./90% RH for 48 hours. It is more preferably 0 to 3%, and more preferably 0 to 2%.

(Evaluation Method for the Retention Property)

The sample was cut into a size of 10 cm×10 cm, and left under atmosphere of 23° C. and 55% RH for 24 hours and then the mass was measured. Then, it was left under the condition of 80±5° C. and 90±10% RH for 48 hours. The surface of the sample after the treatment was lightly wiped, and left at 23° C. and 55% RH for one day, and then the mass was measured. The retention property was calculated by the following method.

Retention property (mass %)={(the mass before being left−the mass after being left)/the mass before being left}×100

[Mechanical Properties of Film]

(Curl)

The curl value of the cellulose acylate film of the present invention in the horizontal direction is preferably −10/m to +10/m. When carrying out the surface treatment, conduction of the rubbing treatment in applying and building optical anisotropic layers, or carrying out application and building or lamination of an alignment film or optical anisotropic layer and the like for a long time for the cellulose acylate film of the present invention as described below, if the curl value of the cellulose acylate film of the present invention in the horizontal direction is beyond the above-mentioned range, it may cause problems in handling the film or cause cutting of the film. In addition, since the film contacts strongly with the convey roll at the edge or central part and the like of the film, the dust is easy to occur, adhesion of foreign substances onto the film increases, and point defect of the optical compensation film or frequency of application line may be beyond the acceptable value. In addition, with the curl in the above-mentioned range, it is possible to reduce spot trouble which is easy to occur when installing the optical anisotropic layer, and also prevent air bubbles from entering in polarization film lamination, so it is preferred.

The curl value can be measured according to the measurement method set forth by American National Standards Institute (ANSI/ASCPH1.29-1985).

(Tear Strength)

The tear strength based on the tear test method of JISK 7128-2: 1998 (Elmendorf tear method) is preferably 2 g or more for the cellulose acylate film of the present invention in the thickness range of 20 to 80 μm. It is more preferably 5 to 25 g, and more preferably 6 to 25 g. In addition, it is preferably 8 g or more when converted to 60 μm, more preferably 8 to 15 g. Specifically, 50 mm×64 mm of the sample segment is regulated in humidity under the condition of 25° C. and 65% RH for 2 hours, and then it can be measured using a tear strength tester of light load.

[The Amount of the Remaining Solvent of Film]

The cellulose acylate film of the present invention is preferably dried at the condition to make that the amount of the remaining solvent is in the range of 0.01 to 1.5 mass %. It is more preferably 0.01 to 1.0 mass %. It is possible to suppress the curl by regulating the amount of the remaining solvent in the transparent supporter which is used in the present invention to 1.5% or less. It is more preferably 1.0% or less. It is considered that the main factor of the effects is that free accumulation is reduced by reducing the amount of the remaining solvent in filming by the above-mentioned solvent cast method.

[Hygroscopic Expansion Coefficient of Film]

The hygroscopic expansion coefficient of the cellulose acylate film of the present invention is preferably $30\times10^{-5}$/% RH or less. The hygroscopic expansion coefficient is more preferably $15\times10^{-5}$/% RH or less, and more preferably $10\times10^{-5}$/% RH or less. In addition, the hygroscopic expansion coefficient is preferable as it is small, but usually, it is a value of $1.0\times10^{-5}$/% RH or more. The hygroscopic expansion coefficient refers to the amount of the change of the sample length when the relative humidity changes at certain temperature. By regulating the hygroscopic expansion coefficient, it is possible to prevent increase in frame-shaped transmission, i.e., light leakage by distortion while maintaining optical compensation functions of the optical compensation film in using the cellulose acylate film of the present invention as an optical compensation film supporter.

[The Surface Treatment]

By carrying out the surface treatment depending on the situation, it is possible to achieve improvement of adhesion of the cellulose acylate film to each of the function layers (for example, the primer layer and the back layer). For example, it is possible to use glow discharge treatment, ultraviolet light irradiation treatment, corona treatment, flame treatment, acid or alkali treatment. The glow discharge treatment herein may be low temperature plasma which occurs under low pressure gas of $10^{-3}$ to 20 Torr, and further it is also preferably plasma treatment under atmospheric pressure. Plasma excited gas refers to the gas which is plasma-excited under the above-mentioned conditions, and for example, it is argon, helium, neon, krypton, xenon, nitrogen, carbon dioxide and chlorofluorocarbon such as tetrafluoromethane and a mixture thereof and the like. Regarding this, details are described particularly in pp. 30-32 in the journal of technical disclosure by Japan Institute of Invention and Innovation (Laid-open technique NO. 2001-1745, published on Mar. 15, 2001, Japan Institute of Invention and Innovation), which can be preferably used in the present invention.

[Contact Angle of the Film Surface by Alkali Saponification Treatment]

Alkali saponification treatment can be taken as one of effective means of the surface treatment when using the cellulose acylate film of the present invention as a transparent protective film of a polarization plate. In this case, the contact angle of the film surface after alkali saponification treatment is preferably 55° or less. It is more preferably 50° or less, and more preferably 45° or less. As an evaluation method for the contact angle, it can be used evaluation of hydrophilic/hydrophobic property by a conventional method wherein the water droplet of 3 mm diameter is dropped on the film surface after the alkali saponification treatment, and the angle of the film surface with the water droplet is found.

(Light Resistance)

As an index of light endurance of the cellulose acylate of the present invention, color difference ΔE*ab of the film which has been irradiated by super xenon light for 240 hours is preferably 20 or less. It is more preferably 18 or less, and more preferably 15 or less. Measurement for the color difference was by UV3100 (manufactured by Shimadzu Corporation). For the measurement method, the film was regulated in humidity at 25° C. and 60% RH for 2 hours or more, and then color measurement for the film before xenon light irradiation was carried out to find the initial value (L0*, a0*, b0*). Then, a film was irradiated with the xenon light for 240 hours under the condition of 150 W/m$^2$, 60° C. and 50% RH at super xenon weather meter SX-75 (manufactured by Suga test instruments, Co., Ltd.). After the predetermined time passed, the film was taken out of the constant temperature bath, and regulated in humidity at 25° C. and 60% RH for 2 hours, and then color measurement was carried out again to: obtain the value after a lapse of a predetermined time (L1*, a1*, b1*). From this, color difference $\Delta E^*ab=((L0^*-L1^*)^2+(a0^*-a1^*)^2+(b0^*-b1^*)^2)^0.5$ was found.

[Surface Treatment of Cellulose Acylate Film]

The cellulose acylate film is preferably subjected to the surface treatment. Specific method includes corona discharge treatment, glow discharge treatment, flame treatment, acid treatment, alkali treatment or ultraviolet light irradiation treatment. In addition, it is also preferable to build a primer layer as described in the specification of JP-A-7-333433.

The temperature of the cellulose acylate film is preferably Tg (glass transition temperature) or less, and specifically 150° C. or less in such treatments in view of maintenance of the film flatness.

When it is used as a transparent protective film of a light absorbing polarizer, it is particularly preferable to perform acid treatment or alkali treatment, i.e., saponification treatment for the cellulose acylate in view of adhesion to the polarization film. Hereinafter, the alkali saponification treatment will be explained in detail by way of an example.

For the alkali saponification treatment, it is preferable to conduct a cycle of dipping the film surface into an alkali solution, neutralizing it with an acidic solution, and washing with water and drying it.

Examples of the alkali solution include potassium hydroxide solution and sodium hydroxide solution. Normal concentration of the hydroxide ion of the alkali solution is preferably in the range of 0.1 to 3.0 N, and more preferably in the range of 0.5 to 2.0 N. The temperature of the alkali solution is preferably in the range of room temperature to 90° C., and more preferably in the range of 40 to 70° C.

The surface energy of the film after the surface treatment is preferably 55 mN/m or more, and more preferably 60 to 75 mN/m.

The surface energy of solid can be obtained by the contact angle method, the wet heat method, and the adsorption method as described in "Basics and application of wetting" (Realize Co., published on Dec. 10, 1989). For the cellulose acylate film of the present invention, the contact angle method is preferably used.

Specifically, the surface energy of the film can be calculated by dropping two kinds of solution of which the surface energy is already known on the cellulose acylate film, with defining, as the contact angle, an angle on the side of containing the liquid droplet in the angle formed by the tangent drawn to the liquid droplet and the film surface at the intersection of the surface of the liquid droplet and the film surface.

[Conferring of a Functional Layer]

It is preferable to arrange directly the brightness improvement film of the linear polarization type and the circular polarization separation type as described above, on the protective film of the present invention (particularly the cellulose acylate film). Particularly, in case of the circular polarization separation type, it is very preferable to form λ/4 layer from the liquid crystal compound, and form it directly on the protective film, which makes it possible to prepare a polarization plate in a roll-to-roll process.

[Light Absorbing Polarizer]

The light absorbing polarizer (conventional polarization plate) consists of a polarizer and two pieces of the transparent protective films which are placed on both sides thereof. As one of the protective films, a polymer film having low retardation value as described above can be used. As the other protective film, the conventional cellulose acylate film may be also used.

The polarization film includes an iodide-based polarization film, a dye-based polarization film containing a dichroismic dye or a polyene-based polarization film. The iodide-based polarization film and the dye-based polarization film are generally produced using the conventional polyvinyl alcohol-based film.

In addition, it has been found that moisture permeability of the protective film is important for productivity of the light absorbing polarizer. The polarization film and the protective film are laminated with an aqueous adhesive, and the solvent of the adhesive is dried by diffusing it in the protective film. As the moisture permeability of the protective film is high, drying gets quicker, and productivity is improved, but if it is too high, water may enter the polarization film by use environment of the liquid display device (under high humidity), which leads to reduced polarization performance.

The moisture permeability of the protective film is determined by the thickness of the polymer film, free volume or hydrophilic/hydrophobic property and the like.

The moisture permeability of an optical polymer film is preferably in the range of 100 to 1,000 (g/m$^2$)/24 hrs, and more preferably in the range of 300 to 700 (g/m$^2$)/24 hrs.

The thickness of the polymer film can be adjusted by a rip flow rate and a line speed or stretching and compression in film-forming. Since the moisture permeability varies depending on the main material to be used, it is possible to make it in a more preferable range by adjusting the thickness.

The free volume of the polymer film can be adjusted by a drying temperature and time in film-forming. Also in this case, since the moisture permeability varies depending on the main material to be used, it is possible to make it in more preferable range by regulating the free volume.

The hydrophilic/hydrophobic property of the polymer film can be adjusted by adding additives. Moisture permeability can be increased by adding a hydrophilic additive in the free volume, and conversely, moisture permeability can be lowered by adding a hydrophobic additive.

By adjusting the moisture permeability of the polymer film, it is possible to produce a light absorbing polarizer cheaply and in high productivity which has optical compensating function.

The light absorbing polarizer can laminate a polarization film with two or three or more optical layers, such as the brightness enhancing film described below. Accordingly, by combining the light absorbing polarizer and reflective polarizer or semi-transmissive polarization inhibition plate or retardation plate, which will be described below, a reflective oval polarizer or a semi-transmissive oval polarizer may be constituted.

[Linear Polarization Split Type Brightness Improving Film]

A linear polarization split type brightness improving film is usually disposed on a rear side of liquid crystal cell. The linear polarization split type brightness improving film is a light scattering polarizing element or a light reflecting polarizing element, which scatters or reflects the linearly polarized light having predetermined polarizing axis and transmits another light component, when the natural light is emitted by a backlight such as an LCD or reflected from rear side.

The polarizer in which the light scattering or light reflecting polarizing element is laminated on the light absorbing polarizing element, obtains the transmitting light having a predetermined polarized state from the light emitted from light sources such as a backlight, and reflects the light other than the predetermined polarized state. The reflected light by the brightness improving film is converted through the reflection layer disposed on a rear side, introduced back to the brightness improving film and transmitted as the predetermined polarized light, so that quantity of the light transmitting the brightness improving film is increased and polarized light, which is difficult to be absorbed by polarizing element is supplied. Accordingly, the amount of usable light for liquid crystal image display is increased and the brightness is improved. If the brightness improving film is used, when the light is entered through the polarizing element from the rear side of liquid crystal cell in backlight, most of the light having the polarized direction not consistent with polarizing axis of polarizing element is absorbed by the polarizing element and not transmitted through the polarizing element. Depending on the property of the polarizing element, almost 50% of light is absorbed by the polarizing element, and thus the light quantity for the liquid crystal display is decreased so that the image becomes a dark image. The brightness improving film reflects the light incident in a polarization direction so as to be absorbed by the polarizing element, not to introduce to the polarizing element, converts by the reflection layer deposed on rear side to re-enter to the brightness improving film and repeats the reflection and reentering in this way. As a result, the brightness improving film passes only the polarized light having polarizing direction which can be transmitted by polarizing element, and supplies to the polarizing element. Hence, the light such as backlight is efficiently used for liquid crystal display to brighten the image.

The following mechanism (A) to (D) have been proposed to improve efficiency of light by use of linear polarization split type brightness improving film. Any of these mechanisms can be applied to the present invention.

(A) Depolarization of Front Scattered Light

The light-scattering polarizing element scatters the polarized light component perpendicular to the polarizing axis forward or backward. The front light scattered is depolarized. The polarizing direction of front scattered light rotates in the polarizing direction of incident light, hence the component polarized in the polarizing direction of the light scattering polarizing element is increased. If the polarizing element contains many particles in the thickness direction, multiple scattering occurs to enhance the depolarization. In this way, the efficiency of light is improved by the depolarization of front scattered light if the light scattering polarizing element is used, as compared with the efficiency when the light absorbing polarizing element is used alone.

(B) Reuse (Depolarization) of Rear Scattered Light

The rear scattered light of polarized component perpendicular to the polarizing axis of light scattering polarizing element is depolarized when it is scattered backward. The back scattered light is reflected by a metal reflector placed behind the backlight (light source), and again enter the light scattering polarizing element. Since the reentered light is depolarized when back scattered, polarized component parallel to the polarizing axis of light scattering polarized is generated and these polarized components pass through the scattering polarizing element. In this way, backward scattering by light scattering polarizing element and reflection by the metal reflector are repeated to improve the efficiency of light.

(C) Reuse (Rotation of Polarizing Direction) of Back Scattered Light

In an optical system comprising $\lambda/4$ plate and a metal reflector, incident light linearly polarized at 450 to the slow axis of the $\lambda/4$ plate is reflected to rotate its polarizing direction by 90°. For achieving this effect, a $\lambda/4$ plate is provided between the light scattering polarizing element and the metal reflector (placed behind the backlight) so that the slow axis of the $\lambda/4$ plate may be placed at 45° to the polarizing axis of the light scattering polarizing element.

In distribution of polarizing direction of back scattered light of light scattered polarizing element, component polarized perpendicularly to the polarizing axis is large. The light scattered backward, passed through the $\lambda/4$ plate, reflected by the metal reflector and then reentered to the polarizing element has a light component polarized parallel to the polarizing axis of the polarizing element in a large amount, thus the light component parallel polarized can pass through the polarizing element. Accordingly, the efficiency of light is improved by the $\lambda/4$ plate provided between the light scattering polarizing element and metal reflector.

(D) Reuse of Linearly Polarized Reflection Light

The light reflecting polarizing element which absorb the polarized light having predetermined direction, while reflect the polarized light having the other direction has been proposed. The reflected scattering light can be reused. There is a commercially available light reflecting polarizing element. For example, the light reflecting polarizing element with function that linearly polarized light of predetermined direction is passed through, while the other light is reflected such as multi-layered thin film of dielectric and multi-layered (specifically, hundreds of layers) body of thin film with different reflective anisotropy, is commercially available (for example D-BEF, manufactured by 3M Corporation). This light reflecting polarizing element has reflective index difference between polymers in some direction, and incident light is reflected therefrom. In the other hand, the incident polarized light not having reflective index difference between polymers is transmitted through.

[Circular Polarized Separating Brightness Improving Film]

The circularly polarized separating brightness improving film is also used behind usual liquid crystal cell. The circularly polarized separating brightness improving film has the function that if the natural light is introduced by reflection from backlight of liquid crystal display or rear side, the polarized light of predetermined direction is reflected, while the other light is passed through.

The polarizer, which laminated the light absorbing polarizing element and the light scattering or light reflecting polarizing element, obtains the transmitting light having predetermined polarized state from the light emitted from light sources such as backlight, and reflects the light other than the predetermined polarized state. The reflected light by the brightness improving film is converted by the reflection layer disposed on a rear side, introduced back to the brightness improving film and transmitted as the predetermined polarized light, so that quantity of the light transmitting the brightness improving film is increased and polarized light, which is difficult to be absorbed by polarizing element is supplied.

Accordingly, the amount of usable light for liquid crystal image display is increased and the brightness is improved. If the brightness improving film is used, when the light is entered through the polarizing element from the rear side of liquid crystal cell in backlight, most of the light having the polarized direction not consistent with polarizing axis of polarizing element is absorbed by the polarizing element and not transmitted through the polarizing element. Depending on the property of the polarizing element, almost 50% of light is absorbed by the polarizing element, thus the light quantity for the liquid crystal display is decreased to darken the image. The brightness improving film reflects the incident light having polarization direction which absorbed by the polarizing element, not to introduce to the polarizing element, converts by the reflection layer deposed rear side to reenter to the brightness improving film and repeats the reflection and reentering in this way.

As a result, the brightness improving film passes only the polarized light having the polarizing direction which can be transmitted by polarizing element, and supplies to the polarizing element. Hence the light such as back-light is efficiently used for liquid crystal display to brighten the image.

In the circular polarization scattering film, the circularly polarized light is emitted by cholesteric liquid crystal layer, converted to linearly polarized light by ¼ wavelength plate to constrain the absorption loss and entered into the light absorbing polarizing element. The retardation plate, which serves as ¼ wavelength plate in bread wavelength range such as visible light zone can be obtained by laminated the retardation plate, which serves as ¼ wavelength regarding the ultraviolet light with wavelength of 550 nm and the retardation plate, which serves as ½ wavelength plate, for example. Thus, the retardation plate placed between polarization plated and brightness improving film may be constructed by one layer or two layer or more of retardation plate.

More over, two or three or more cholesteric liquid layers having difference reflection wavelength are laminated to reflect the circularly polarized light in broad wavelength range, hence transmitting circularly polarization plated with broad wavelength range is obtained.

FIG. 1 is a sectional view schematically illustrating a backlight apparatus for liquid crystal display with circularly polarized light separating brightness improving film.

In the backlight apparatus shown in FIG. 1, reflection plate RP, light source LS, cholesteric liquid crystal layer (Ch) and λ/4 plate (λ/4) is formed in this order.

The reflection plate (RP) serves as typical reflection function (the same as mirror).

The light source (LS) may be placed in a side of layered body shown in FIG. 1 to guide the light into the inside of layered body by light leading plate or light diffusion plate.

The cholesteric liquid crystal layer (Ch) transmits the component circularly polarized having opposite helical direction (left-handed circularly in FIG. 1) to the helix of liquid crystal molecule (right-handed circularly in FIG. 1), while reflects the component circularly polarized having the same helical direction as the helix of liquid crystal molecule (right-handed circularly in FIG. 1). λ/4 plate λ/4 has the function that converts the circularly polarized light into the linearly polarized light.

The left-handed circularly polarized light 2a introduced to cholesteric liquid crystal layer Ch from the light source LS can transmit the cholesteric liquid crystal layer Ch. Transmitted left-handed circularly polarized light component 3a is converted into linearly polarized light component 4a by λ/4 plate λ/4. Namely, it is converted into the linearly polarized light in order of 2a→3a→4a. The left-handed circularly polarized light component 1b introduced to the reflection plate RP from the light source LS is reflected as the right-handed circularly polarized light component 1a by the reflection plate RP. Reflected light passes through the light source LS and cholesteric liquid crystal layer Ch as above and is converted into the linearly polarized light 4a. Namely, it is converted into the linearly polarized light in order of 1b→1a→2a→3a→4a.

The right-handed circularly polarized light component 2c introduced to the cholesteric liquid crystal layer Ch from light source LS is reflected by cholesteric liquid crystal layer Ch. The reflected light is right-handed circularly polarized light component 2b. The reflected light which passes through light source LS, is reflected by reflection plate RP, transmits the cholesteric liquid crystal layer Ch again, is reflected by the reflection plate RP, transmits the light source LS thirdly, is passed through the cholesteric liquid crystal layer Ch and converted into the linearly polarized light 4a. Namely, it is converted into the linearly polarized light in order of 1d→1c→2b→1b→1a→2a→3a→4a.

The whole light from the light source LS is converted into the linearly polarized light component 4a and used for image display of liquid crystal display.

The commercially available may be used (for example, PCF 350, manufactured by Nitto Denko Corporation, Transmax, manufactured by Merck). The above circularly polarized light separating type brightness improving film can be formed by laminating the orienting film of cholesteric liquid crystal polymer or oriented liquid crystal layer thereof on film base, and has characteristics that right-handed or left handed circularly polarized light is reflected, while the other light is transmitted.

[Liquid Crystal Display]

The liquid crystal display can construct the suitable liquid display apparatus using the illumination system or reflection plate. For example, suitable parts such as diffusion plate, anti-glare layer, anti-reflection layer, protection plate, prism array, lens array sheet, light diffusion plate and backlight is disposed in one layer or two layers or more in place. Although, the optical film and polarizer laminated the optical layer can be constructed by the sequential lamination method in processing of liquid crystal display, the optical film forming method using the pre-lamination is outstanding in safety and fabricating efficiency, and improves the manufacturing process of liquid crystal display. For the adhesion of the polarizer with other optical layer, the optical axes thereof can take the suitable positioning angle according to the aimed phase difference property.

The liquid crystal display is prepared as the method of prior art. Generally, the liquid crystal display is constructed by fabricating the parts such as illumination system and assembling the drive circuit. In present invention, it is not particularly limited except for use the optical film, and conforms to prior art. For the liquid crystal cell, besides the IPS mode aforementioned, any type of liquid crystal cell such as VA type, π type can be adopted.

The polarizer constructed by the optical compensatory film or adhesion of the optical compensatory film with polarizing film is advantageously employed in a liquid crystal display, especially transmitting liquid crystal display.

The transmitting liquid crystal display is comprised of liquid crystal cell and two polarizers placed in both side thereof. The polarizer is comprised of polarizing film and two transparent protective films placed in both side thereof. The liquid crystal cell supports the liquid crystal between the two electrode substrates.

The optical compensatory film is either positioned by one unit between the liquid crystal cell and one of polarizers, or by two units between liquid crystal cell and both polarizers.

The polarizer of present invention may be used as one of two polarizers disposed in both sides of liquid crystal cell. In this time, the polarizer of the invention is disposed so that the optical compensatory sheet faces the liquid crystal cell.

In the liquid crystal cell of TN-mode, the rod-shaped liquid crystal molecules are oriented substantially horizontally and are twisted by 60 to 120°, in the absence of a voltage application. The liquid crystal cell of TN mode is most widely utilized in a color TFT liquid crystal display apparatus, and is described in many references.

[Prism Sheet]

As the embodiment of present invention, the prism sheet for changing the viewing angle described later is employed by at least two sheets on the viewpoint of privacy protection.

The prism sheet is preferably detachable.

It is preferable that two sheets or more of prism sheet are employed concording the transversal direction substantially, different from conventional method described later. "Substantially" means the position within 30°.

Hereafter, the prism sheet is described in detail.

A part of the light emitted from backlight is emitted from light emitting plane by the light emitting apparatus disposed in light leading plate. This emitting light is oriented to direction different from observation direction. For this reason, the prism sheet is adopted to emit the light having the orientation to the demanding direction. In this prism sheet, the prism face is often disposed in opposite side of light leading plate, as described in Japanese Utility Laid-open No. 3-69184. Generally, the plurality of prism sheet are superimposed so that the direction of prism ridge is orthogonal each other.

More over, as disclosed in Japanese Patent No. 7-27136 or No. 7-27137, it is proposed that the prism face is disposed forward light leading body. In JP-A-7-318729, it is disclose that the surface light source apparatus disposes the liner fresnel lens sheet so that the lens surface thereof becomes the incidence face to focus to the viewing direction, wherein liner fresnel lens has the characteristic that the angle formed between the long side of each prism arrays and the sheet face is increased as it is farther away from the point right under viewpoint, in cross-section orthogonal to the prism arrays on the light incidence face of light leading body.

EXAMPLES

Example 1

(Preparation of Cellulose Acylate Film)

Following composition was charged in a mixing tank and components were dissolved by heating under agitation to obtain a cellulose acylate solution A.

| Composition of cellulose acylate solution A | |
|---|---|
| Cellulose acetate with substitution degree of 2.86 | 100 mass parts |
| Triphenyl phosphate (plasticizer) | 7.8 mass parts |
| Biphenyldiphenyl phosphate (plasticizer) | 3.9 mass parts |
| Methylene chloride (first solvent) | 300 mass parts |
| Methanol (second solvent) | 54 mass parts |
| 1-butanol | 11 mass parts |

Following composition was charged in another mixing tank and components were dissolved by heating under agitation to obtain a cellulose acylate solution B.

| Composition of solution B | |
|---|---|
| Methylene chloride (first solvent) | 80 mass parts |
| Methanol (second solvent) | 20 mass parts |
| Optical anisotropy depressant (A-19) | 40 mass parts |
| Wavelength dispersion control agent (UV-120) | 4 mass parts |

<Preparation of the Cellulose Acylate Film Sample CAF-01>

40 mass parts of the additive solution B-1 was added to 477 mass parts of the cellulose acylate solution A, and thoroughly stirred to prepare a dope. The dope was cast on drum cooled at 0° C. from cast die and the film was peeled with residual solvent amount being 70 mass %. Then, both side edges of the film in the cross direction was grasped with pin tenter (illustrated in FIG. 1 of JP-A-4-1008), and the film was dried in a state in which the residual solvent amount was 3 to 5 mass % while maintaining the gap so that the draw ratio in the lateral direction (direction perpendicular to the machine direction) was 3%. The film was subsequently fed between rolls of a heat treatment machine and further dried to obtain a cellulose acylate film sample CAF-01 having a thickness 80 μm. Optical property of prepared CAF-01 cellulose acylate film is measured. The results are given in Table 1.

For the optical property, Re retardation value and Rth retardation value at the wavelength 630 nm using the ellipsometer (M-150, manufactured by JASCO Corporation) was measured.

(Preparation of Liquid Crystal Display)

In a commercially available liquid crystal monitor (LCD-AD 172CWHM, manufactured by I-0 Data Corporation), a polarization plate placed in light source side (light absorbing polarizing element) is peeled off. The protective film on light source side of this polarized is peeled off and adhered on the cellulose acylate film (CAF-01, 02, H1, H2). The circularly polarized light separating brightness improving film (Cholesteric liquid crystal layer+λ/4 plate) is used in the above monitor. The result of measuring the brightness when indicated in white using the measuring machine (BM-7, manufactured by Topcon Corporation) was given in Table 2.

Example 2

(Preparation of Cellulose Acylate Film)

Following composition was charged in a mixing tank and components were dissolved by heating under agitation to obtain a cellulose acylate solution E. The cellulose acylate with the substitution degree of 2.92 was used.

| Composition of cellulose acylate solution C | |
|---|---|
| Cellulose acetate | 100 mass parts |
| Methylene chloride (first solvent) | 300 mass parts |
| Methanol (second solvent) | 54 mass parts |
| 1-buthanol | 11 mass parts |

Following composition was charged in another mixing tank and components were dissolved by heating under agitation to obtain a cellulose acylate solution B.

| Composition of solution B | |
| --- | --- |
| Methylene chloride (first solvent) | 80 mass parts |
| Methanol (second solvent) | 20 mass parts |
| Optical anisotropy depressant | 40 mass parts |
| Wavelength dispersion control agent | 4 mass parts |

<Preparation of the Cellulose Acylate Film Sample>

40 mass parts of the additive solution B-1 was added to 465 mass parts of the cellulose acylate solution A, and thoroughly stirred to prepare a dope. The dope was cast on a drum cooled at 0° C. from a cast die and the film was peeled with residual solvent amount being 70 mass %. Then, both side edges of the film in the cross direction was grasped by a pin tenter (illustrated in FIG. 1 of JP-A-4-1008), and the film was dried in a state in which the residual solvent amount was 3 to 5 mass % while maintaining the gap so that the draw ratio in the lateral direction (direction perpendicular to the machine direction) was 3%. The film was subsequently fed between rolls of a heat treatment machine and further dried to obtain a cellulose acylate film sample CAF-02 having a thickness 80 µm. Optical property of prepared CAF-02 cellulose acylate film is measured. The results are given in Table 1.

For the optical property, Re retardation value and Rth retardation value at the wavelength 630 nm was measured by the ellipsometer (M-150, manufactured by Nihon Bunko K.K.). The cellulose acylate film prepared above was dipped into the 1.5N potassium hydroxide solution (400° C.) for 5 minutes, then neutralized by sulfuric acid, washed with pure water and dried. The surface energy of the cellulose acylate film evaluated by contact angle method was 68 m/N.

(Preparation of Liquid Crystal Display)

The liquid crystal display was prepared in the same manner, except that the CAF-01 was replaced by CAF-02. The result is given in Table 2.

Comparative Example 1

(Preparation of Cellulose Acetate Film)

Following composition was charged in a mixing tank and components were dissolved by heating under agitation to obtain a cellulose acetate solution.

| Composition of cellulose acetate solution | |
| --- | --- |
| Cellulose acetate with oxidation degree of 60.9% | 100 mass parts |
| Triphenyl phosphate (plasticizer) | 7.8 mass parts |
| Biphenyldiphenyl phosphate (plasticizer) | 3.9 mass parts |
| Methylene chloride (first solvent) | 300 mass parts |
| Methanol (second solvent) | 54 mass parts |
| 1-butanol (third solvent) | 11 mass parts |

Following composition of 16 mass parts of retardation increasing agent, 80 mass parts of methylene chloride 20 mass parts of methanol were charged in another mixing tank and components were dissolved by heating under agitation to obtain a retardation releasing agent solution. 13 mass parts of retardation increasing agent solution was added to 487 mass part of the cellulose acetate solution, and thoroughly stirred to prepare a dope. The addition amount of retardation increasing agent is 1.8 mass parts per 100 mass parts of cellulose acetate.

Retardation Increasing Agent

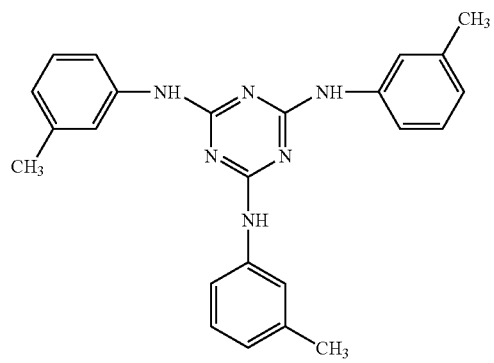

Prepared dope was cast by band casting apparatus. Upon the film surface temperature on band being 40° C., the film was dried with hot air of 60° C. for 1 minute, and peeled off from band. Then, the film was dried with drying air at 140° C. for 10 minutes to obtain the cellulose acetate film with 0.3 mass % of residual solvent amount (thickness: 80 µm).

The optical properties and coefficient of hygroscopic swelling of the prepared cellulose acetate film (CAF-H1) were measured. The results are given as Table 1. Further, for the optical property, Re retardation value and Rth retardation value at the wavelength 630 nm using the ellipsometer (M-150, manufactured by Nihon Bunko K.K.) was measured.

(Preparation of Liquid Crystal Display)

The liquid Crystal Display was prepared and evaluated in the same manner as in Example 1, except that CAF-01 was replaced by CAF-H1. The results are given in Table 1.

Comparative Example 2

Evaluation of Cellulose Acetate Film

A commercially available cellulose acetate film (Fujitac TD80UF, manufactured by Fuji Photo Film Co., Ltd.) was used as CAF-H2. The measuring results are given in Table 1. For the optical property, Re retardation value and Rth retardation value at the wavelength 630 nm using the ellipsometer (M-150, manufactured by Nihon Bunko K.K.) was measured.

(Preparation of Liquid Crystal Display)

The liquid Crystal Display was prepared and evaluated in the same manner as in Example 1, except that CAF-01 was replaced by CAF-H2. The results are given in Table 2.

TABLE 1

| | film | thickness | Optical anisotropy depressant | Wavelength dispersion depressant | Re | Rth |
| --- | --- | --- | --- | --- | --- | --- |
| Example 1 | CAF-01 | 80 µm | 12 mass parts | 1.8 mass parts | 2 nm | 15 nm |

TABLE 1-continued

| | film | thickness | Optical anisotropy depressant | Wavelength dispersion depressant | Re | Rth |
|---|---|---|---|---|---|---|
| Example 2 | CAF-02 | 40 μm | 12 mass parts | 1.8 mass parts | 0 nm | −5 nm |
| Comparative example 1 | CAF-H1 | 80 μm | 1.8 mass parts | (Re control agent) | 5 nm | 130 nm |
| Comparative example 2 | CAF-H2 | 80 μm | none | | 3 nm | 42 nm |

TABLE 2

| Liquid crystal display | Protective film | Front brightness | Brightness at the right and left 45° viewing angle |
|---|---|---|---|
| Example 1 | CAF-01 | 155 cd | 90 cd |
| Example 2 | CAF-02 | 150 cd | 85 cd |
| Comparative example 1 | CAF-H1 | 140 cd | 40 cd |
| Comparative example 2 | CAF-H2 | 145 cd | 63 cd |
| Control (commercial LCD-AD172CWH) | | 140 cd | 65 cd |

Example 3

Preparation of Liquid Crystal Display

In a commercially available 17 inch liquid crystal panel (Syncmaster 172x, manufactured by Samsung Electronics Co., Ltd.), polarizer on light source side was peeled off and adhered on cellulose acylate film prepared in Example 1 (CAF-01, 02, H1, H2). In above monitor, linear polarization split type brightness improving film (dielectric mirror type) was used. The result of measuring the brightness when indicated in white using the measuring machine (BM-7, manufactured by Topcon Corporation) was given in Table 3.

Example 4

(Preparation of Liquid Crystal Display)

The liquid crystal display was prepared and evaluated in the same manner as in Example 3, except that the CAF-01 is replaced by CAF-02 prepared in Example 2. The result is given in Table 3.

Comparative Example 3

(Preparation of Liquid Crystal Display)

The liquid crystal display was prepared and evaluated in the same manner as in Example 1, except that the CAF-01 is replaced by CAF-H1 prepared in Comparative example 2. The results are given in Table 3.

Comparative Example 4

(Preparation of Liquid Crystal Display Apparatus)

The liquid crystal display was prepared and evaluated in the same manner as in Example 3, except that the CAF-01 was replaced by the CAF-H2 prepared in Comparative example 2. The results are given in Table 3.

TABLE 3

| Liquid crystal display | Protective film | Front brightness | Brightness at the right and left 45° viewing angle |
|---|---|---|---|
| Example 3 | CAF-01 | 230 cd | 135 cd |
| Example 4 | CAF-02 | 220 cd | 130 cd |
| Comparative example 3 | CAF-H1 | 210 cd | 75 cd |
| Comparative example 4 | CAF-H2 | 210 cd | 90 cd |
| Control (commercially available Syncmaster 172x) | | 220 cd | 100 cd |

INDUSTRIAL APPLICABILITY

The present inventor investigated the problems (coloration or brightness decrease) of the liquid crystal display device equipped with the brightness enhancing film (reflective polarizer) and found that the optical anisotropy of a polarizer protecting film disposed on a polarizer close to the light source (light-absorbing polarizer) and the brightness enhancing film, had been the cause of the problems. Therefore, the above-mentioned problems can be solved by rendering the protective layer almost completely isotropic.

The light entered the brightness enhancing film at an oblique angle converts to a linearly polarized light and exits therefrom. The linearly polarized light is first incident to the protective film of the light-absorbing polarizer. A protective film according to the related art is a birefringent medium having a retardation of the thickness direction. Thus, the entered linearly polarized light converts to the elliptically polarized light and exits therefrom. Since elliptically linearly polarized light, without linearly polarized light, enters a light-absorbing polarizer, the coloration or the lowering of brightness takes place.

The liquid crystal display device of the invention uses a film having small optical anisotropy for the protective film of a light-absorbing polarizer that is closest a light source. Therefore, it is possible to enhance the utility efficiency of light of the liquid crystal display device in all directions without side effects. In the invention, as a protective film, cellulose acylate film that is the same as a light-absorbing polarizer according to the related art (but, the optical anisotropy of which has been lowered) can be used. Therefore, said problems in the conventional liquid crystal display device can be solved without changing the process for preparing the polarizer. The concept of the invention can be applied to all the modes without depending on the mode of liquid crystal display device (e.g.: TN, VA, IPS, OCB, ECB).

The invention claimed is:

1. A liquid crystal display device in which a light source, a light-scattering or light-reflecting polarizer, a light-absorbing polarizer, liquid crystal cells, and a light-absorbing polarizer are disposed in this order, wherein the light-absorbing polarizer on the light source side has a polarizing film between two sheets of transparent polymer films, and the in-plane retardation value and the retardation value of the thickness direction of the transparent polymer films on the light source side satisfy the following Expressions (I) to (IV):

$$0 < Re(630) < 10, \quad \text{(I)}$$

$$|Rth(630)| < 25, \quad \text{(II)}$$

$$|Re(400) - Re(700)| < 10, \text{ and} \quad \text{(III)}$$

$$|Rth(400) - Re(700)| < 35, \text{ and} \quad \text{(IV)}$$

in the above Expressions, $Re(\lambda)$ is an in-plane retardation value (unit: nm) in the transparent polymer film as measured at the wavelength of $\lambda$ nm and $Rth(\lambda)$ is a retardation value (unit: nm) of a thickness direction in a transparent polymer film as measured at the wavelength of $\lambda$ nm.

2. The liquid crystal display device according to claim 1, wherein the transparent polymer film contains a retardation decreasing agent in an amount that satisfies the following Expressions (V) and (VI):

$$(Rth(A) - Rth(0))/A < -1.0, \text{ and} \quad \text{(V)}$$

$$0.01 < A < 30, \text{ and,} \quad \text{(VI)}$$

in the above Expressions, $Rth(A)$ is a retardation value (unit: nm) in the thickness direction of a transparent polymer film containing A mass % of a retardation decreasing agent as measured at the wavelength of 630 nm; $Rth(0)$ is a retardation value (unit: nm) of a transparent polymer film in the thickness direction prepared in the same manner as mentioned above except that it does not contain a retardation decreasing agent as measured at the wavelength of 630 nm; and A is the amount (mass %) of a retardation decreasing agent to be added relative to polymer which constitutes the transparent polymer film.

3. The liquid crystal display device according to claim 2, wherein the transparent polymer film is made of cellulose acylate having an acyl substitution degree of 2.85 to 3.00.

4. A liquid crystal display device in which a light source, a cholesteric liquid crystal layer, a $\lambda/4$ plate, a light-absorbing polarizer, liquid crystal cells, and a light-absorbing polarizer are disposed in this order, wherein the light-absorbing polarizer on the light source side has a polarizing film between two sheets of transparent polymer films, and the in-plane retardation value and the retardation value of the thickness direction of the transparent polymer films on the light source side satisfy the following Expressions (I) to (IV):

$$0 < Re(630) < 10, \quad \text{(I)}$$

$$|Rth(630)| < 25, \quad \text{(II)}$$

$$|Re(400) - Re(700)| < 10, \text{ and} \quad \text{(III)}$$

$$|Rth(400) - Re(700)| < 35, \text{ and} \quad \text{(IV)}$$

in the above Expressions, $Re(\lambda)$ is an in-plane retardation value (unit: nm) of the transparent polymer film as measured at the wavelength of $\lambda$ nm; and $Rth(\lambda)$ is a retardation value (unit: nm) in the thickness direction of a transparent polymer film as measured at the wavelength of $\lambda$ nm.

5. The liquid crystal display device according to claim 4, wherein the transparent polymer film contains a retardation decreasing agent in an amount that satisfies the following Expressions (V) and (VI):

$$(Rth(A) - Rth(0))/A < -1.0, \text{ and} \quad \text{(V)}$$

$$0.01 < A < 30, \text{ and} \quad \text{(VI)}$$

in the above Expressions, $Rth(A)$ is a retardation value (unit: nm) in the thickness direction of a transparent polymer film containing A mass % of a retardation decreasing agent as measured at the wavelength of 630 nm; $Rth(0)$ is a retardation value (unit: nm) of the transparent polymer film in the thickness direction prepared in the same manner as mentioned above except that it does not contain a retardation decreasing agent as measured at the wavelength of 630 nm; and A is the amount of a retardation decreasing agent to be added relative to a polymer which constitutes the transparent polymer film.

6. The liquid crystal display device according to claim 5, wherein the transparent polymer film is made of cellulose acylate having an acyl substitution degree of 2.85 to 3.00.

* * * * *